United States Patent [19]

Jinno et al.

[11] Patent Number: 5,525,027

[45] Date of Patent: Jun. 11, 1996

[54] WORKING ROBOT

[75] Inventors: Makoto Jinno; Nobuto Matsuhira; Takafumi Matsumaru, all of Yokohama, Japan

[73] Assignee: Kabushiki Kaisha Toshiba, Kawasaki, Japan

[21] Appl. No.: 956,482

[22] PCT Filed: Dec. 6, 1991

[86] PCT No.: PCT/JP91/01698

§ 371 Date: Dec. 31, 1992

§ 102(e) Date: Dec. 31, 1992

[87] PCT Pub. No.: WO92/21484

PCT Pub. Date: Dec. 10, 1992

[30] Foreign Application Priority Data

May 28, 1991 [JP] Japan ................. 3-123769
May 28, 1991 [JP] Japan ................. 3-123951

[51] Int. Cl.⁶ .................................................. B25J 11/00
[52] U.S. Cl. ................... 419/680; 15/319; 15/320; 15/53.2; 114/222; 244/1 R; 901/1; 901/45
[58] Field of Search ........................ 414/680, 744.5; 901/1, 15, 45; 15/49.1, 53.1, 53.2, 53.3, 53.4, 319, 320; 114/222; 244/1 R; 200/61.85

[56] References Cited

U.S. PATENT DOCUMENTS

| | | | |
|---|---|---|---|
| 2,762,631 | 9/1956 | Entz | 280/43.14 |
| 3,589,134 | 6/1971 | Hackmann et al. | 414/3 X |
| 3,594,842 | 7/1971 | Clark | 15/53.1 |
| 3,780,571 | 12/1973 | Wiesener | 73/67.8 |
| 3,983,592 | 10/1976 | Fegan | 15/49.1 |
| 4,207,642 | 6/1980 | Arato | 15/53 AB |
| 4,370,091 | 1/1983 | Gagliardi | 901/29 X |
| 4,585,388 | 4/1986 | Gossain et al. | 414/735 |
| 4,627,169 | 12/1986 | Zafred et al. | 33/169 C |
| 4,757,566 | 7/1988 | Field et al. | 15/320 X |
| 4,940,382 | 7/1990 | Castelain | 901/1 X |
| 4,993,139 | 2/1991 | Burry et al. | 901/41 X |
| 4,993,913 | 2/1991 | Ohtsuki | 901/1 X |
| 5,000,653 | 3/1991 | Gosdowski | 414/744.5 |
| 5,012,591 | 5/1991 | Asakawa | 901/41 X |
| 5,060,463 | 10/1991 | Jones | 172/273 X |
| 5,088,610 | 2/1992 | Garnier | 212/196 |

FOREIGN PATENT DOCUMENTS

| | | |
|---|---|---|
| 0005685 | 11/1979 | European Pat. Off. . |
| 0129245 | 12/1984 | European Pat. Off. . |
| 0155084 | 9/1985 | European Pat. Off. . |
| 0194926 | 9/1986 | European Pat. Off. . |
| 0233712 | 8/1987 | European Pat. Off. . |

(List continued on next page.)

OTHER PUBLICATIONS

Mechanical Engineering, Tech News: "Polish the Canopy . . . and Peel the Paint"; Mar., 1989.

Nikkei Sangyo Shinbun, (Special Ability Robot) "(Aircraft Cabin Window Polishing Robot)"; Apr. 5, 1989.

Nikkei Computer, Computer Eye "(Giant Washing Robot have wholly polished the aircraft)"; pp. 112–113; Sep. 10, 1990.

"Long-Reach Robot Strips Fighters", Advanced Manufacturing and Technology, Jan. 15, 1989.

Henderson, "USAF Expects Robotic Inspection Facility to Cut Maintenance Costs", Aviation Week & Space Technology, Mar. 13, 1989; pp. 53–57.

Manner et al., "Large Manipulators", Mechanical Engineering, Mar. 1989, pp. 299–304.

Collier, Dec. 7, 1940, p. 54, Class 244, subclass 134.

Primary Examiner—Donald W. Underwood
Attorney, Agent, or Firm—Foley & Lardner

[57] ABSTRACT

The working apparatus comprises a manipulator 1 having three axes, a working unit 10, 20, and a universal coupling 7 for connecting the manipulator 1 and the working unit 10, 20. The working unit 10, 20 has a working portion 12, 22 for rotatably and surface contacting an objective working surface 19, 79. The universal coupling 7 is rotatable about any two axes. The manipulator 401 may be secured to a hatch opening portion 410 of an aircraft by means of a holding jig 406.

9 Claims, 46 Drawing Sheets

FOREIGN PATENT DOCUMENTS

| | | |
|---|---|---|
| 0300049 | 1/1989 | European Pat. Off. . |
| 0304942 | 3/1989 | European Pat. Off. . |
| 0365921 | 5/1990 | European Pat. Off. . |
| 0392926 | 10/1990 | European Pat. Off. . |
| 2550984 | 3/1985 | France . |
| 2566310 | 12/1985 | France . |
| 2578774 | 9/1986 | France . |
| 804535 | 7/1949 | Germany . |
| 835291 | 3/1952 | Germany . |
| 2332075 | 1/1974 | Germany . |
| 3317425 | 8/1984 | Germany . |
| 53-28967 | 3/1978 | Japan . |
| 60-34282 | 2/1985 | Japan . |
| 60-90687 | 5/1985 | Japan . |
| 61-30387 | 2/1986 | Japan . |
| 62-5009 | 1/1987 | Japan . |
| 63-216686 | 9/1988 | Japan . |
| 64-312 | 1/1989 | Japan . |
| 2178774 | 12/1986 | United Kingdom . |

FIG. I

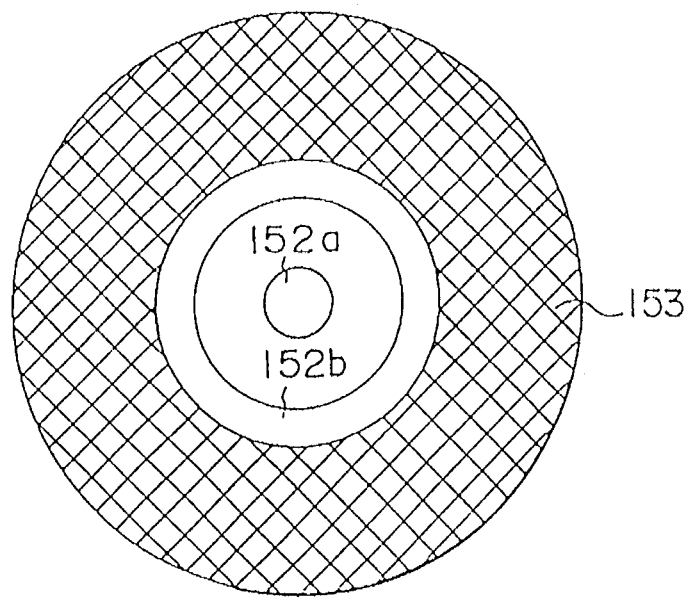
F I G. 16A
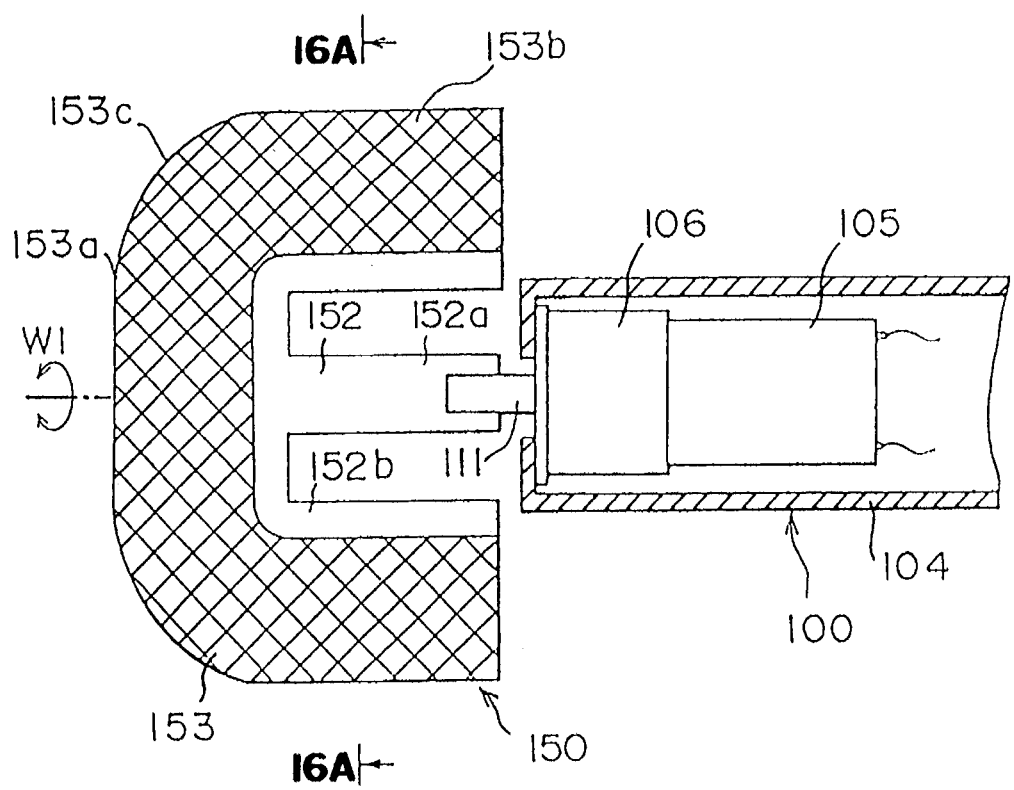
F I G. 16B

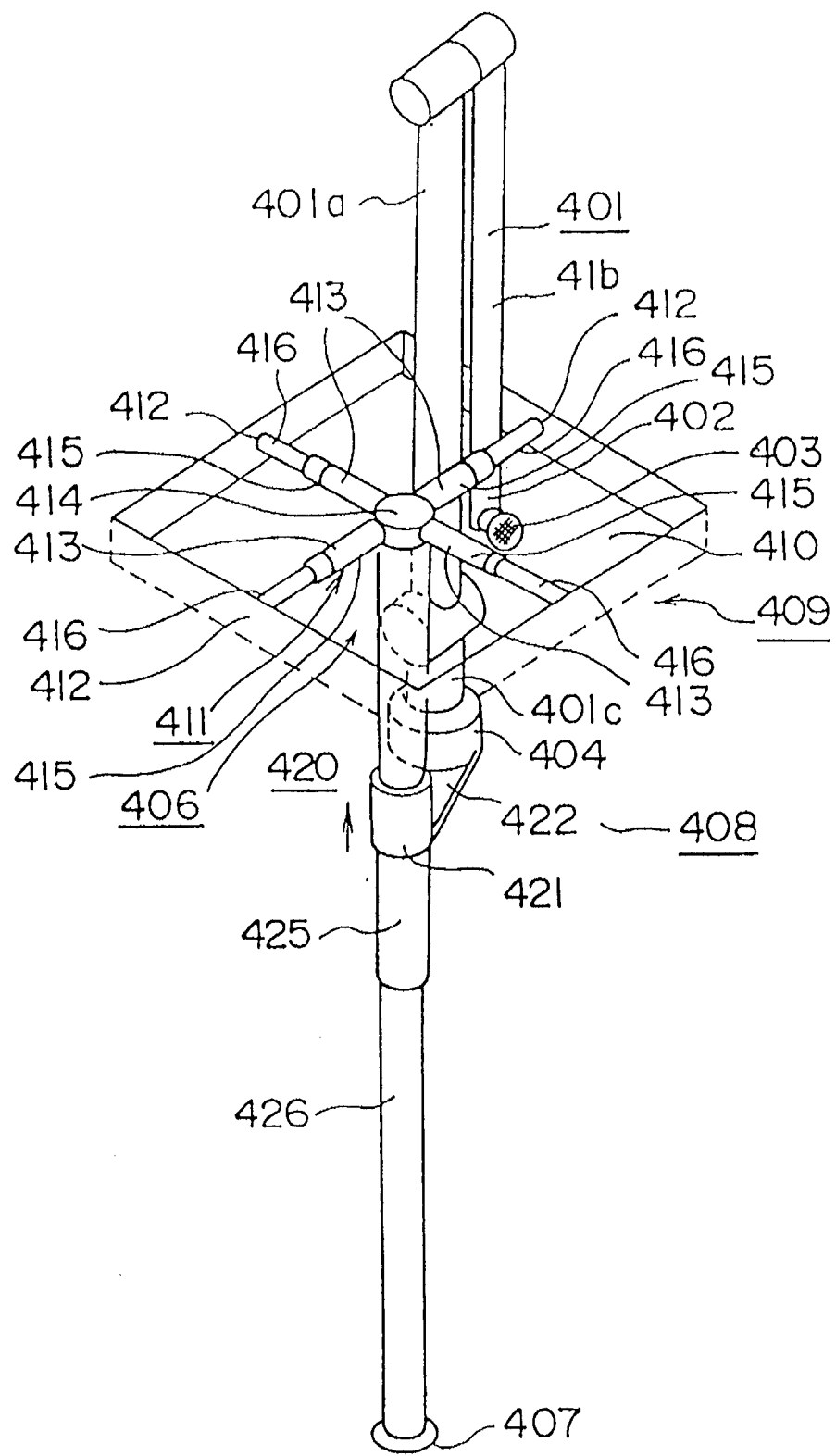
F I G. 21

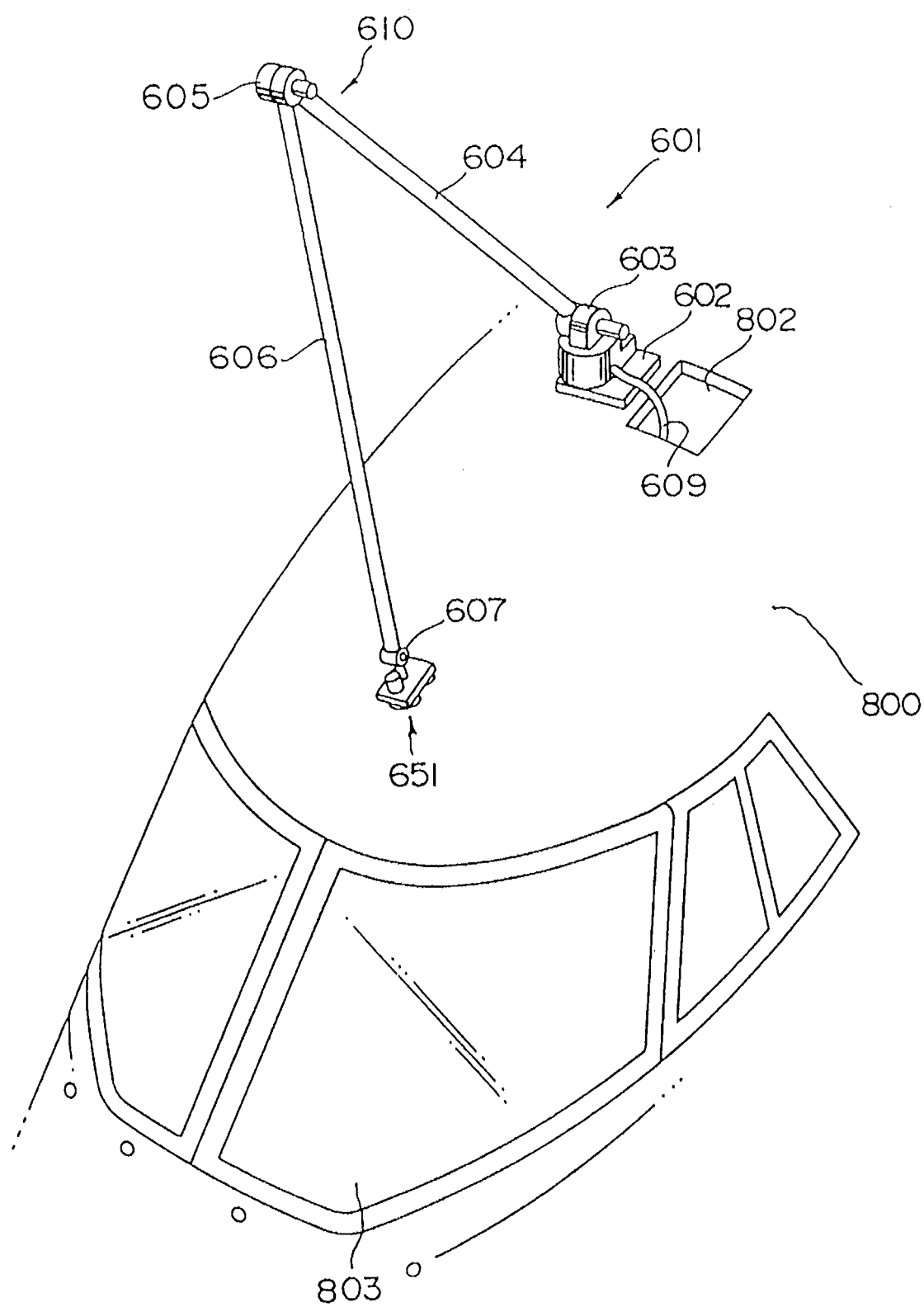
F I G. 31

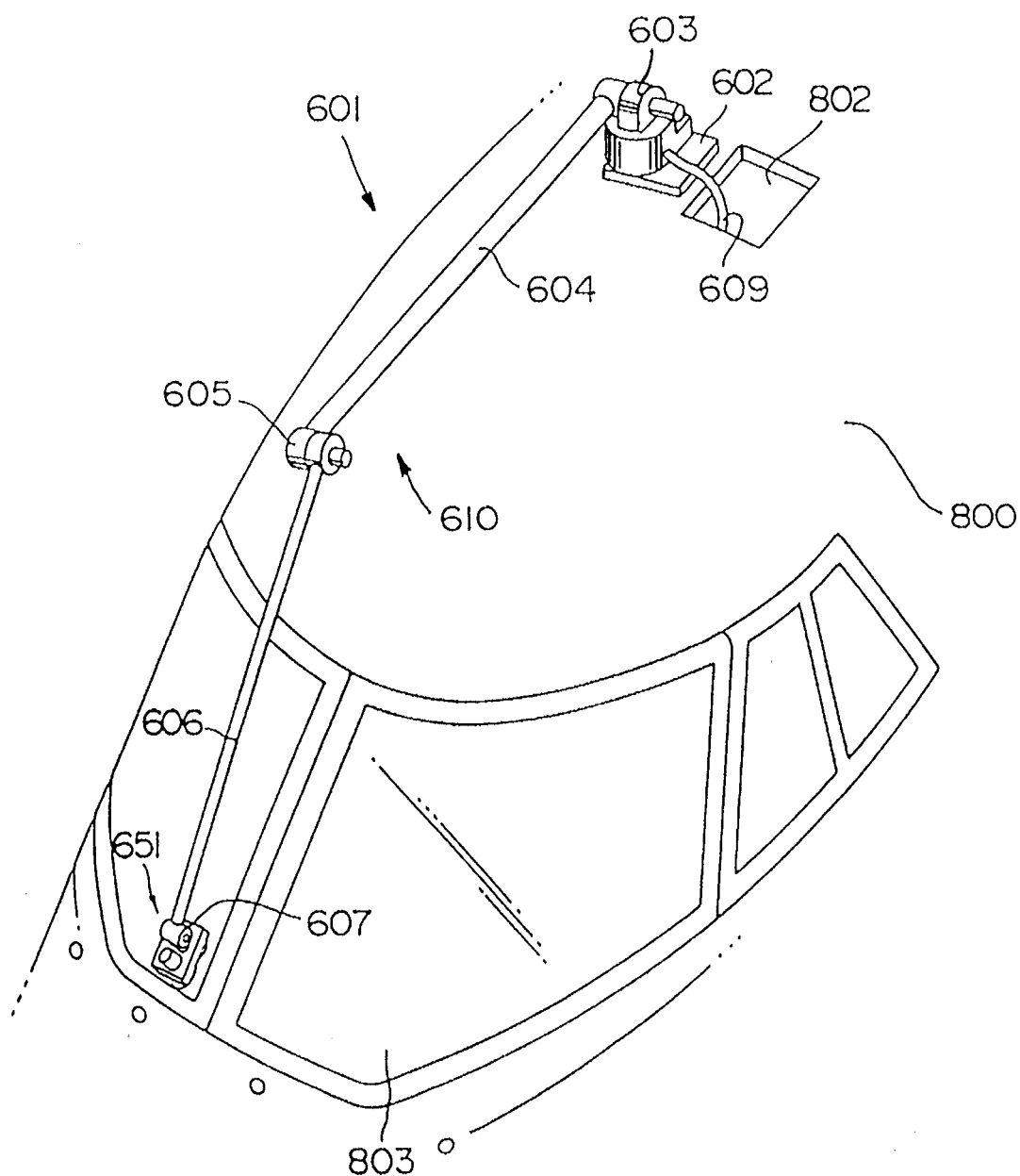
F I G. 32

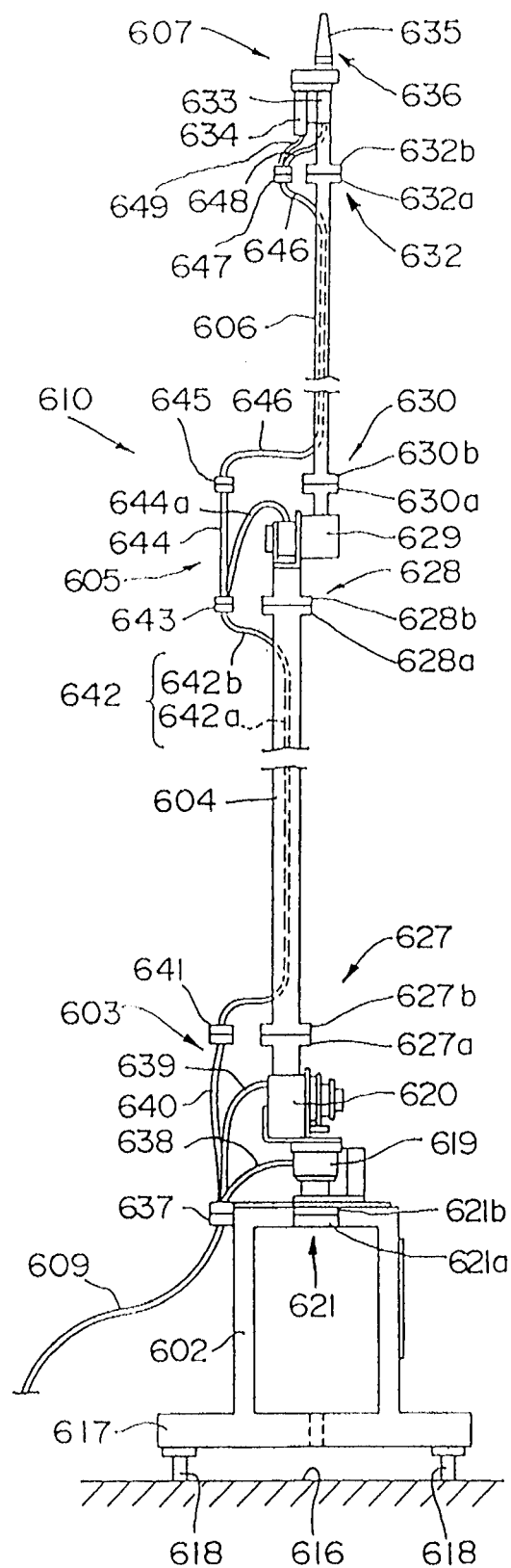
F I G. 35

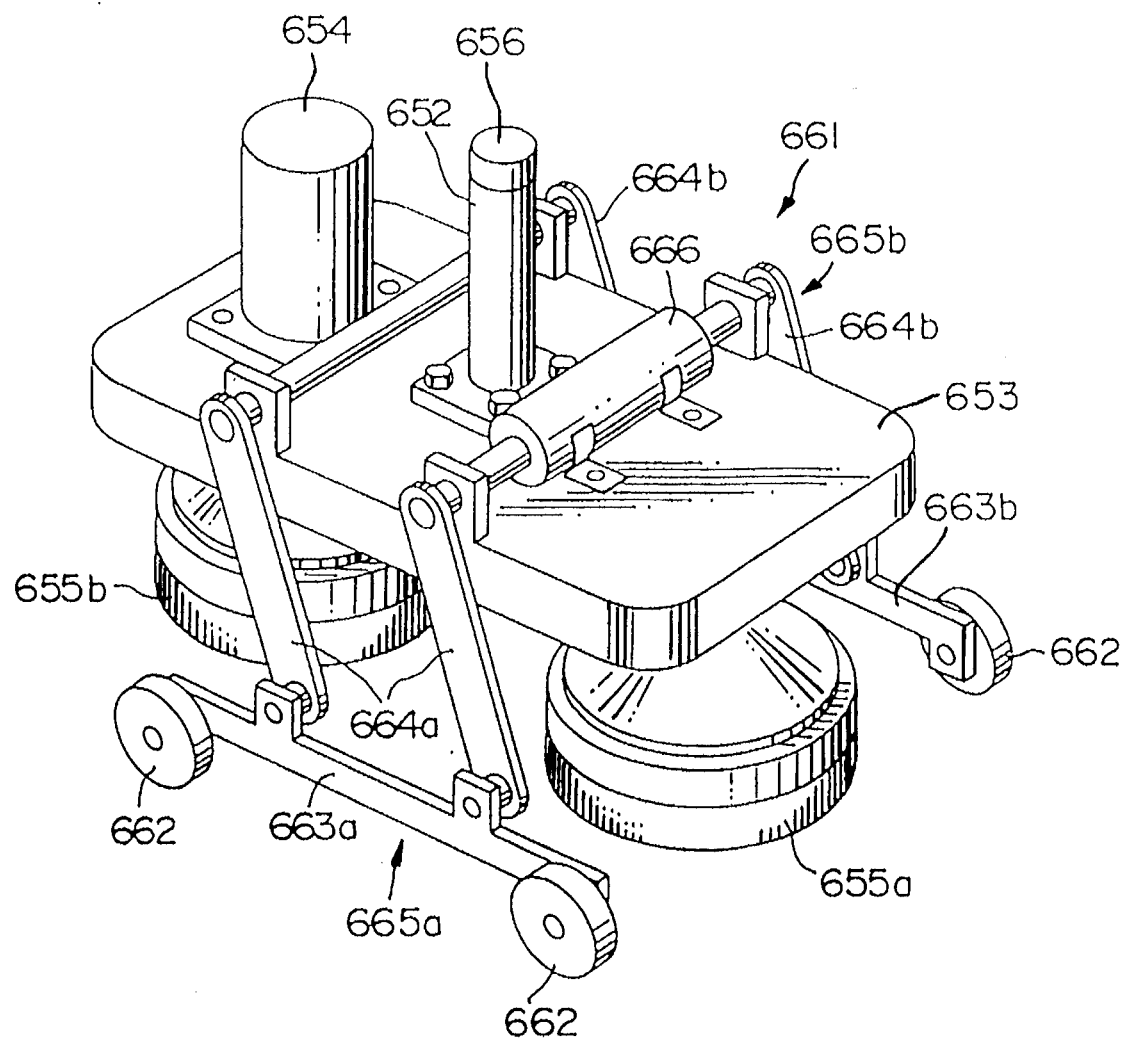
F I G . 41

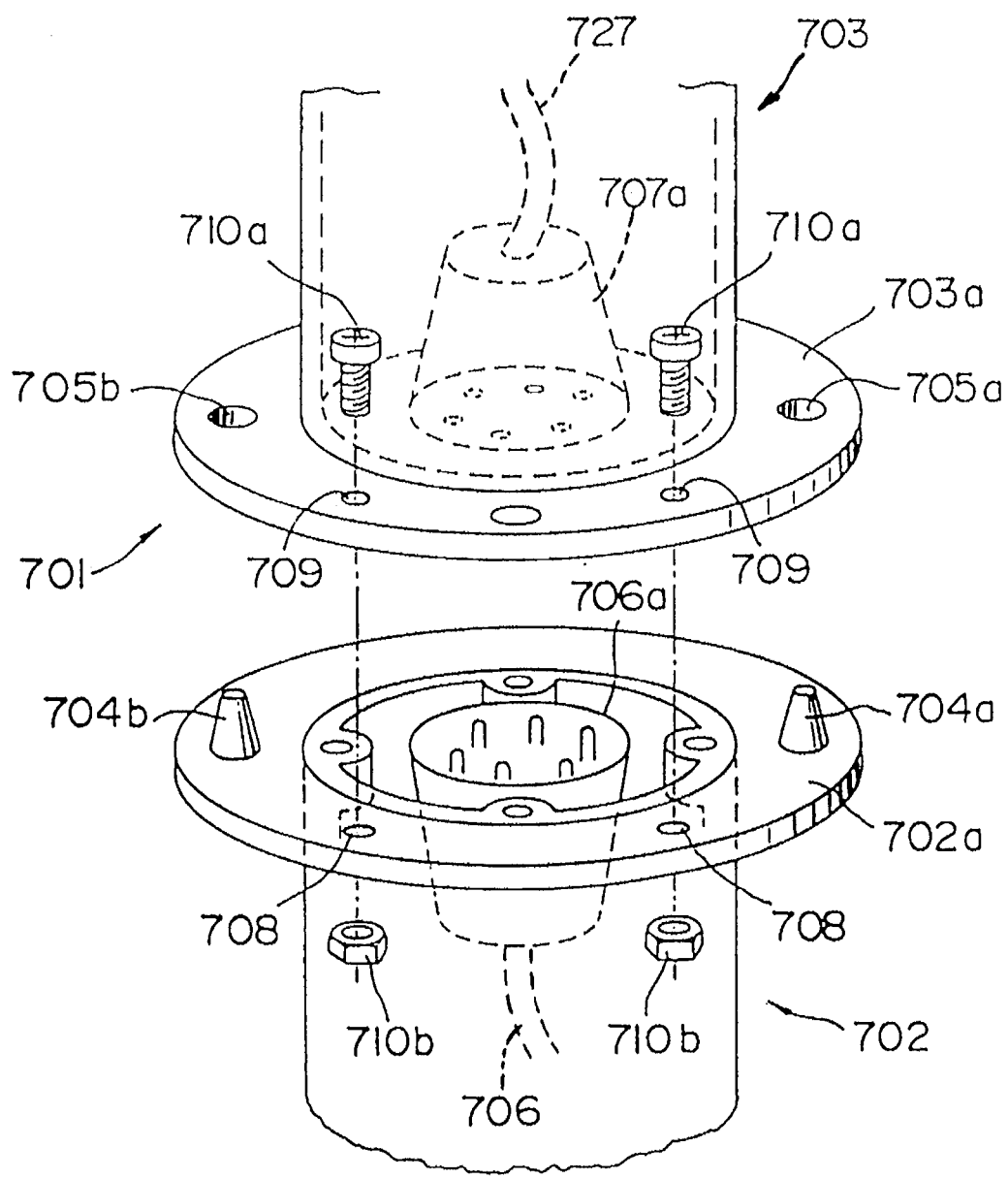
F I G . 45

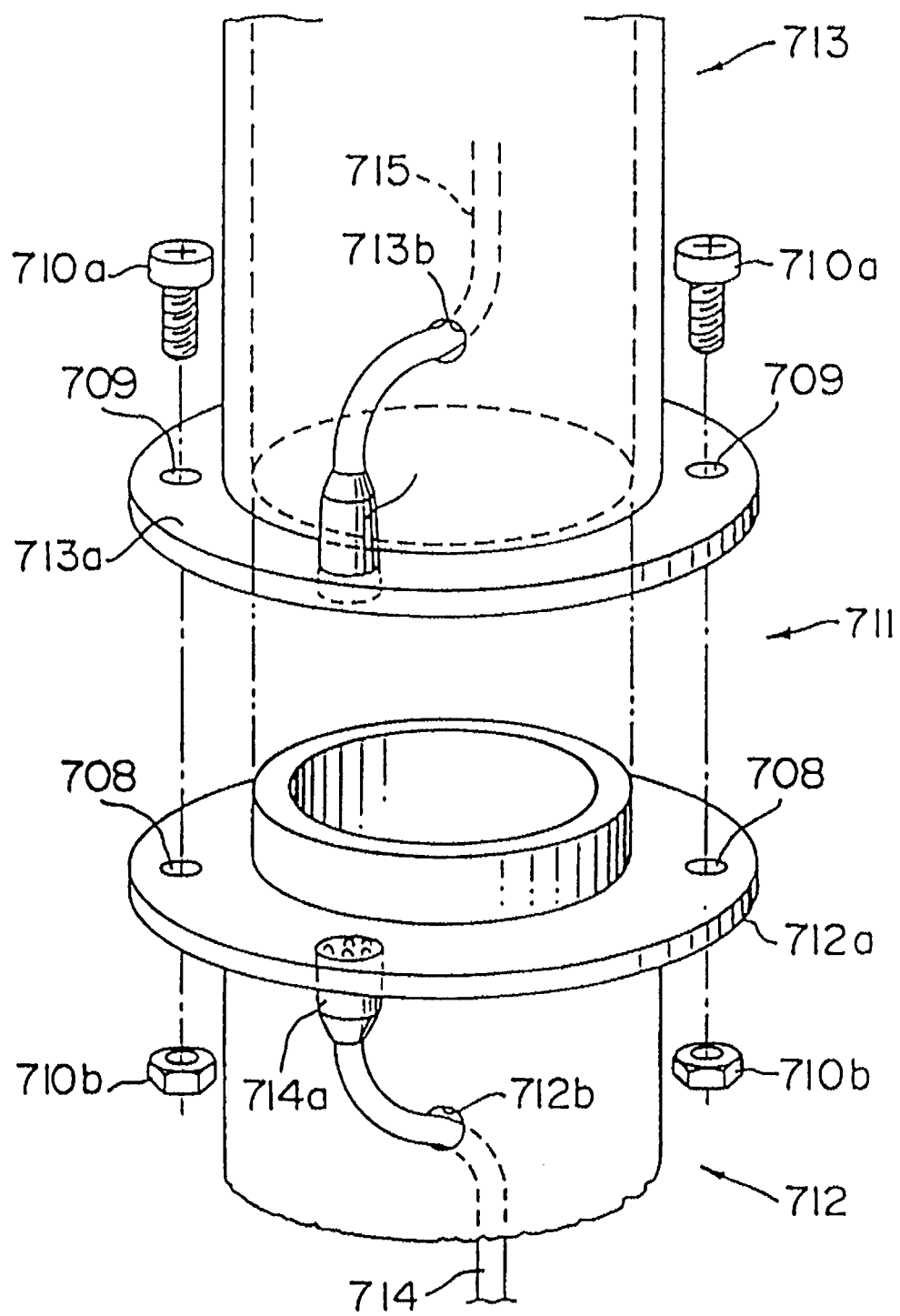
F I G . 46

5,525,027

WORKING ROBOT

TECHNICAL FIELD

The present invention relates to a working apparatus, and in particular, relates to a working apparatus having a manipulator.

RELATED ART

A working apparatus with a manipulator and a working unit such as a polishing unit and a cleaning unit disposed at an end of the manipulator has been known. While the working apparatus is operated, the working unit is brought into contact with and pressed against an objective working surface.

When any plane surface or curved surface is cleaned or painted with such a working apparatus, a manipulator having five or six degrees of freedom is used. This manipulator is provided with multiple joints of two or three axes, basic configuration such as Cartesian coordinates, cylindrical coordinates, or the like, and two or three orientation axes. At one end of the manipulator, a working unit is disposed. In addition, in order to control the force with which the working unit presses against the objective working surface, force sensors are provided where necessary.

FIG. 48 is a perspective view showing a conventional working apparatus for cleaning an objective working surface such as a wall.

In FIG. 48, a manipulator 200 is a multi-jointed manipulator having five degrees of freedom consisting of three joint axes R1, R2, and R3 and two orientation axes R4 and R5. In the vicinity of an outer or working end of the manipulator 200, a motor 202 for driving the orientation axes R4 and R5 is disposed. At this end of the manipulator 200, a rotating shaft 204 is provided. A brush 201 which is to be brought into contact with an objective working surface 205 is secured to the rotating shaft 204 as a working portion. The brush 201 is guided to a particular position of the objective working surface 205 by operations of arms 208 and 209 of the manipulator 200. The orientation of the brush 201 is controlled by the orientation axes R4 and R5 in such a way that the axis of rotation of the brush 201 is pressed perpendicularly to the objective working surface 205. The brush 201 is rotated about the rotating shaft 204 so as to perform a cleaning work. A bottom portion 206 is securely connected to a base 207.

When the above described working apparatus is operated in such a manner that-the working unit such as a cleaning unit or a painting unit is pressed against any plane surface or curved surface, it is preferable that the working portion of the working unit be brought into contact with and pressed against the objective working surface from a particular direction relative to the direction normal to the objective working surface with a particular force from the viewpoint of working efficiency. Thus, the manipulator for use in the conventional working apparatus requires many degrees of freedoms, namely five or six degrees of freedom. In this construction, since the weight of the two or three orientation axes should be supported, the weight of two or three axes of the basic configuration proportionally increases. Thus, the structure of the manipulator and its control unit become complicated, thereby increasing their size.

Moreover, when the working portion is pressed from a particular direction relative to the direction normal to the objective working surface, although the shape of the objective working surface can be taught to the working apparatus, this work requires a great amount of labor.

When the shape of the objective working surface is unknown, by using an inner force sensor and a torque sensor provided on each of the five or six axes, the shape of the objective working surface can be estimated. However, this technique requires expensive sensors and advanced control techniques.

In addition, as shown in FIG. 49, it is possible to mount a working unit 301 through two orientation axes R4 and R5 at an end of a basic configuration having three joint axes R1, R2, and R3. In this construction, when the working apparatus 300 is operated, a brush 302 at the end of the working unit 301 is brought into contact with and pressed against an objective working surface 303. However, the working apparatus shown in FIG. 49 has the following drawbacks.

In FIG. 49, the brush 302 of the working unit 301 is controlled in such a manner that the brush 302 always has a particular orientation relative to the objective working surface 303. When the brush 302 which is kept in the particular orientation is moved for a long path, the directions of the orientation axes may become unstable and an improper orientation takes place. For example, as shown in FIG. 49, when the brush 302 is successively moved from position (A) to position (B) to position (C), the brush 302 may be improperly oriented. When the orientation axes R4 and R5 are improperly oriented, they cannot keep their orientations constant due to abrupt movement. Thus, the brush 302 cannot be smoothly operated. If the objective working surface 303 is a glass or the like, it may be broken. Although it is possible to use a manipulator having many degrees of freedom to prevent the orientation axes R4 and R5 from being improperly oriented, the computation for controlling the manipulator is very complicated. Thus, this conventional manipulator cannot smoothly operate the working unit 301 on the objective working surface 303 in such a manner that the orientation of the working unit 301 relative to the objective working surface 303 is kept constant.

Moreover, as shown in FIGS. 50A and 50B, when the objective working surface 303 has a corner 304, the operation is stopped at the corner 304 and then the orientations of the orientation axes R4 and R5 are changed in accordance with an inclination of the objective working surface 303. Thus, the working apparatus cannot continuously operate on the objective working surface 303 having the corner 304. Furthermore, when the objective working surface 303 has a sharp corner, the working apparatus cannot operate due to interference with the working unit 301 and the orientation axes R4 and R5.

DISCLOSURE OF THE INVENTION

A first object of the present invention is to provide a working apparatus which freely operates a working portion so that its orientation fits snugly against an objective working surface.

A second object of the present invention is to provide a working apparatus in which a manipulator can be easily set.

A third object of the present invention is to provide a working apparatus from which a manipulator can be freely detached.

(1) A first aspect of the present invention concerns a working apparatus comprising a manipulator having two to four axes, a working unit having a working portion for rotatably and surface contacting an objective working surface, and a universal coupling for connecting the manipulator and the working unit, the universal coupling being rotatable about any two axes.

(2) A second aspect of the present invention concerns a working apparatus comprising a manipulator, a working unit disposed at an end of the manipulator, and a holding jig for holding a base portion of the manipulator, the holding jig being secured to a hatch opening portion of an aircraft.

(3) A third aspect of the present invention concerns a working apparatus comprising a plurality of arms, a manipulator having at least one joint, a manipulator end portion for attaching a working unit, the working unit being arranged to perform a predetermined work for an aircraft, a manipulator base portion secured to an airframe part of the aircraft, and a control unit for driving and controlling the working unit.

BRIEF DESCRIPTION OF DRAWINGS

FIG. 16A is a sectional view showing a working unit of an eleventh embodiment of the working apparatus in accordance with the first aspect of the present invention;

FIG. 16B is a side sectional view of FIG. 16A;

FIG. 21 is a perspective view showing a first embodiment of a working apparatus easily set in accordance with a second aspect of the present invention;

FIG. 31 is a perspective view showing an operation of a first embodiment of a detachable working apparatus in accordance with a third aspect of the present invention;

FIG. 32 is a perspective view showing an operation of the first embodiment in accordance with the third aspect of the present invention;

FIG. 35 is a front view showing the first embodiment in accordance with the third aspect of the present invention;

FIG. 41 is a perspective view showing a working unit of a second embodiment of the working apparatus in accordance with the third aspect of the present invention;

FIG. 45 is a perspective view showing a coupling device of a fifth embodiment of the working apparatus in accordance with the third aspect of the present invention;

FIG. 46 is a perspective view showing a coupling device of a sixth embodiment of the working apparatus in accordance with the third aspect of the present invention;

BEST MODES FOR CARRYING OUT THE INVENTION

Section 1 Working apparatus for freely fitting a working portion to an objective working surface

1.1 First Embodiment

Embodiments of a working apparatus for freely fitting and adapting a working portion to an objective working surface in accordance with the first aspect of the present invention will be described with reference to FIGS. 1 to 20.

First, with reference to FIGS. 1 and 2, a first embodiment will be described.

Figure 1:
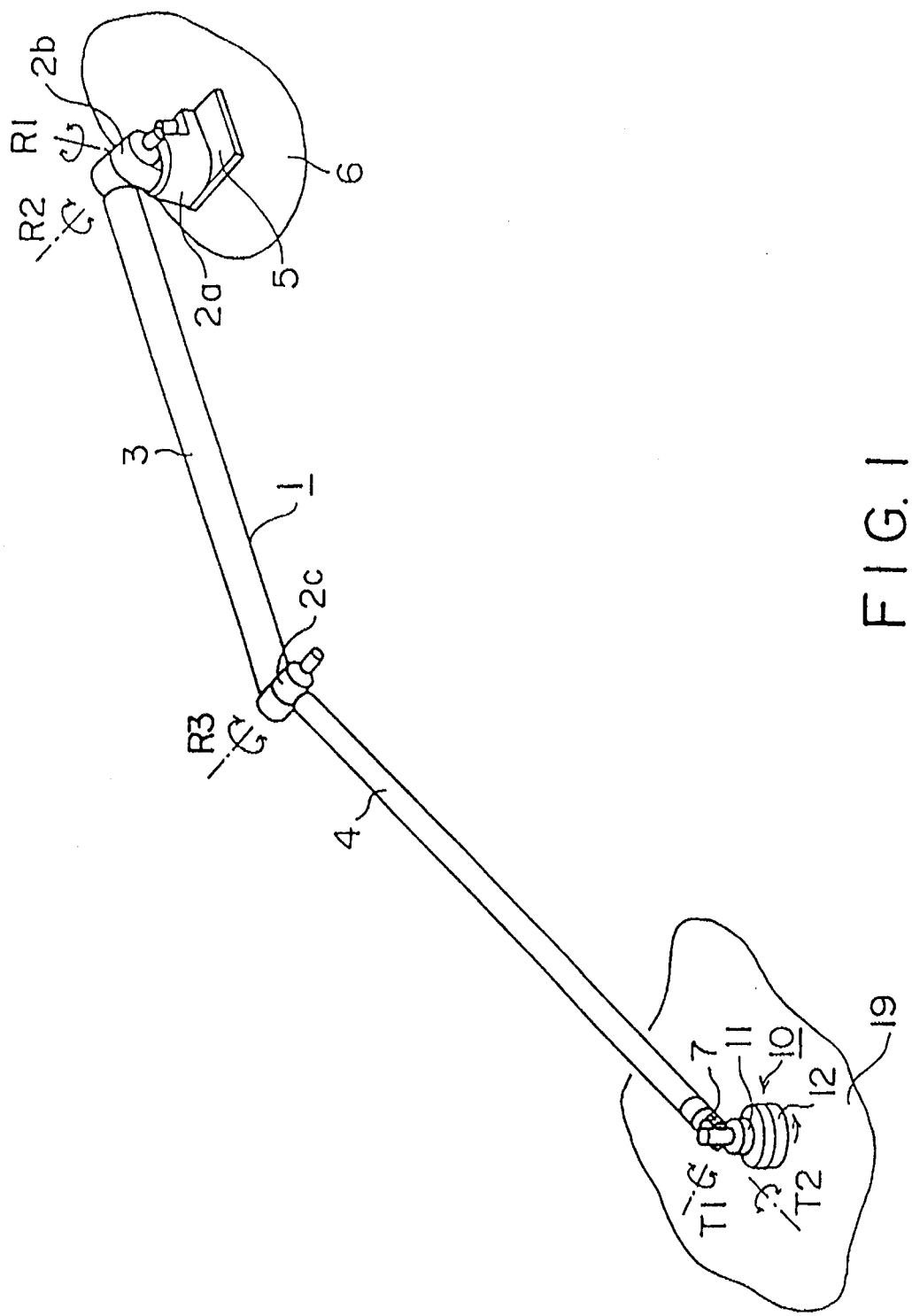
FIG. 1 is a perspective view showing a first embodiment of a working apparatus for freely fitting a working portion to an objective working surface in accordance with the first aspect of the present invention.

In FIG. 1, a working apparatus has a multi-jointed manipulator 1 which is provided with three joint axes R1, R2, and R3 as a basic configuration. Each of joints 2a, 2b, and 2c of the three axes R1, R2, and R3 is provided with a servo motor, a position detecting device such as an encoder, and a driving mechanism comprising a reduction gear, a limit sensor, and a brake. The manipulator 1 has a first arm 3 and a second arm 4, which are long arms. The manipulator 1 is held by a base 5. The base 5 is secured on a mounting surface 6. An end of the second arm 4 is connected to a universal coupling 7. The universal coupling 7 is supported by a ball bearing, a plain bearing, or the like. The universal coupling 7 is rotatable about two axes T1 and T2. The directions of the two axes T1 and T2 of the flexible coupling 7 can be set independently from those of the three axes R1, R2, and R3 of the basic configuration. In this embodiment, the direction of the axis T2 is in parallel with that of the axis of the second arm 4. The direction of the axis T1 is perpendicular to that of the axis T2.

Figure 2:
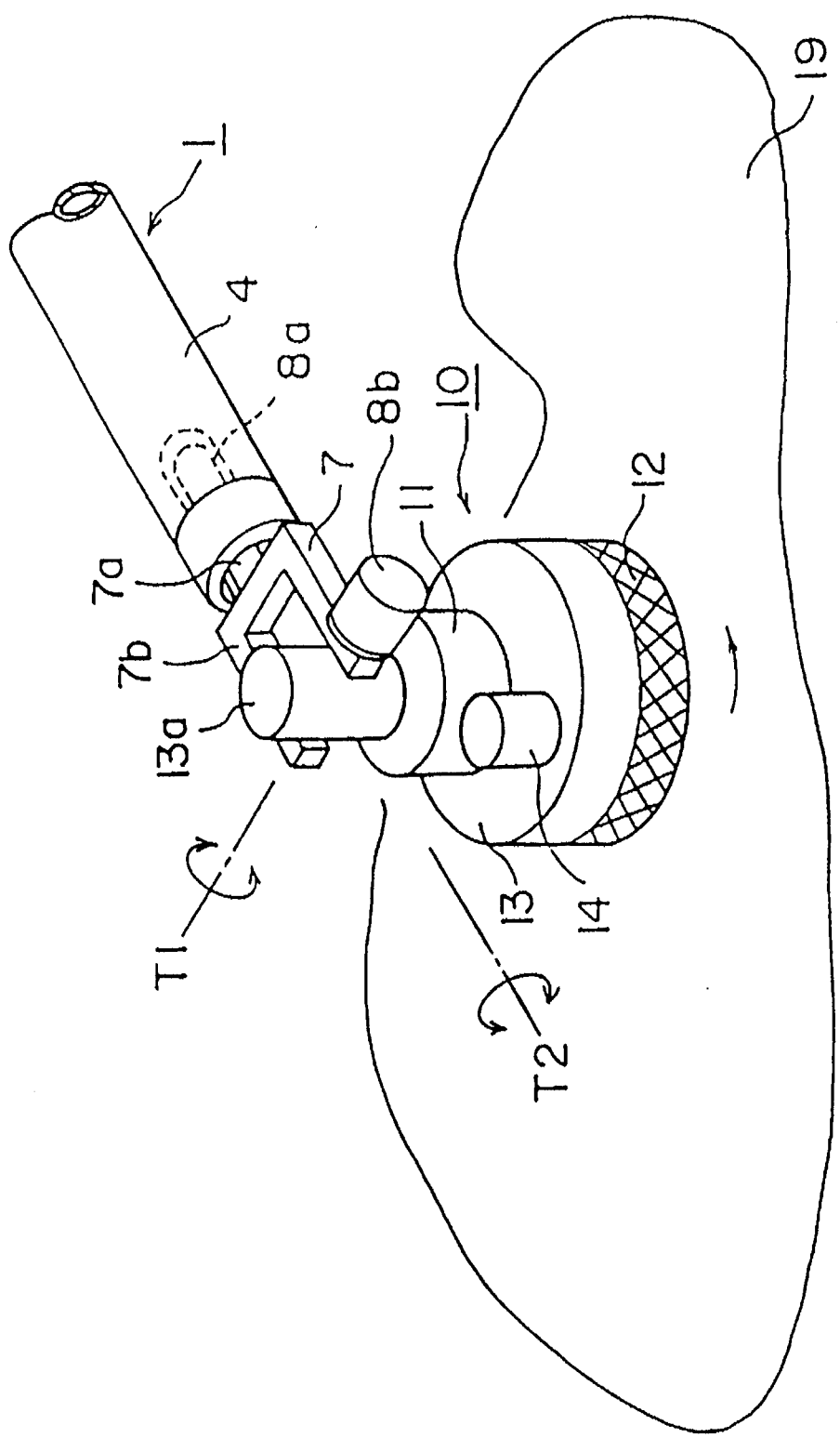
FIG. 2 is a perspective view showing a working unit of the first embodiment in accordance with the first aspect of the present invention.

As shown in FIG. 2, the universal coupling 7 comprises a shaft member 7a and a U-shaped member 7b. The shaft member 7a is connected to an end of the second arm 4 so that the shaft member 7a is rotated about the axis T2. At a connecting portion between the shaft member 7a and the second arm 4, a potentiometer 8a for detecting an angle of rotation of the shaft member 7a about the axis T2 is provided. At an end of the U-shaped member 7b, a working unit such as a polishing unit and a cleaning unit is provided.

When the position and shape of an objective working surface have been known in advance or when it is not necessary to accurately control the orientation of the working unit, the potentiometer is not required.

The working unit 10 comprises a working portion 12 such as a brush which is secured to a rotating axis (not shown in the figure), a mounting device to which the working portion 12 is provided, and a force detecting means 11 which is connected to the mounting device 13 and which detects the force with which the working portion 12 presses the objective working surface 19.

The mounting device 13 has a disc shape. The force detecting means 11 is connected to a shaft member 13a. To outer sides of the shaft member 13a, forked ends of the U-shaped member 7b are swingably connected. On one of the forked ends of the U-shaped member 7b, a potentiometer 8b for detecting swinging angle is provided. On an upper surface of the mounting device 13, a small motor 14 is mounted. By the small motor 14, a rotating shaft disposed at the center of the mounting device 13 is rotated through a gear mechanism (not shown in the figure). The diameter of the mounting device 13 is almost the same as that of the working portion 12.

The operation of the working apparatus of the first embodiment in accordance with the first aspect of the present invention will now be described.

By manually operating a joystick (not shown in the figure), the manipulator 1 is controlled so as to move the working portion 12 to a desired position of the objective working surface 19. The force detecting means 11 detects the force with which the working portion 12 presses against the objective working surface 19. A control unit (not shown in the figure) controls the manipulator 1 so that the pressing force is always kept in a predetermined range. Thus, while the working portion 12 is pressed against the objective working surface 19 with a proper force, the working portion 12 is moved over the objective working surface, thereby performing a cleaning work, a painting work, and so forth.

When the shape of the curved surface of the objective working surface 19 varies, the working portion 12 is brought into surface contact with the objective working surface 19 with a particular contacting area. Thus, the working portion 12 assumes an orientation for most intimate contact with the objective working surface 19. More specifically, the working portion 12 assumes an orientation such that the direction normal to the working portion 12 coincides with that of the objective working surface 19. In this case, force is applied from the working portion 12 to the universal coupling 7 through the mounting device 13. In accordance with the direction of the force, the universal coupling 7 rotates about the axes T1 and T2.

As described above, according to this embodiment, since the manipulator having three axes is used instead of a large manipulator having five to six axes and the working unit 10 is disposed at the end of the manipulator 1 through the universal coupling 7, the size of the working apparatus can be reduced.

In addition, since the working unit 10 has the force detecting means 11, the working portion 12 can press the objective working surface 19 with a predetermined force. Thus, the working apparatus can be safely operated.

Moreover, since the potentiometers 8a and 8b for detecting the angle of rotation of the universal coupling 7 are provided, along with information of angles of joints about the axes R1, R2, and R3 of the manipulator 1, even if the working apparatus is operated on the objective working surface 19 whose shape is complicated, the direction normal to the objective working surface 19 can be easily computed.

1.2 Second Embodiment

Figure 3:
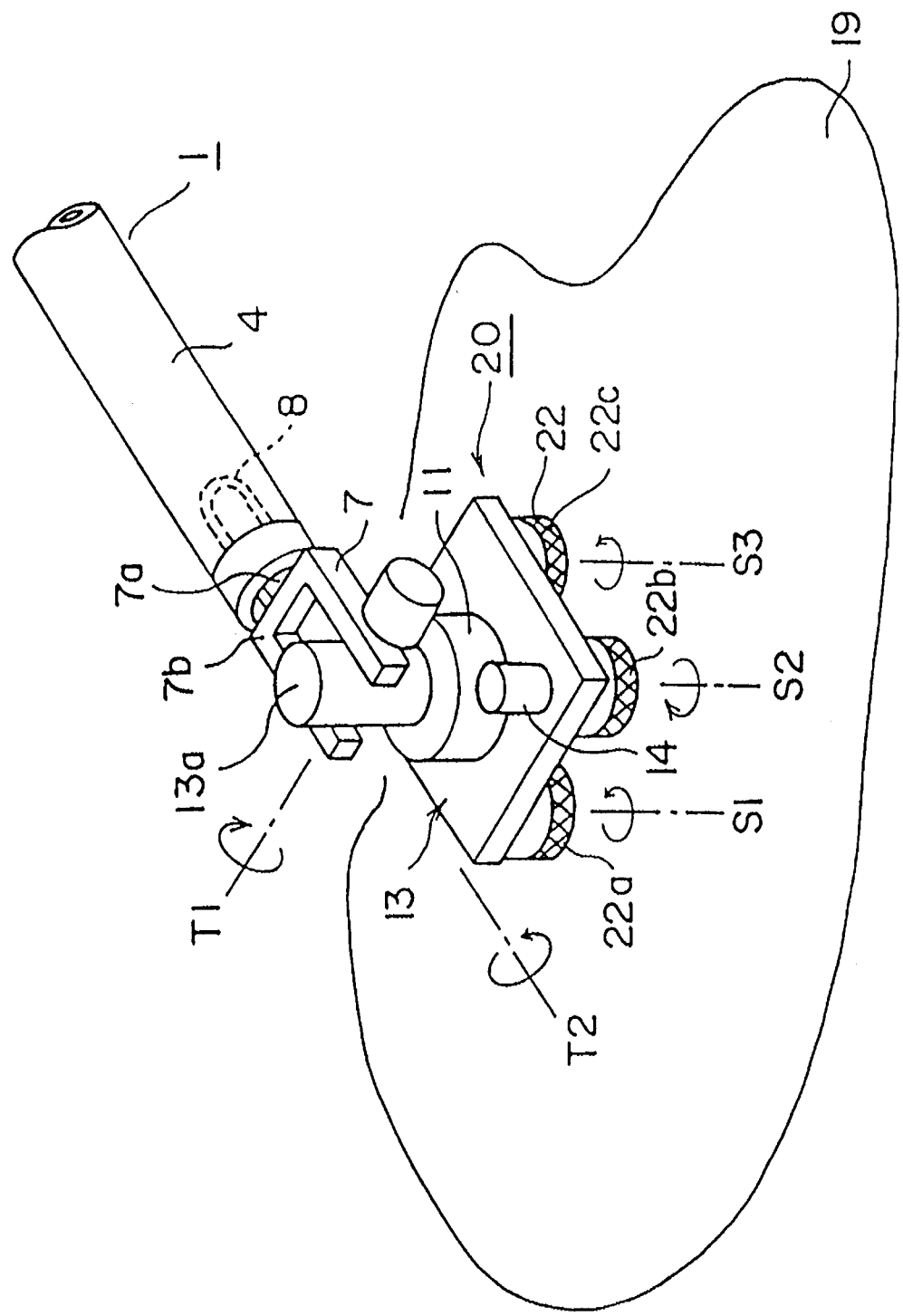
FIG. 3 is a perspective view showing a second embodiment of the working apparatus in accordance with the first aspect of the present invention.

With reference to FIG. 3, a second embodiment of the working apparatus in accordance with the first aspect of the present invention will now be described. Parts which are the same as those of the first embodiment shown in FIG. 2 are represented with the same reference numerals and description thereof will be omitted.

In FIG. 3, a working unit 20 comprises four rotating shafts S1, S2, S3, and S4 (S4 is not shown in the figure) supported by the mounting device 13, working portions 22a, 22b, 22c, and 22d (22d is not shown in the figure) mounted on these rotating shafts S1, S2, S3, and S4, and the force detecting means 11 which is connected to the mounting device 13 and which detects the force with which the working portions 22a, 22b, 22c, and 22d press the objective working surface 19.

The rotating shafts S1, S2, S3, and S4 are rotated by the small motor 14 mounted on the mounting device 13 through a gear mechanism (not shown in the figure). The gear mechanism is constructed so that the adjacent rotating shafts are reversely rotated. In other words, the direction of rotation of S1 is the reverse of that of S2; and so forth.

According to this second embodiment, since the working portions 22a, 22b, 22c, and 22d which are secured respectively to the rotating shafts S1, S2, S3, and S4 are rotated reversely to each other, the frictional forces of the working portions 22a, 22b, 22c, and 22d imparted to the objective working surface 19 can be mutually canceled. Thus, vibration or the like of the objective working surface 19 can be prevented.

In addition, since the working unit 20 has a plurality of small working portions 22a, 22b, 22c, and 22d, the orientation of the working unit 20 can be varied in accordance with the shape of the curved surface of the objective working surface 19.

1.3 Third Embodiment

A third embodiment of the working apparatus in accordance with the first aspect of the present invention will now be described with reference to FIGS. 4 and 5.

Parts which are the same as those of the first embodiment shown in FIG. 2 are designated by the same reference numerals and description thereof will be omitted. The construction of the third embodiment is the same as that of the first or second embodiments except that the supporting method of the universal coupling of the third embodiment differs from that of the first or second embodiment.

Figure 4:
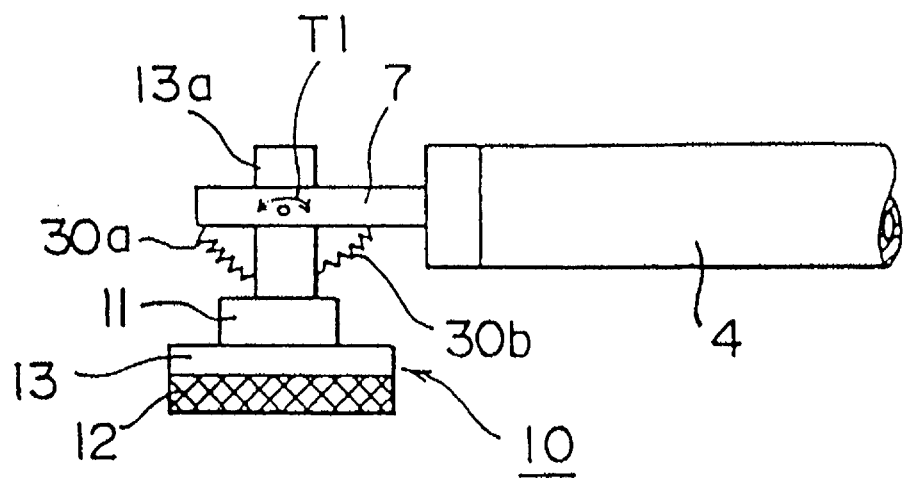
FIG. 4 is a side view showing a third embodiment of the working apparatus in accordance with the first aspect of the present invention.

In FIG. 4, one end of each of springs 30a and 30b is connected to the universal coupling 7, the other end thereof being connected to the shaft member 13a. The springs 30a and 30b prevent the shaft member 13a from rotating about the axis T1. In addition, it is possible to provide similar springs (not shown in the figure) which can prevent the U-shaped member 7b from rotating about the axis T2.

According to this third embodiment, while the working unit 10 is not operated, its unexpected vibration can be prevented. Thus, the universal coupling 7 can be stably supported.

Figure 5:
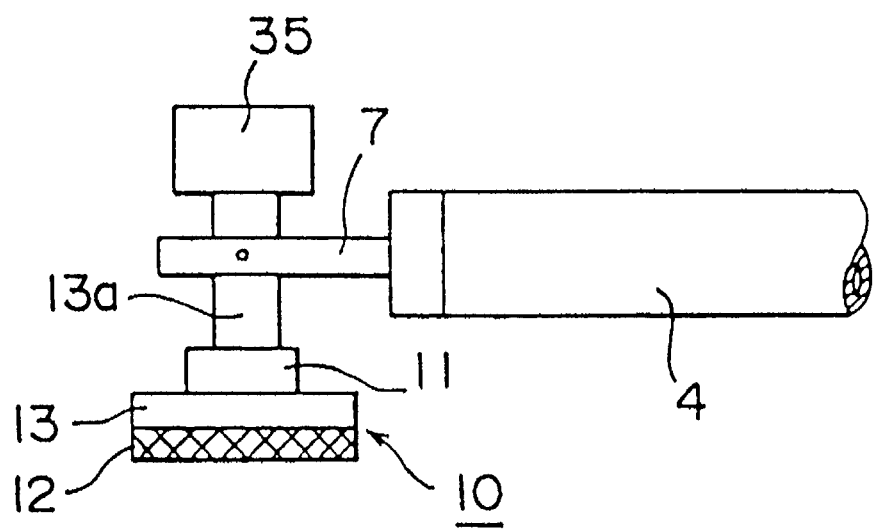
FIG. 5 is a side view showing another supporting method of the third embodiment in accordance with the first aspect of the present invention.

FIG. 5 is a plan view showing a construction where a counterweight 35 having adequate weight (for example, the weight of the mounting device 13 plus the weight of the working portion 12) is disposed at the end of the shaft member 13a. In this construction, since the total weight of the mounting device 13 and the working portion 12 is offset by the weight of the counterweight 35, the working portion 12 can be easily fitted to the objective working surface 19 and operated thereon regardless of what orientation the working portion 12 has.

1.4 Fourth Embodiment

A fourth embodiment of the working apparatus in accordance with the first aspect of the present invention will now be described with reference to FIGS. 6 and 7. Parts which are the same as those of the first embodiment shown in FIG. 2 are designated by the same reference numerals and description thereof will be omitted. According to this fourth embodiment, the universal coupling 7 is supported by another supporting method.

Figure 6:
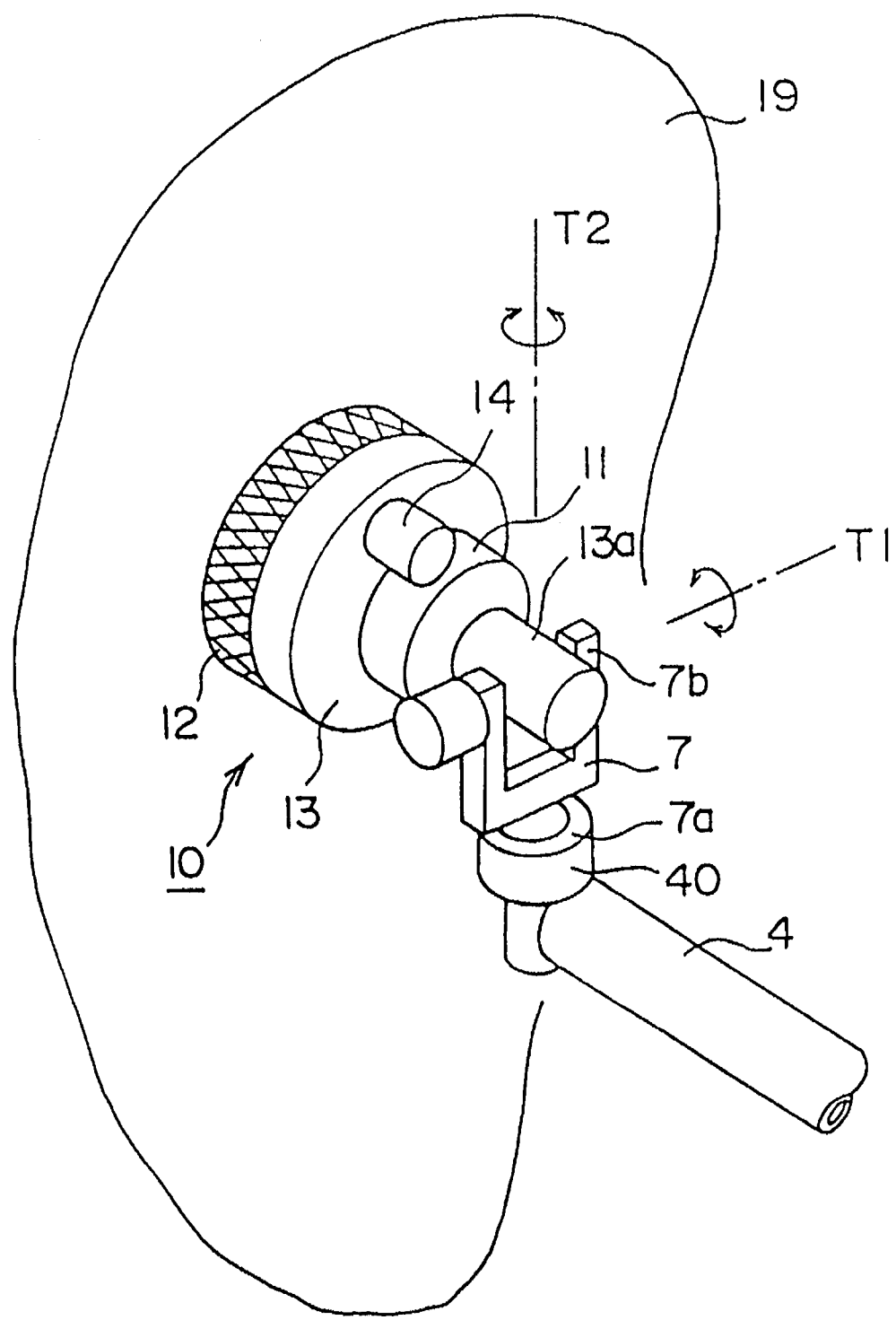
FIG. 6 is a perspective view showing a fourth embodiment of the working apparatus in accordance with the first aspect of the present invention.

In FIG. 6, at the end of the second arm 4 of the manipulator, a coupling jig 40 for mounting the universal coupling 7 in a desired orientation is provided. In other words, at an end of the coupling jig 40, the shaft member 7a of the universal coupling 7 is mounted so that the shaft member 7a rotates about the axis t2. At the other end of the coupling jig 40, the end of the second arm 4 is connected in the direction perpendicular to the axial direction of the shaft member 7a.

According to the fourth embodiment, since the coupling jig 40 is provided, the working unit 10 can be oriented correspondingly to a suitable direction in accordance with the orientation and the shape of the objective working surface 19. Thus, the working efficiency can be improved.

Figure 7:
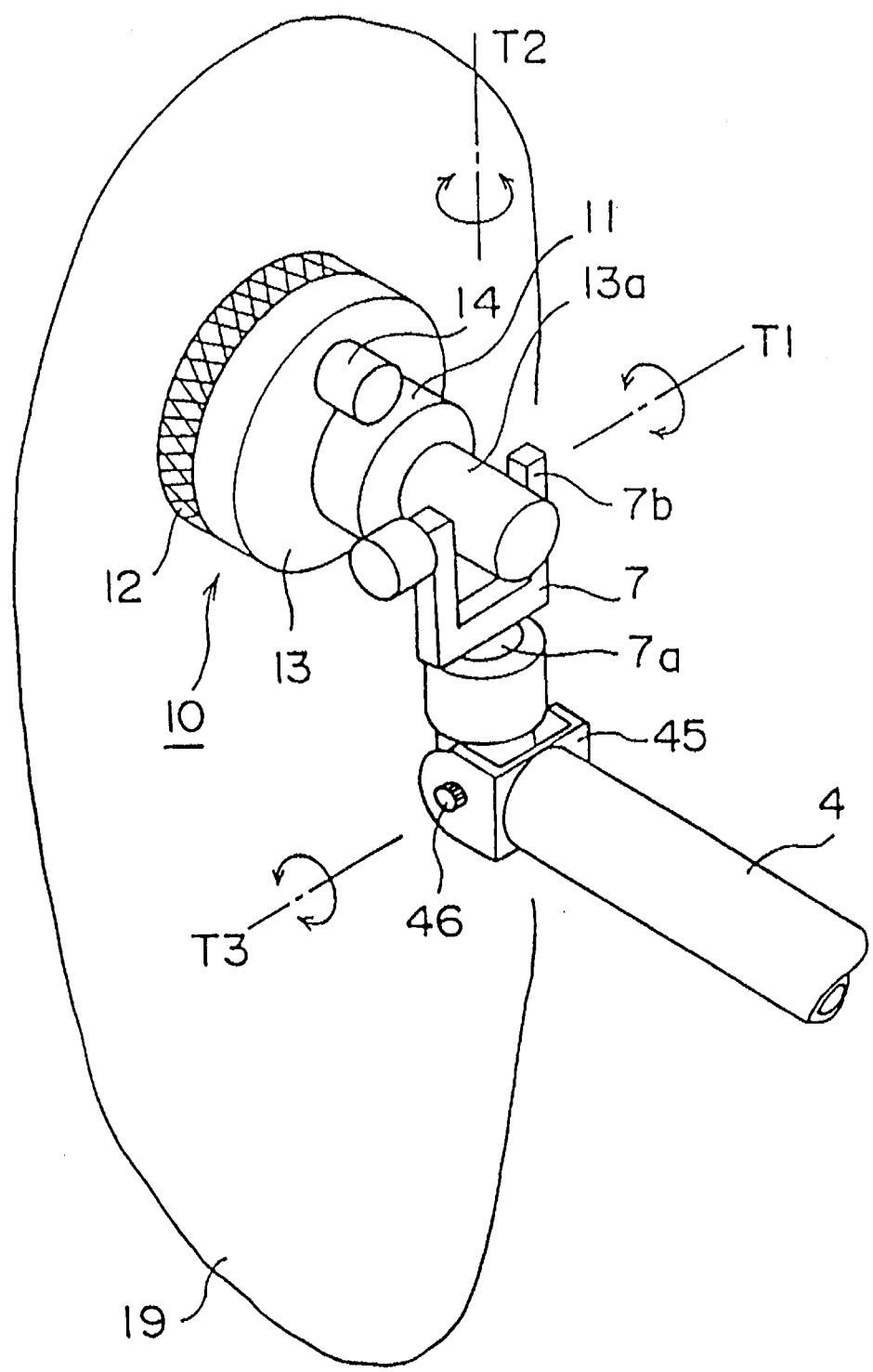
FIG. 7 is a perspective view showing another supporting method of the fourth embodiment in accordance with the first aspect of the present invention.

In FIG. 7, at the end of the second arm 4 of the manipulator, a coupling jig 45 is provided. The coupling jig 45 has a sliding shaft (not shown in the figure) which is coaxial to the axis T3. The shaft member 7a of the universal coupling 7 is pivoted by this sliding shaft. In accordance with the orientation of the curved surface of the objective working surface 19, the orientation of the shaft member 7a is set. Thereafter, by closing a clamping member 46, the shaft member 7a is secured to the coupling jig 45.

According to this fourth embodiment, since the coupling jig 45 having the sliding shaft coaxial to the axis T3 is provided, the orientation of the working unit 10 can be preset in accordance with the orientation and the shape of the objective working surface 19. In addition, the mounting direction of the universal coupling 7 can be easily changed in accordance with the orientation of a curved surface of the objective working surface 19. Thus, the working efficiency can be improved.

Moreover, when the sliding shaft is driven by a motor, the mounting direction can be easily changed while the working apparatus is operated. In addition, the axis T3 can be used as one of configuration axes of the working apparatus.

1.5 Fifth Embodiment

Figure 8:
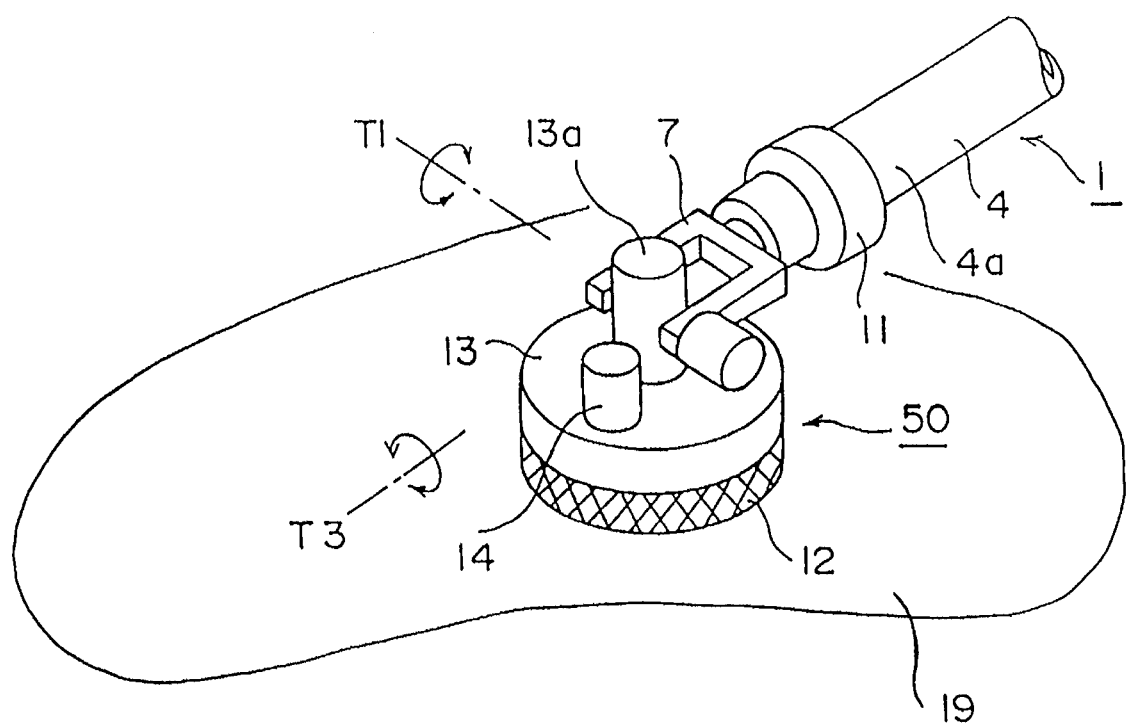
FIG. 8 is a perspective view showing a working unit of a fifth embodiment of the working apparatus in accordance with the first aspect of the present invention.

With reference to FIG. 8, a fifth embodiment of the working apparatus in accordance with the first aspect of the present invention will be described. Parts which are the same as those of the first embodiment shown in FIG. 2 are designated by the same reference numerals and description thereof will be omitted.

In the first embodiment, the force detecting means 11 is disposed on the working unit 10. In contrast, according to this fifth embodiment, as shown in FIG. 8, the force detecting means 11 is mounted at the end of the second arm 4 of the manipulator 1.

According to this embodiment, since the force detecting means 11 is disposed at the end of the second arm 4, the distance between a lower end 4a of the second arm 4 and the working portion 12 can be reduced. Thus, the working portion 12 can be stably pressed against the objective working surface 19.

1.6 Sixth Embodiment

Figure 9:
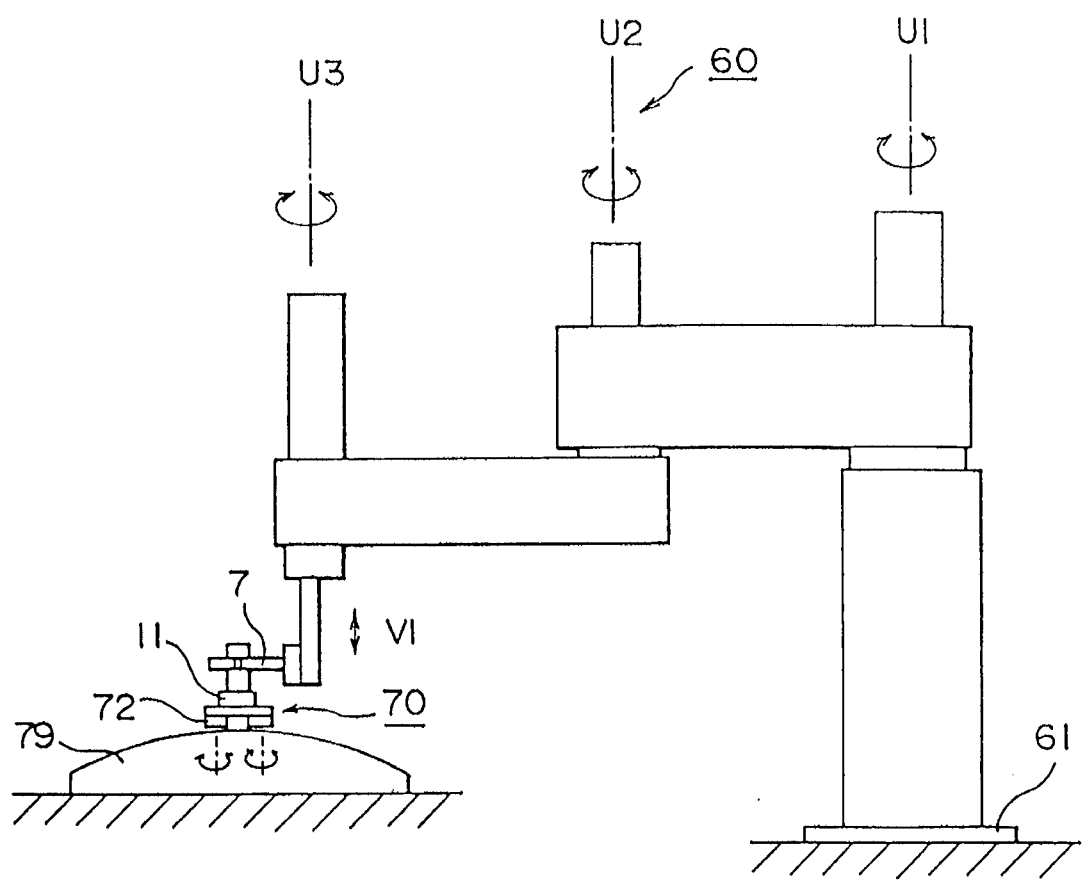
FIG. 9 is a schematic view of a sixth embodiment of the working apparatus in accordance with the first aspect of the present invention.

With reference to FIG. 9, a sixth embodiment of the working apparatus in accordance with the first aspect of the present invention will be described.

In FIG. 9, reference numeral 60 represents a SCARA (Selective Compliance Assembly) robot having four degrees of freedom and constructed of three rotating axes U1, U2, and U3 and one linear axis V1. The SCARA robot 60 is held by a base 61. A working unit 70 is disposed at an end of the SCARA robot 60 through the universal coupling 7. A plurality of rotating grindstones 72 are provided at an end of the working unit 70. The rotating grindstones 72 grind a curved surface of the objective working surface 79 in accordance therewith by the operation of the universal coupling 7. In accordance with an output signal which is sent from the force detecting means 11 provided in the working unit 70 to a control unit (not shown in the figure), the working unit 70 vertically moves along the linear axis V1. In addition, by the operation of the linear axis V1 in cooperation with other axes, the rotating grindstones 72 press against the objective working surface 79 with a constant force. As the construction of the SCARA robot, two to four axes can be provided so that the number of degrees of freedom becomes 2 to 4, respectively.

According to this sixth embodiment, since the working apparatus is provided with the working unit 70 through the universal coupling 7 at the end of the SCARA robot 60, the working apparatus can effectively perform a grinding work while pressing the rotating grindstones 72 against the objective working surface 79 with a constant force. In addition, as shown in FIGS. 6 and 7, when the coupling jig is provided and the rotating axis of the rotating grindstones 72 is inclined in accordance with the orientation of a curved surface of the objective working surface 79, the working efficiency can be further improved.

1.7 Seventh Embodiment

Next, with reference to FIGS. 10 to 12, a seventh embodiment of the working apparatus in accordance with the first aspect of the present invention will be described.

Figure 10:
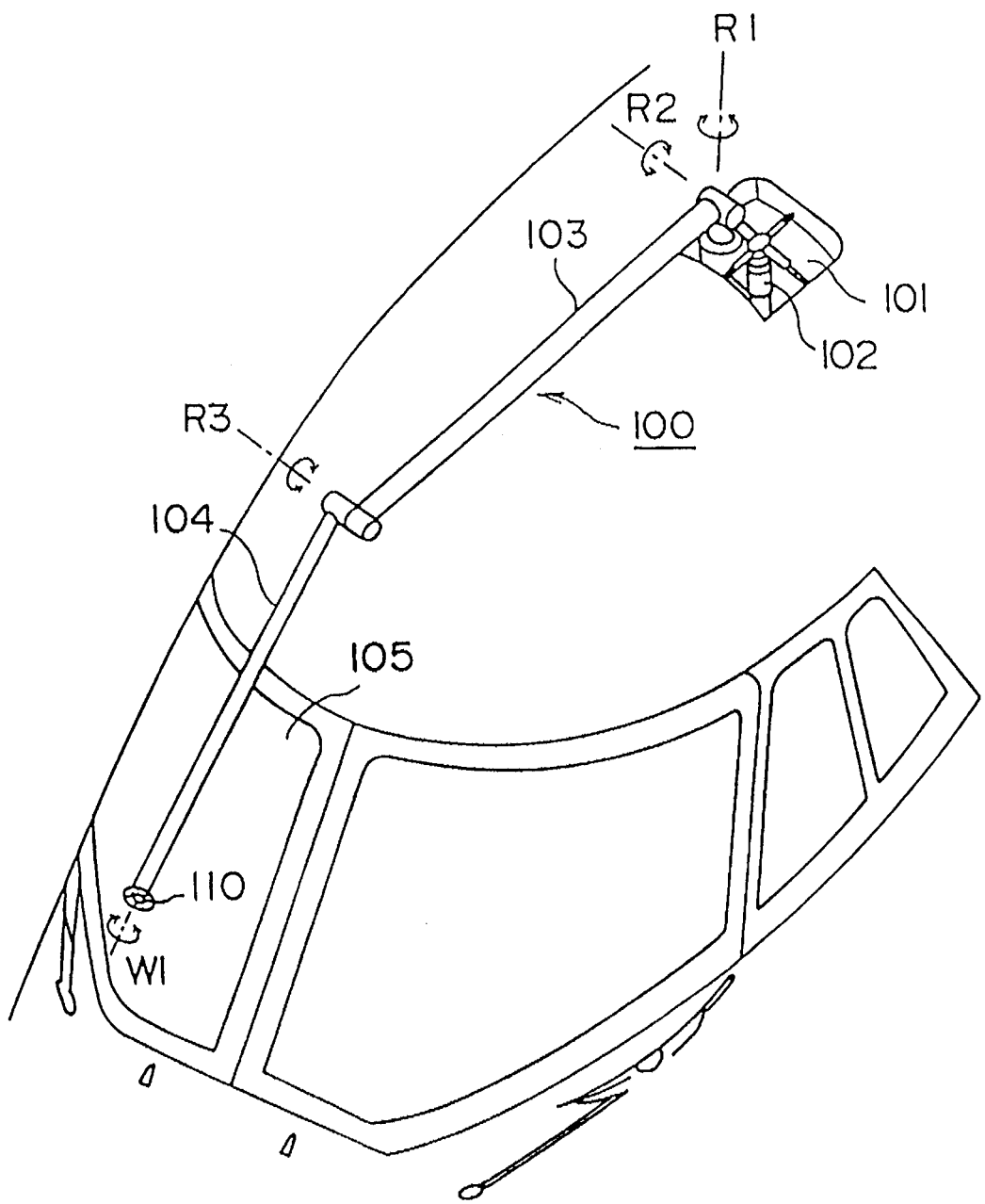
FIG. 10 is a perspective view showing a condition of work for cleaning a windshield of an aircraft of a seventh embodiment of the working apparatus in accordance with the first aspect of the present invention.

FIG. 10 is a perspective view showing a condition of the working apparatus which performs a cleaning work on a windshield of a cockpit of an aircraft. In this figure, the manipulator 100 is a multi-jointed manipulator having three joint axes R1, R2, and R3 as the basic configuration. A base portion of the manipulator 100 is held by a holding jig 102 disposed at a hatch opening portion (crew overhead hatch opening portion) 101 of the aircraft. The manipulator has a first arm 103 and a second arm 104. A working unit 110 is provided at the outer end of the second arm 104.

Figure 11:
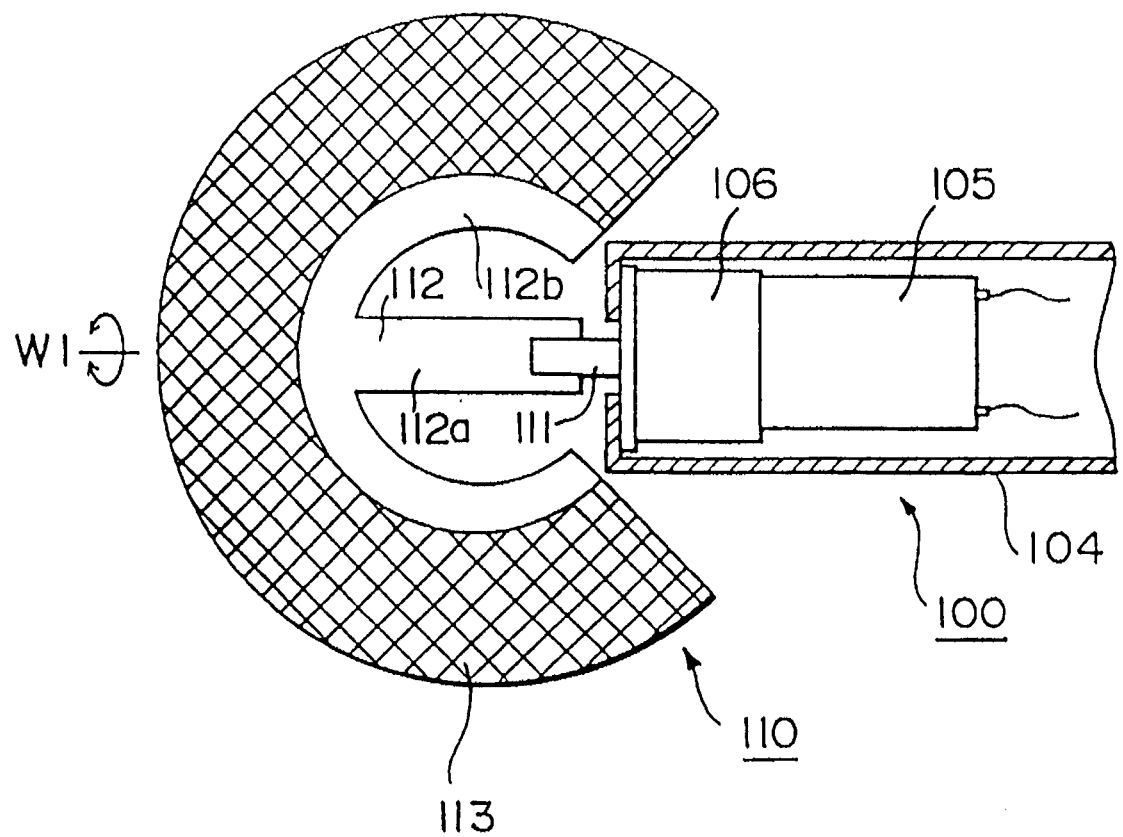
FIG. 11 is a sectional view showing a working unit of the seventh embodiment of the working apparatus in accordance with the first aspect of the present invention.

As shown in FIG. 11, the working unit 110 has a frame member 112 secured to a rotating shaft 111 disposed at the outer or working end of the second arm 104 and a working portion provided outside the frame member 112. The frame member 112 has a frame member shaft portion 112a secured to the rotating shaft 111 and a spherical portion 112b connected to the frame member shaft portion 112a. The working portion 113 is made of a sponge material disposed outside the spherical portion 112b. The external shape of the working portion 113 is spherical.

A motor 105 is provided in the second arm 104. The rotating shaft 111 is provided through a reduction gear 106 for adjusting the rotating speed thereof. Thus, the working unit 110 rotates about the axis W1 coaxial to the second arm 104.

Next, the operation of the working apparatus in accordance with the seventh embodiment will be described with reference to FIG. 12.

Figure 12:
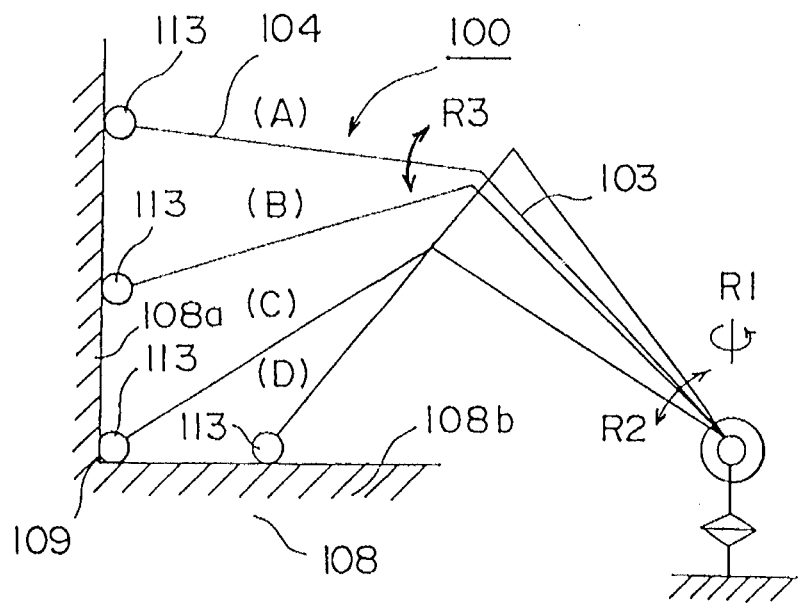
FIG. 12 is a schematic diagram showing a working condition of the seventh embodiment in accordance with the first aspect of the present invention.

In FIG. 12, an objective working surface 108 has surfaces 108a and 108b which are orthogonally disposed to each other. The surfaces 108a and 108b form a corner portion 109. The manipulator 100 successively moves the working portion 113 from position (A), to position (B), to position (C), to position (D) so that the working portion 113 presses against the objective working surface 108 with a constant force.

In this case, since the working portion 113 is spherical, even if there is the corner portion 109 on the objective working surface 108, some part of the working portion 113 always presses against the objective working surface 108. Thus, the manipulator 100 does not need a large change of the orientation of the working portion 113 to fit the working portion 113 to the objective working surface 108. Therefore, the arms 103 and 104 of the manipulator 100 are not improperly oriented. Thus, even if there is a corner portion 109 on the objective working surface 108, the working apparatus can smoothly and continuously operate on the objective working surface 108.

Figure 50A:
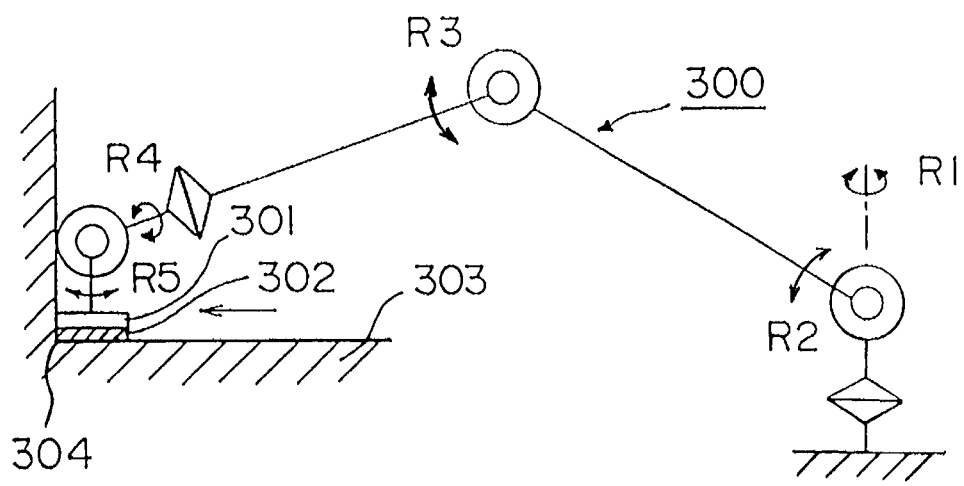
FIGS. 50A and 50B are schematic diagrams showing working conditions on orthogonal objective working surfaces on which the conventional working apparatus operates.
Figure 50B:
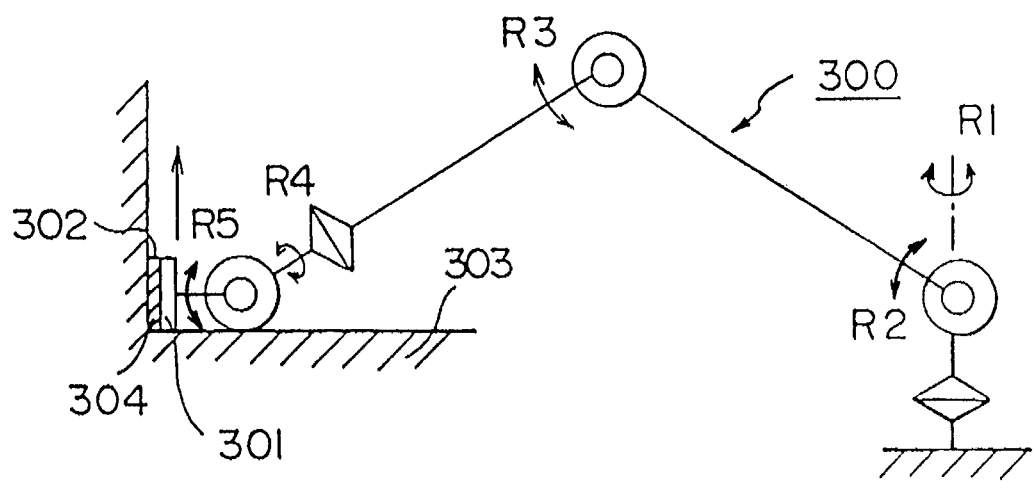

In addition, since the working portion 113 is spherical, a large change of orientation thereof is not necessary. Thus, since the manipulator 100 does not require the orientation axes R4 and R5 as shown in FIGS. 50A and 50B, the working apparatus is not improperly oriented. In addition, various controlling computations can be simplified. Consequently, a working apparatus which is light and inexpensive can be provided.

1.8 Eighth Embodiment

Now, with reference to FIG. 13, an eighth embodiment of the working apparatus in accordance with the first aspect of the present invention will be described. Parts which are the same as those of the seventh embodiment shown in FIG. 11 are designated by the same reference numerals and description thereof will be omitted.

Figure 13:
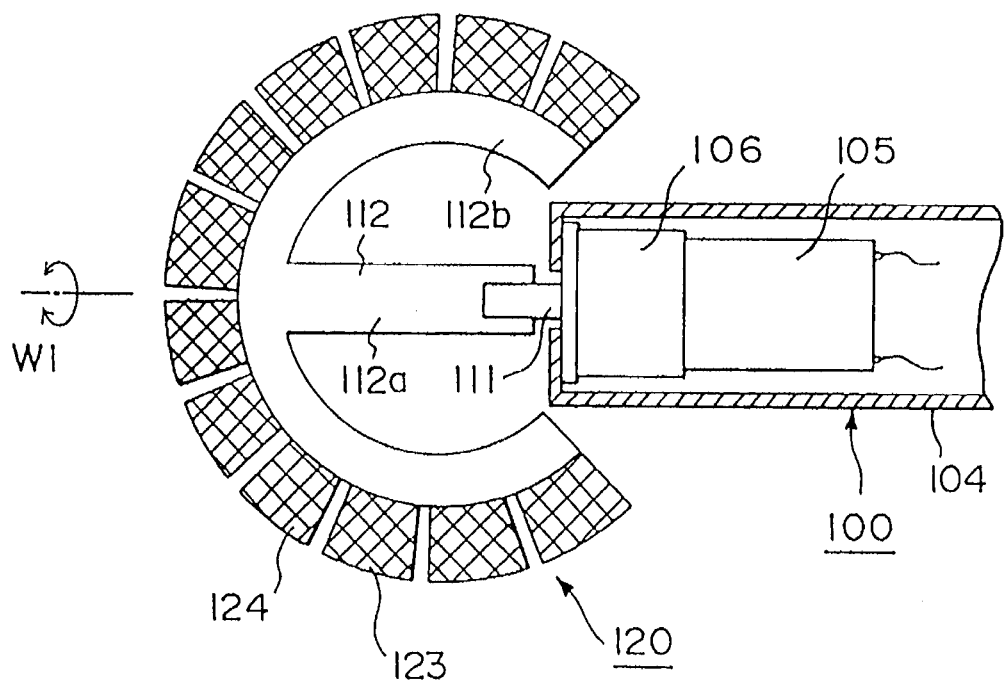
FIG. 13 is a sectional view showing a working unit of an eighth embodiment of the working apparatus in accordance with the first aspect of the present invention.

As shown in FIG. 13, a working portion 123 of a working unit 120 is constructed of a plurality of small sponge members 124 disposed on the frame member 112.

According to the eighth embodiment, since the small sponge members 124 can fit to sectional shapes of a curved surface of the objective working surface 108, the working unit 120 can be effectively operated. In addition, since worn sponge members 124 can be replaced with new ones, the working cost can be reduced.

1.9 Ninth Embodiment

Figure 14:
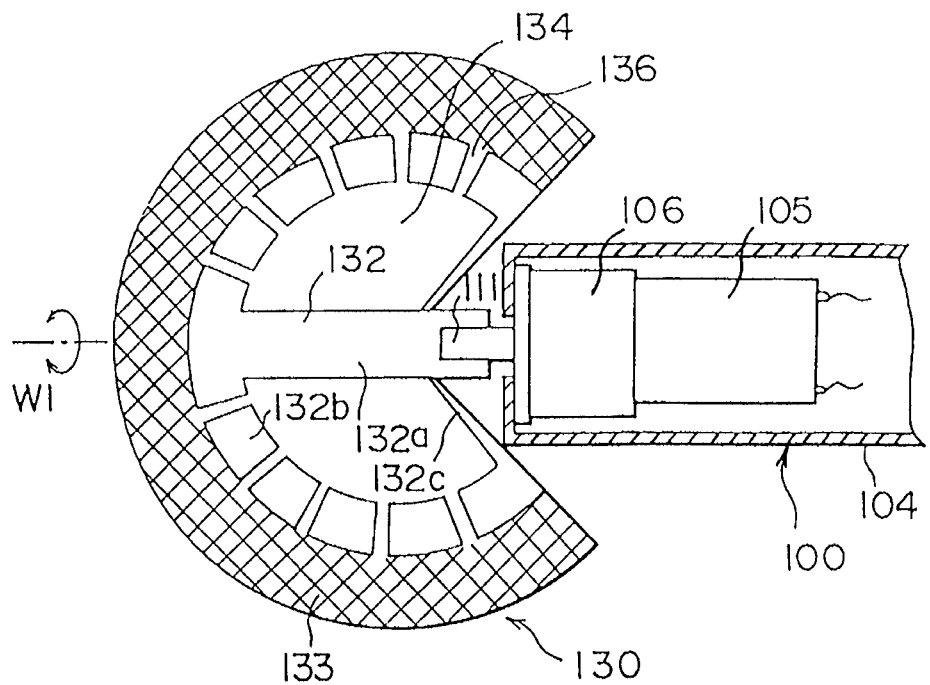
FIG. 14 is a sectional view showing a working unit of a ninth embodiment of the working apparatus in accordance with the first aspect of the present invention.

With reference to FIG. 14, a ninth embodiment of the working apparatus in accordance with the first aspect of the present invention will be described. Parts which are the same as those of the seventh embodiment shown in FIG. 11 are designated by the same reference numerals and description thereof will be omitted.

As shown in FIG. 14, a frame member 132 of the working unit 130 comprises a shaft member 132a, a spherical member 132b disposed outside the shaft member 132a, and a bottom member 132c disposed on a bottom side of the manipulator 100. The frame member 132 forms an inner space 134 for storing a working fluid such as a detergent, lubricant, and so forth. The working fluid can be charged from a port (not shown in the figure) disposed on the bottom member 132 when necessary. The spherical member 132b has a plurality of holes 136 from which the fluid is soaked out to the working portion 133 disposed outside the frame member 132.

According to this ninth embodiment, since the working fluid is soaked out to the working portion 133 while the working unit 130 is operated, the working efficiency thereof can be improved.

1.10 Tenth Embodiment

Next, with reference to FIG. 15, a tenth embodiment of the working apparatus in accordance with the first aspect of the present invention will be described. Parts which are the same as those of the seventh embodiment shown in FIG. 11 are designated by the same reference numerals, and description thereof will be omitted.

Figure 15:
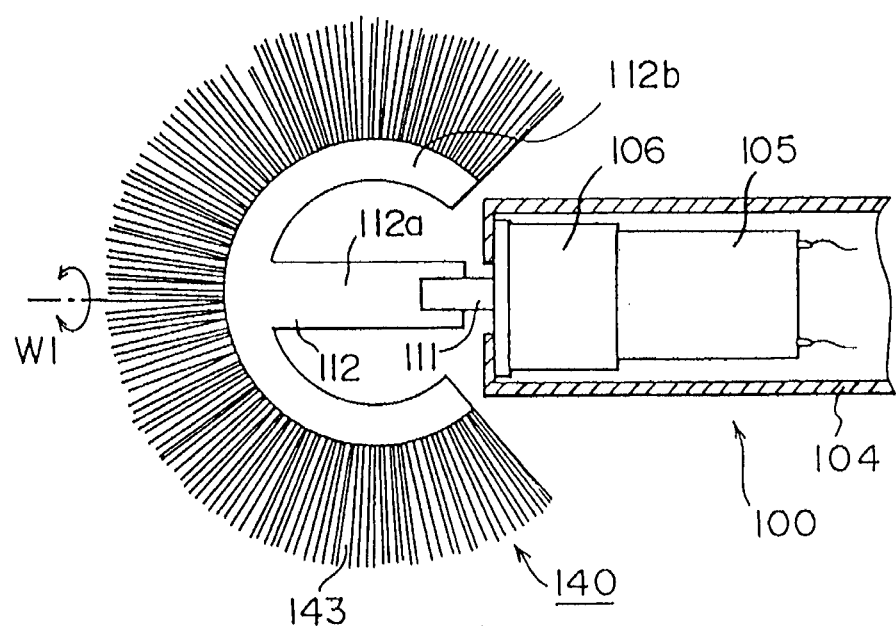
FIG. 15 is a sectional view showing a working unit of a tenth embodiment of the working apparatus in accordance with the first aspect of the present invention.

As shown in FIG. 15, a working portion 143 of a working unit 140 is comprises a brush member disposed outside the frame member 112.

The tenth embodiment is preferable in the case where the objective working surface 108 (see FIG. 12) is painted by the brush member rather than the sponge members. In addition, by selecting the thickness, length, and so forth of the brush member, the working portion 143 most suitable for the material of the objective working surface 108 and work type thereof can be easily formed.

1.11 Eleventh Embodiment

With reference to FIGS. 16A and 16B, an eleventh embodiment of the working apparatus in accordance with the first aspect of the present invention will be described. Parts which are the same as those of the seventh embodiment shown in FIG. 11 are designated by the same reference numerals, and description thereof will be omitted. FIG. 16A is a cross-sectional view of a working unit 150, this view being taken along line 16A—16A of FIG. 16B. FIG. 16B is a side sectional view of FIG. 16A.

In FIGS. 16A and 16B, a working portion 153 of the working unit 150 has a cylindrical shape. A bottom surface 153a and a side surface 153b are connected with a smoothly curved surface 153c. A frame member 152 comprises a frame shaft portion 152a secured to the rotating shaft 111 and a cylindrical tube member 152b connected to the frame shaft portion 152a. The working portion 153 is disposed on the tube member 152b. The working portion 153 may be constructed of either a sponge or a brush.

The eleventh embodiment is preferable in the case where the objective working surface 108 (see FIG. 12) does not fully fit the working portion 153, but partially fit the bottom surface 153a or the side surface 153b.

1.12 Twelfth Embodiment

Figure 17:
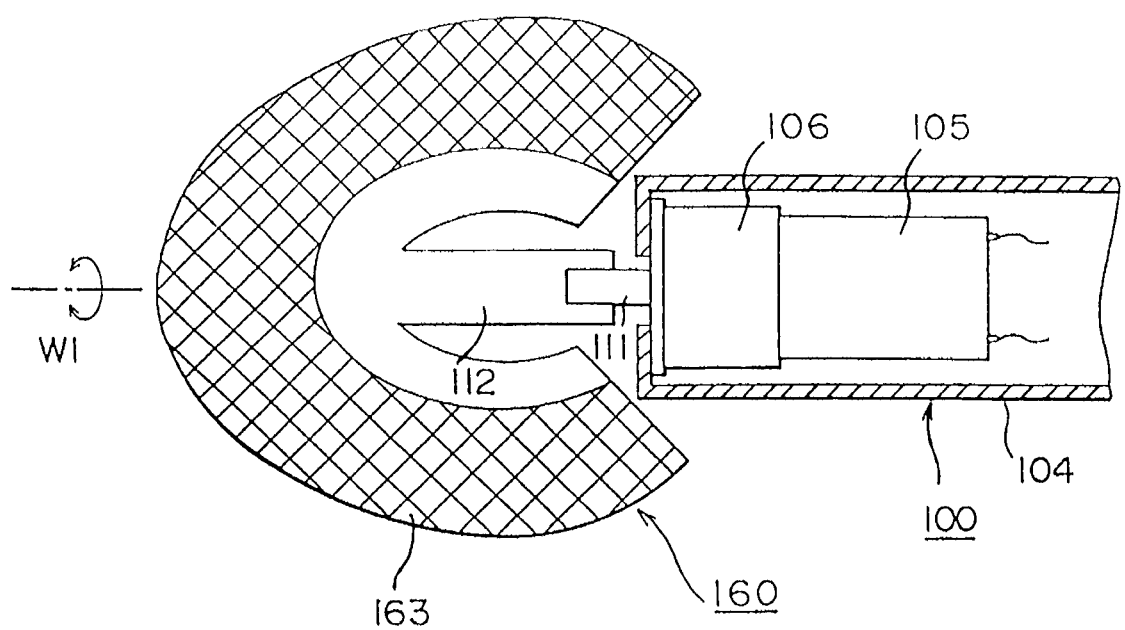
FIG. 17 is a sectional view showing a working unit of a twelfth embodiment of the working apparatus in accordance with the first aspect of the present invention.

With reference to FIG. 17, a twelfth embodiment of the working apparatus in accordance with the first aspect of the present invention will be described. Parts which are the same as those of the seventh embodiment shown in FIG. 11 are designated by the same reference numerals and description thereof will be omitted.

As shown in FIG. 17, a working portion 163 of a working unit 160 is disposed outside the frame member 112. The working member 163 has an ellipsoidal shape.

The shape of the working portion 163 in accordance with this twelfth embodiment is intermediate between the shape of the working portion 113 shown in FIG. 11 and the shape of the working portion 153 shown in FIGS. 16A and 16B. The longitudinal section of the working portion 163 is elliptical. The working unit 160 of this embodiment can be used in accordance with the shape of a curved surface of the objective working surface 108 (see FIG. 12).

1.13 Thirteenth Embodiment

Figure 18A:
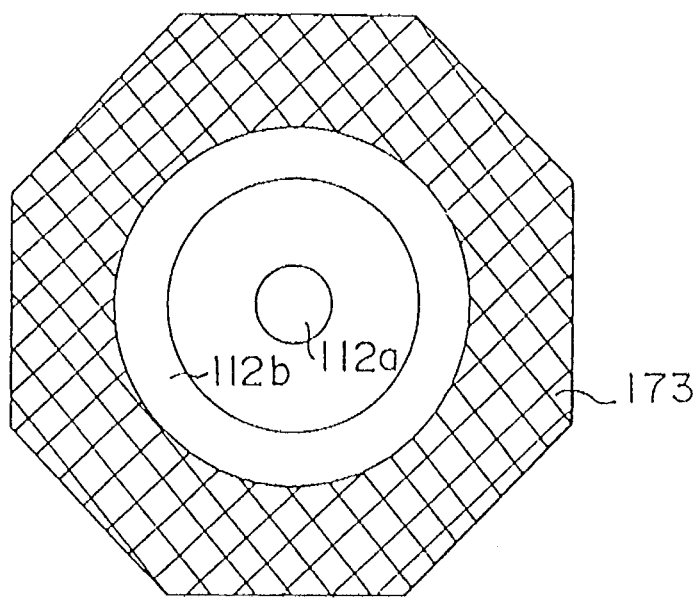
FIG. 18A is a sectional view showing a working unit of a thirteenth embodiment of the working apparatus in accordance with the first aspect of the present invention.
Figure 18B:
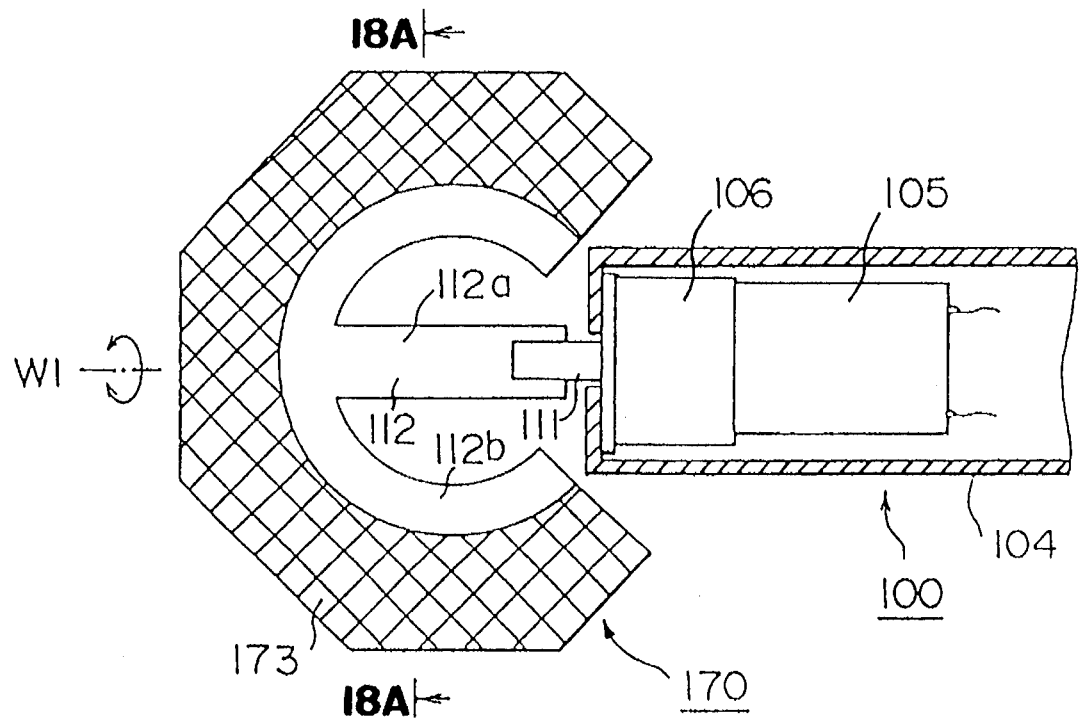
FIG. 18B is a side sectional view of FIG. 18A.

With reference to FIGS. 18A and 18B, a thirteenth embodiment of the working apparatus in accordance with the first aspect of the present invention will be described. Parts which are the same as those of the seventh embodiment shown in FIG. 11 are designated by the same reference numerals, and description thereof will be omitted. FIG. 18A is a cross-sectional view of a working unit 170, the view being taken along line 18A—18A of FIG. 18B. FIG. 18B is a side sectional view of FIG. 18A.

As shown in FIGS. 18A and 18B, a working portion 173 in accordance with the thirteenth embodiment has an angular shape.

The working unit 170 of this embodiment can be used in accordance with the shape of a curved surface of the objective working surface (see FIG. 12) similarly as the working unit 160 of the twelfth embodiment shown in FIG. 17.

1.14 Fourteenth Embodiment

Figure 19:
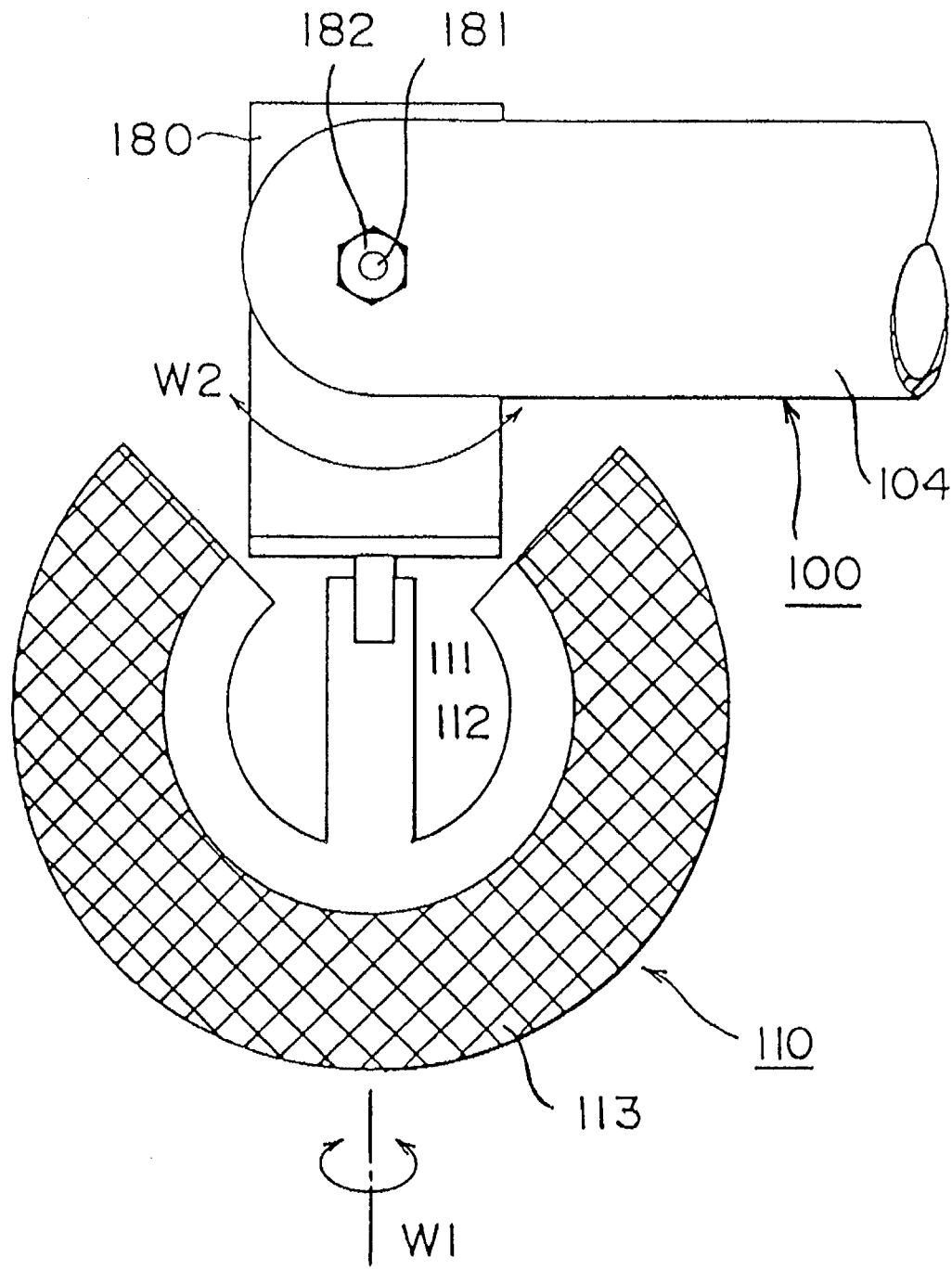
FIG. 19 is a sectional view showing a working unit of a fourteenth embodiment of the working apparatus in accordance with the first aspect of the present invention.

With reference to FIG. 19, a fourteenth embodiment of the working apparatus in accordance with the first aspect of the present invention will be described. Parts which are the same as those of the seventh embodiment shown in FIG. 11 are designated by the same reference numerals, and description thereof will be omitted.

In FIG. 19, a tube member 180 is disposed at the end of the second arm 104 and pivoted about a shaft 181. The tube member 180 is rotatable in the direction of W2 shown in FIG. 19. The tube member 180 can be secured at a desired angle by tightening a clamping member 182. In addition, the tube member 180 accommodates the motor 105 and the reduction gear 106 (see FIG. 11).

According to this fourteenth embodiment, since the tube member 180 is rotatable about the shaft 181, the rotating shaft 111 can have a desired angle relative to the second arm 104. Thus, according to this embodiment, the manipulator 100 can be prevented from colliding with the objective working surface 108 (see FIG. 12) and other obstacles.

1.15 Fifteenth Embodiment

Figure 20:
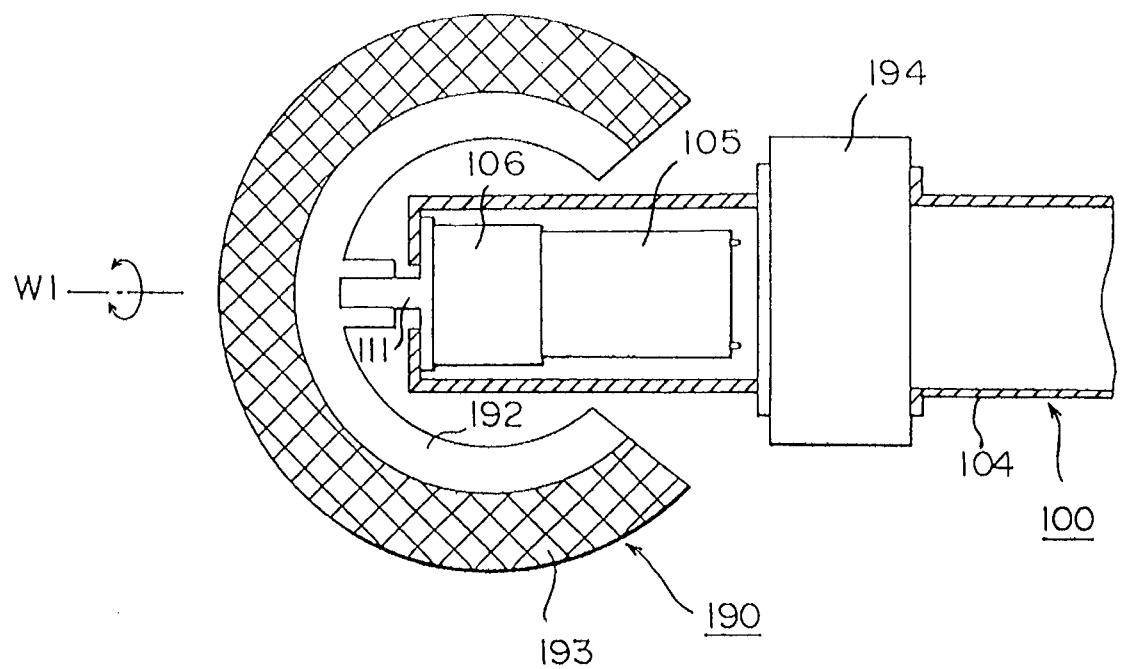
FIG. 20 is a sectional view showing a working unit of a fifteenth embodiment of the working apparatus in accordance with the first aspect of the present invention.

With reference to FIG. 20, a fifteenth embodiment of the working apparatus in accordance with the first aspect of the present invention will be described. Parts which are the same as those of the seventh embodiment shown in FIG. 11 are designated by the same reference numerals, and description thereof will be omitted.

In FIG. 20, a force detecting means 194 is disposed in the vicinity of the end of the second arm 104. The force detecting means 194 detects the force with which the working portion 193 presses against the objective working surface 108 in each of the directions of the three orthogonal axes X, Y, and Z. The working portion 193 has a spherical shape so that a measured result by the force detecting means 194 can be easily analyzed.

According to this fifteenth embodiment, by computing each directional component of the three axes with respect to the force obtained by the force detecting means 194, the relation between the direction of normal of the objective working surface 108 (see FIG. 12) and the orientation of the working portion 193 can be obtained. In accordance with the computed result, the manipulator 100 can be controlled so that the working portion 193 is pressed in the direction normal to the objective working surface 108 with a desired amount of force. In addition, the manipulator 100 can be easily controlled so that the working portion 193 is moved in the tangent direction of the objective working surface 108 at a constant speed. Thus, without the necessity of a complicated unit which teaches any shape of the objective working surface 108 to the manipulator 100, it can smoothly perform the same operation as the unit can.

Figure 22:
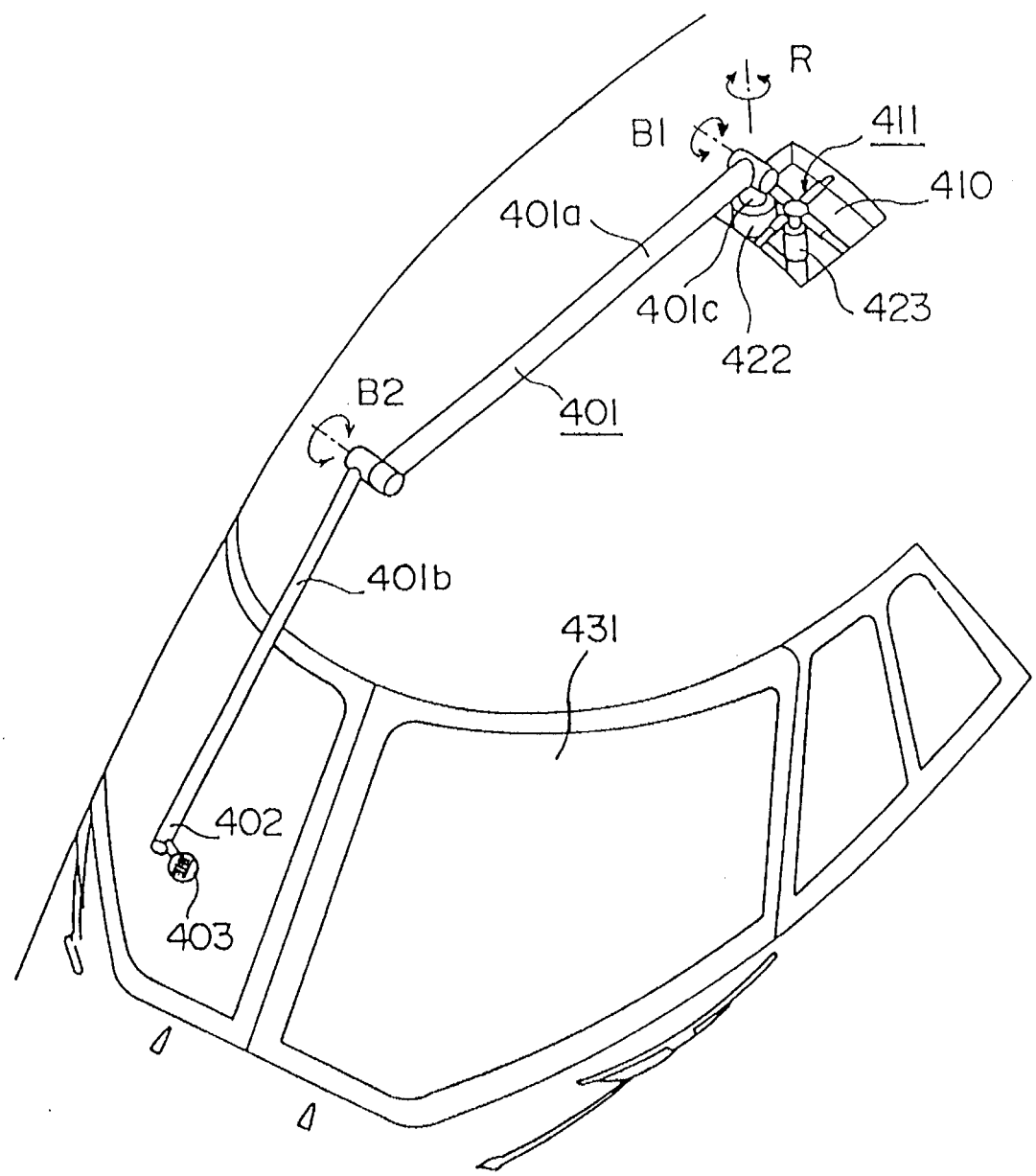
FIG. 22 is a perspective view showing a working condition of the first embodiment in accordance with the second aspect of the present invention.
Figure 23:
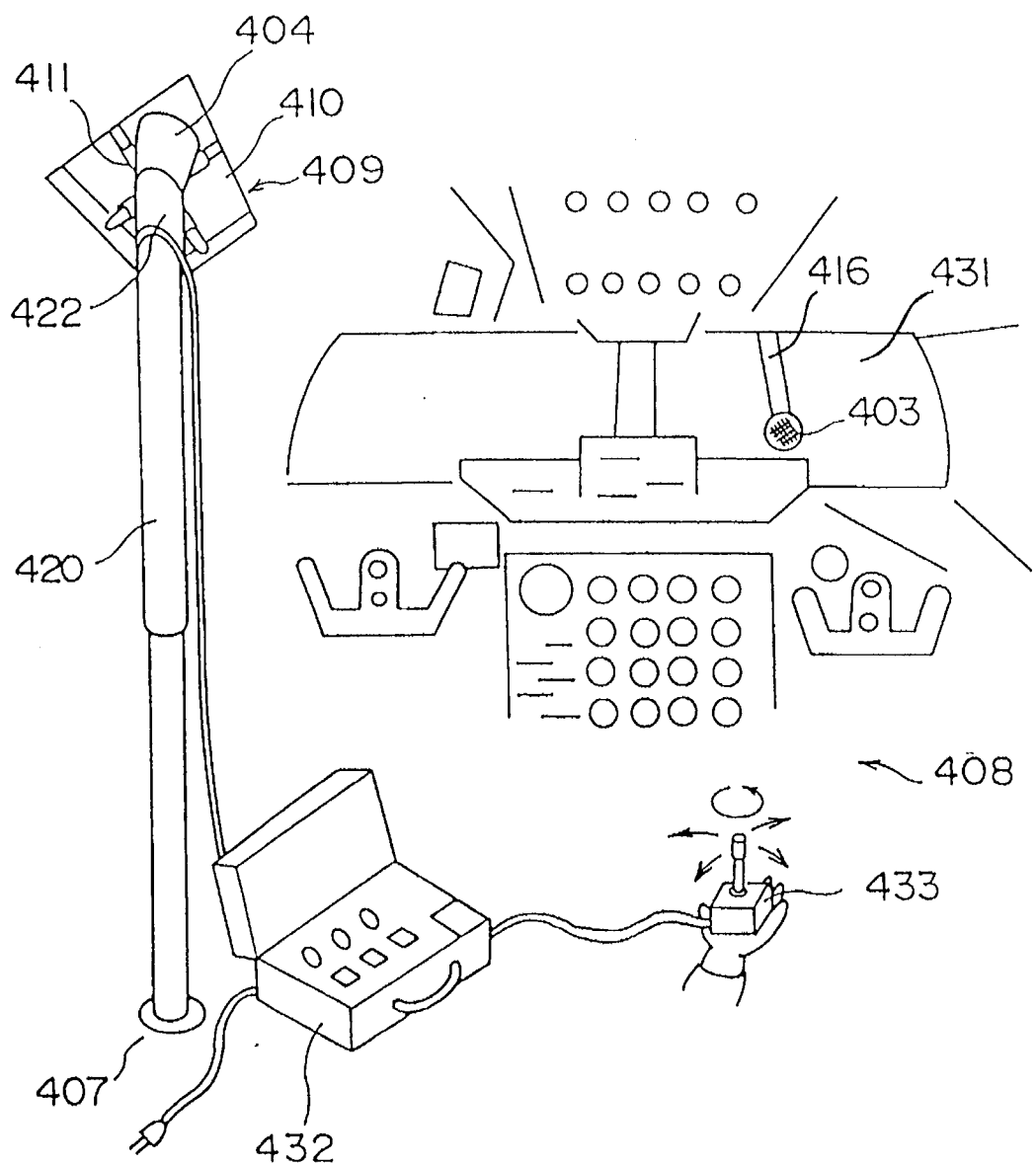
FIG. 23 is a perspective view showing an interior of an aircraft of the first embodiment in accordance with the second aspect of the present invention.
Figure 30:
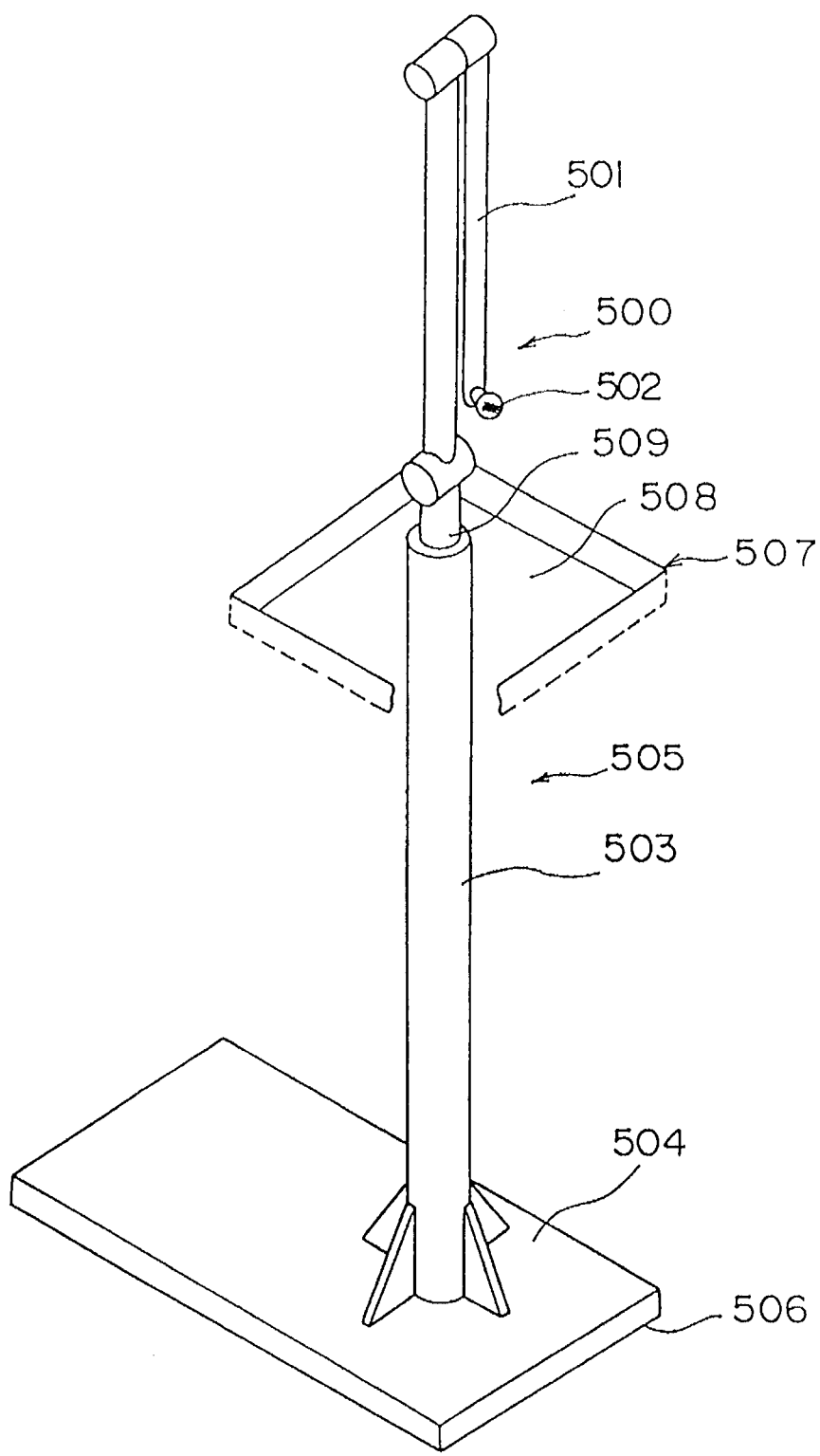
FIG. 30 is a perspective view showing a conventional working apparatus as a comparative example.

Section 2 Working apparatus in which a manipulator can be easily set 2.1 First Embodiment A first embodiment of a working apparatus in which a manipulator can be easily set in accordance with the second aspect of the present invention will now be described with reference to FIGS. 21 to 23 and FIG. 30. FIGS. 21 to 23 show the first embodiment. FIG. 30 shows a comparative example of the first embodiment.

In FIG. 21, the working apparatus comprises a manipulator 401 for mounting a working unit 403 such as a cleaning unit disposed at an end portion 402 of the manipulator 401 and a holding jig 406 for holding a base member 404 of the manipulator 401. This holding jig 406 is secured to a hatch opening portion 410 of a hatch 409 in the ceiling of a cockpit 408 of an aircraft.

In other words, the holding jig 406 has a holding leg 411 comprising a plurality of legs 413 inserted into pin holes 412 for securing a lift-up door (not shown in the figure) of the hatch 409. A stay 420 extends downwardly from a center member 414 of the holding leg 411. A supporting tube 421 for laterally supporting the base member 404 of the manipulator 401 through a side member 422 is attached to a base column 425 of the stay 420.

As described above, the holding leg 411 is constructed of a plurality of (for example four) legs 413. Each leg 413 comprises a fixed leg 415 and a movable leg 416. One end of the movable leg 416 is inserted into the pin hole 412. The other end of the movable leg 416 is inserted into the fixed leg 415. The movable leg 416 is resiliently tensed toward the direction of the pin hole 412 by a spring (not shown in the figure) disposed inside the fixed leg 415. Each fixed leg 415 is connected to the center member 414. Thus, as a whole, the holding leg 411 has a cross shape. Instead of using the spring, the movable leg 416 can be telescopically extended from the fixed leg 415 in accordance with a conventional method for extending the legs of camera tripod.

The stay 420 comprises a base column 425 connected to the-center member 414 and an extensible column 426 telescopically inserted into the base column 425. As the extensible column 426 moves forwardly and backwardly in the base column 422, the stay 420 is extended and contracted. A lower end of the extensible column 426 presses against a floor surface 407 of the cockpit, thereby supporting the center member 414.

The supporting tube 421 is movably attached to the base column 425 of the stay 420 provided at the center member 414 of the holding leg 411. One end of the side member 422 which is laterally extended from the axial center thereof is connected to the supporting tube 421. The other end of the side member 422 is secured to the base member 404 of the manipulator 401. Since the side member 422 is extended from the axial center of the supporting tube 421, the manipulator 401 can be raised on the aircraft without interference with the holding leg 411.

FIG. 22 is a perspective view showing a condition of the working unit 403 of the manipulator 401 which cleans a windshield 431 disposed in front of the cockpit 408. In this figure, the manipulator 401 is a vertical multi-joint type manipulator. This manipulator 401 has a bending axis B1 of the first arm 401a, a bending axis B2 of the second arm B2, and a rotating axis R of the rotating shaft 401c. In total, the manipulator 401 has three degrees of freedom.

FIG. 23 shows an interior of the cockpit 408. The manipulator 401 is connected to a controller 432 which comprises a driving power and a control computer. A cleaning work is performed automatically under control of a program or manually by using a joystick 433.

The operation of this embodiment of the above described construction will be described.

First, the manipulator 401 is positioned on the floor surface 407. After the extensible column 426 is removed from the base member 425, the supporting tube 421 is attached to and at a proper position of the base column 425 of the stay 420. Thereafter, the extensible column 426 is inserted into the base column 425.

Then, as described above, along with the holding jig 406, the manipulator 401 temporarily held by the holding jig 406 is raised on the floor surface 407 disposed below the hatch opening portion 410. Thereafter, the holding jig 406 is secured to the hatch opening portion 410.

To insert the holding leg 411 into the pin holes 412 of the hatch opening portion 410, the movable leg 416 is contracted to the inside of the fixed leg 415 so that the end of the movable leg 416 can be inserted into the pin hole 412. Thereafter, the contracted movable leg 416 is released. Thus, the movable leg 416 is resiliently tensed by the spring in the fixed leg 412. Thereby the movable leg 416 is inserted into the pin hole 412, and the holding leg 411 is secured to the hatch opening portion 410. During this operation, the base member 404 of the manipulator 401 is moved to the lowermost position of the stay 420. Moreover, the manipulator 401 is placed on the floor surface 407. In this case, the holding jig 406 can be easily secured to the hatch opening portion 410 without a negative affect of the weight of the manipulator 401.

Thereafter, the extensible column 426 is downwardly extended so that the end thereof presses against the floor surface 407 of the cockpit 408. In this condition, with a clamping member (not shown in the figure), the extensible column 426 is laterally secured to the base column 425.

Then, the first arm 401a and the second arm 401b are folded up so that they are disposed in parallel with the rotating shaft 401c. Next, the manipulator 401 is taken out from the aircraft through the hatch opening portion 410, care being taken so that the manipulator 401 does not collide with the leg 413 or the like. In this case, the manipulator 401 can be manually raised. Alternatively, the manipulator 401 can be raised by a manual hoist or an electric hoist.

Next, the supporting tube 421 is telescopically moved against the stay 420. The supporting tube 421 is attached to a proper position where a particular work can be performed by the manipulator 401.

In this condition, after cables of the manipulator 401 are connected to the controller 432, the particular work is performed by the manipulator 401.

According to this embodiment, since the holding jig 406 of the manipulator 401 of the working apparatus for aircraft is secured to the hatch opening portion 410, the base member 404 of the manipulator 401 can be stably held without the necessity of a large and heavy holding base.

In addition, since the base member 404 of the manipulator 401 is securely held in the vicinity of the hatch opening portion 410, the working fulcrum of the manipulator 401 is present in the vicinity of the hatch opening portion 410. Thus, in comparison with the comparative example where a manipulator 501 is held through a stay 503 by the holding base 104 disposed on the floor surface 407 as shown in FIG. 30, according to the present invention (FIG. 21), the distance between the position of the holding jig 406 which holds the manipulator 401 and the position of the working unit 403 can be significantly shortened. Thus, according to the present invention, the holding jig 406 has a resistance to the moment of the manipulator 401. In addition, while the manipulator 401 is operated, it is not easily susceptible to vibration. Therefore, the manipulator 401 can be accurately and stably operated.

Moreover, since the holding leg 411 of the holding jig 406 is secured by using the pin holes 412 for securing the lift-up door of the hatch 409, the manipulator 401 can be easily held on the aircraft without providing new holes.

Further, since the stay 420 has the extensible column 426 and the lower end of thereof presses against the floor surface 407 of the cockpit 408 so as to support the center member 414, even if the manipulator 401 is heavy, it can be satisfactorily supported by the stay 420. In this case, the load applied to the pin holes 412 can be reduced.

Furthermore, since the manipulator 401 can be moved vertically and guided by the stay 420 while the manipulator 401 is secured to the supporting tube 421, the manipulator 401 can be easily raised to as high as the height of a person. In addition, even if the manipulator 401 is exposed to a strong wind while it is raised, the manipulator 401 is guided by the stay 420. Thus, the stay 420 prevents the manipulator 401 from turning down and being damaged.

When the holding leg 411 and so forth are made of pipe members, the holding jig 406 can be satisfactorily lightened.

2.2 Second Embodiment

Next, with reference to FIG. 24, a second embodiment of the working apparatus in accordance with the second aspect of the present invention will be described.

Figure 24:
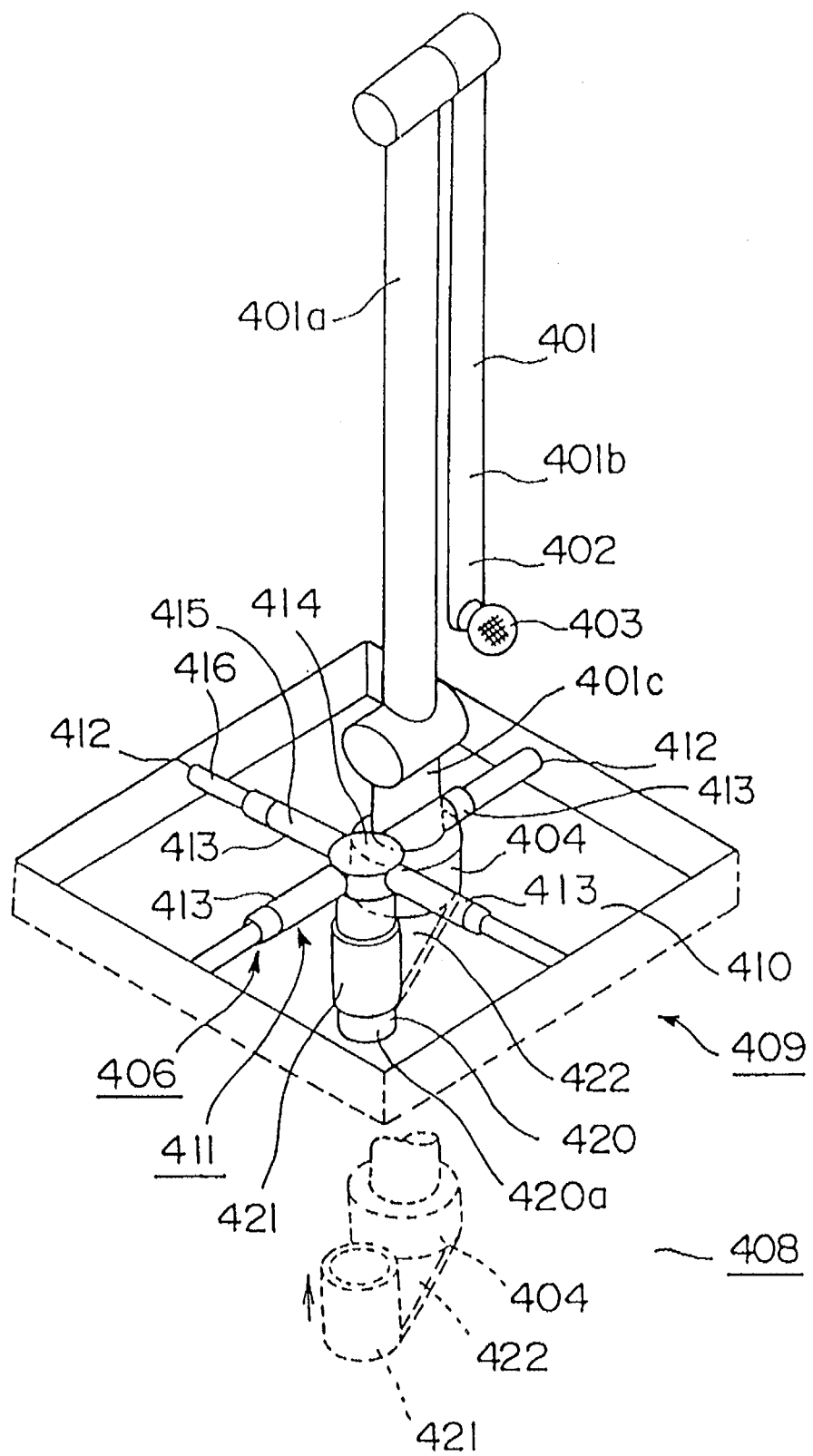
FIG. 24 is a perspective view showing a second embodiment of the working apparatus in accordance with the second aspect of the present invention.

Parts shown in FIG. 24 which are the same as those of the first embodiment shown in FIG. 21 are designated by the same reference numerals, and description thereof will be omitted.

The construction of the second embodiment is nearly the same as that of the first embodiment except that the construction of the stay 420 differs. In FIG. 24, the stay 420 is short. The supporting tube 421 which is not attached to the stay 420 and the base member 404 of the manipulator 401 secured to the supporting tube 421 through the side member 422 are designated by dot lines.

In the second embodiment, after the base member 404 of the manipulator 401 is secured to the side member 422 of the supporting tube 421, it is attached to the stay 420.

According to this embodiment, since the stay 420 is short, the space of the cockpit 408 can be effectively used in the same condition as the working apparatus is not set.

In addition, since the stay 420 is short, the working apparatus can be easily set and transported.

Moreover, according to this embodiment, since it is not necessary to extend the stay 420 which presses against the floor surface, the manipulator 401 can be easily raised. Thus, when no large load is applied to the pin holes 412, that is, the manipulator 401 is very light, this embodiment is further preferable. In this case, when the holding jig 406 and the manipulator 401 are integrated, the manipulator 401 can be secured to the hatch opening portion 410 with one operation. Thus, the working apparatus can be easily set.

2.3 Third Embodiment

Figure 25:
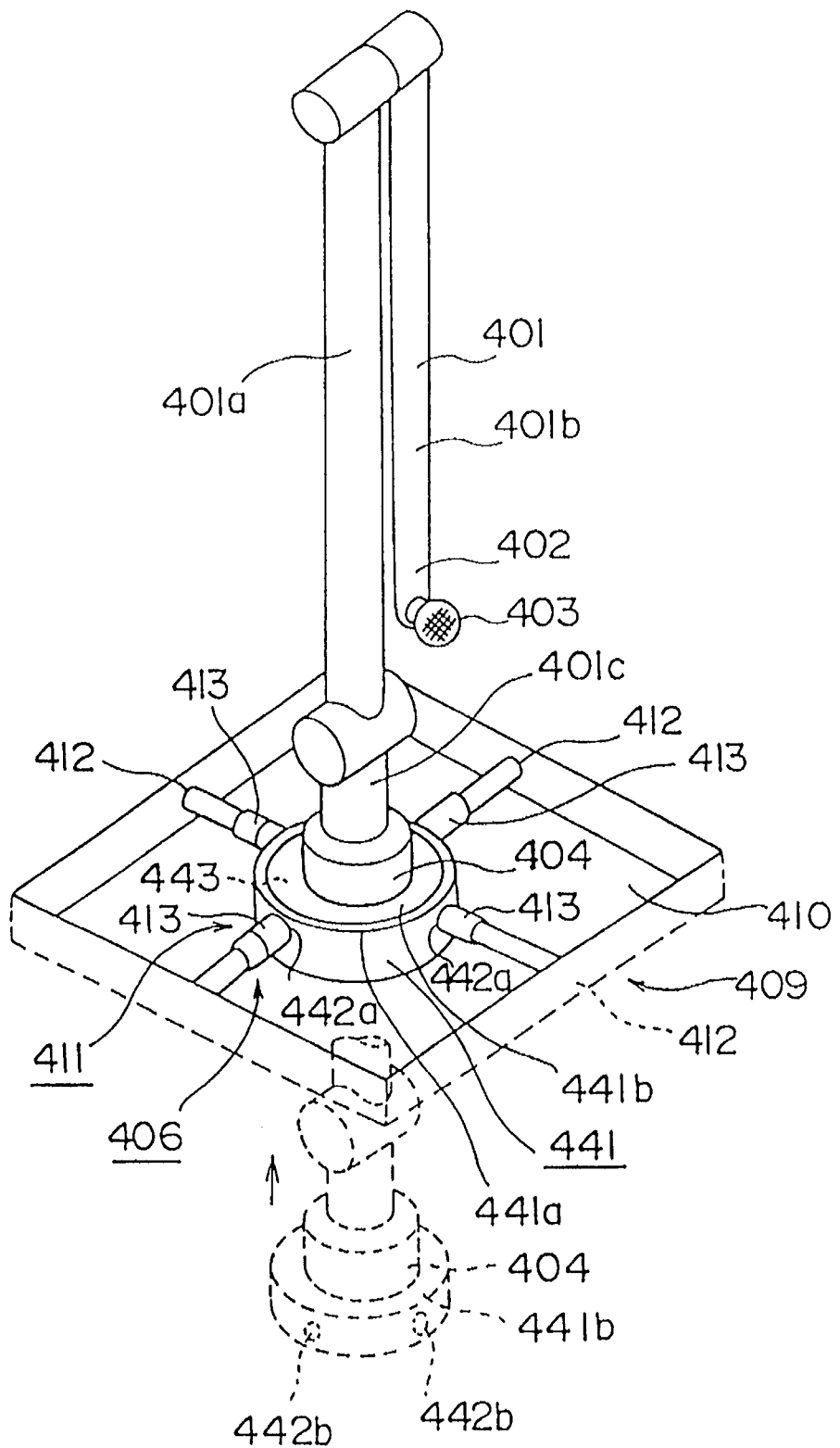
FIG. 25 is a perspective view showing a third embodiment of the working apparatus in accordance with the second aspect of the present invention.

With reference to FIG. 25, a third embodiment of the working apparatus in accordance with the second aspect of the present invention will now be described.

As shown in FIG. 25, the holding jig 406 in accordance with this embodiment comprises the holding leg 411 having a plurality (four) legs 413 attached to the pin holes 412 for securing the lift-up door of the hatch 409; and a holding ring 441, disposed at the center of the holding leg 411, for holding the base member 404 of the manipulator 401.

The holding ring 441 comprises an outer ring 441a and an inner ring 441b, each of which has a cylindrical shape. The inner ring 441b is inserted into the outer ring 441a. Each of the outer ring 441a and the inner ring 441b has four holes 442a and four holes 442b into which the legs 413 are inserted. The base member 404 of the manipulator 401 is inserted into an opening portion 443 of the inner ring 441b and held thereby.

Then, an operation of this embodiment in the above mentioned construction will be described.

First, the outer ring 441a of the holding ring 441 is secured to the hatch opening portion 410. In other words, the four legs 413 are inserted into the pin holes 412 and the holes 442a of the outer ring 441a. Thereafter, the outer ring 441a is secured at the center of the hatch opening portion 410. Next, the inner ring 441b is attached to the base member 404 of the manipulator 401. Then, the manipulator 401 is raised as shown by the arrow mark of FIG. 25 so that the arms 401a and 401b of the manipulator 401 pass through the outer ring 441a. Thereafter, the manipulator 401 is raised to a position where the inner ring 441b can be inserted into the outer ring 441a. Then, the manipulator 401 is slightly raised by a strong force. At this time, the inner end of each leg 413 which passes through the hole 442a of the outer ring 441a has a spherical shape. After the leg 413 is brought into contact with the outer wall of the inner ring 441b, the leg 413 is shrunk and then inserted into the hole 442b of the inner ring 441b by the force of a member (not shown in the figure) provided inside the leg 413. Thus, the manipulator 401 can be held by the holding jig 406.

According to this embodiment, the arms 401a and 401b of the manipulator 401 are inserted into the outer ring 441a and then set. Thus, even if the manipulator 401 is inclined in the middle of the setting operation thereof, since the manipulator 401 is supported by the outer ring 441a, the manipulator 401 can be prevented from turning down and being damaged.

2.4 Fourth Embodiment

Figure 26:
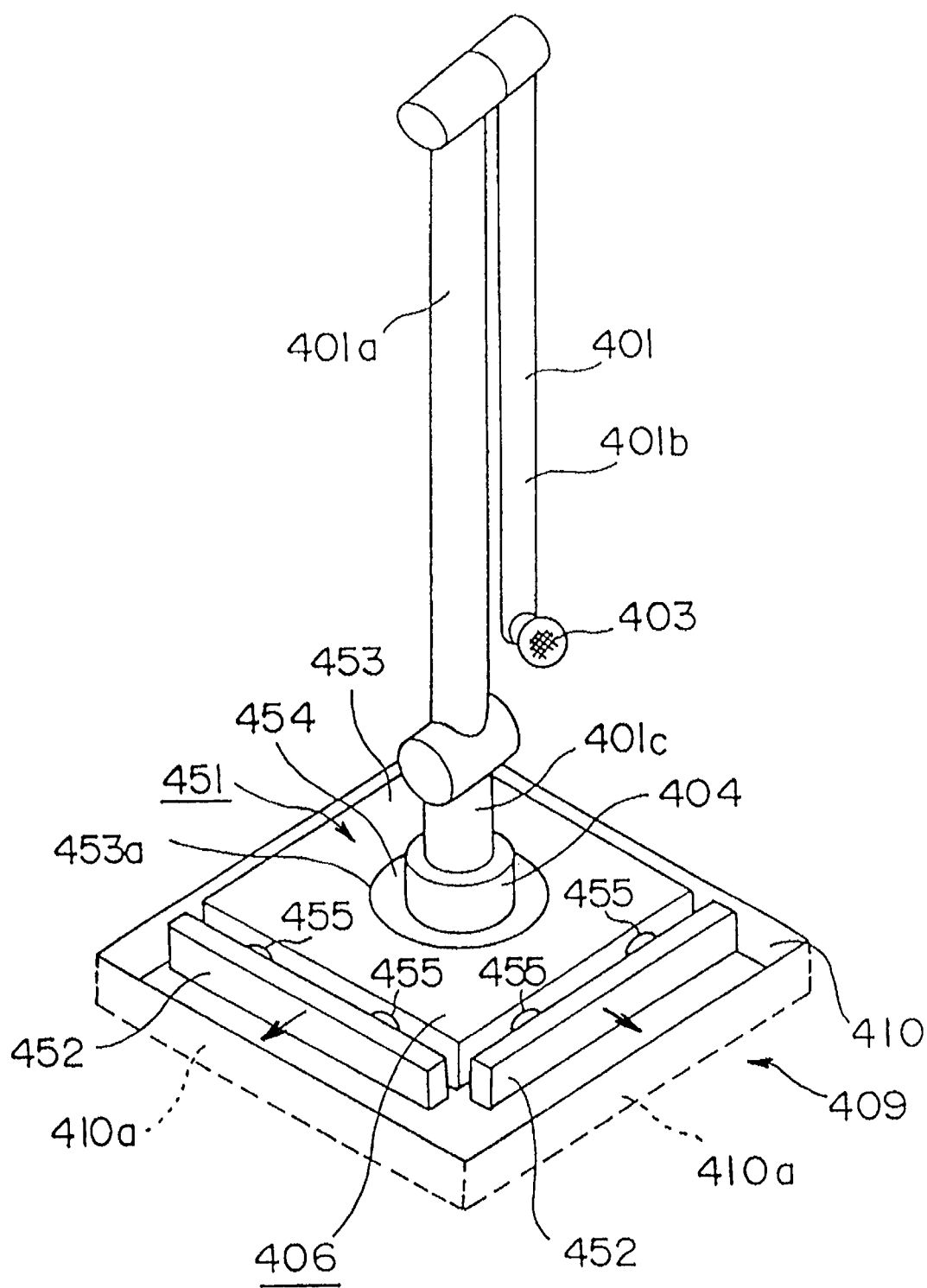
FIG. 26 is a perspective view showing a fourth embodiment of the working apparatus in accordance with the second aspect of the present invention.

With reference to FIG. 26, a fourth embodiment of the working apparatus in accordance with the second aspect of the present invention will be described.

In FIG. 26, the holding jig 406 comprises a holding main body 451 for holding the manipulator 401; and a pressing member 452, disposed on a side of the holding main body 451, for moving toward a periphery 410a of the hatch opening portion 410.

In contrast to the above described embodiments, the holding jig 406 is secured to the hatch opening portion 410 by the pressing member 452 rather than the pin holes. In other words, the holding main body 451 comprises a plate member 453 having a square shape and an auxiliary member 454 disposed in a hole 453a formed at the center of the plate member 453. The base member 404 of the manipulator 401 is secured by the auxiliary member 452. One end of a screw 455 is inserted into a side portion of the plate member 453.

The pressing member 452 has an angular column shape and is provided on two orthogonal sides of the holding main body 451. The other end of the screw 455 secured to the plate member 453 is secured to a side portion of the pressing member 452. By turning the screw 455, the side surface of the pressing member 452 can be moved toward the periphery 410a of the opening portion 410. By pressing the pressing member 452 to the periphery 410a of the hatch opening portion 410, the holding jig 406 can be secured to the hatch opening portion 410 by frictional force made between the pressing member 452 and the periphery 410a.

According to this embodiment, since the holding jig 406 is secured to the hatch opening portion 410 by the pressing member 452 for pressing the periphery 410a of the hatch opening portion 410, the contacting area between the pressing member 452 of the holding jig 406 and the periphery 410a of the hatch opening portion 410 can be increased. Thus, the manipulator 401 can be held firmly by the hatch holding portion 410 without locally applying excessive force to the airframe.

Figure 27:
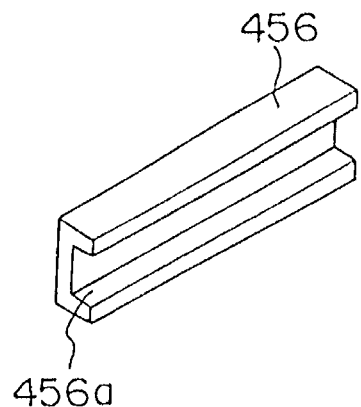
FIG. 27 is a perspective view showing a modification example of a pressing member of the fourth embodiment in accordance with the second aspect of the present invention.

In addition to the pressing member 452 in the angular column shape, it is possible to use a pressing member 456 having a channel shaped cross-section as shown in FIG. 27. This pressing member 456 has a groove portion 456 with a width nearly the same as the thickness of the periphery 410a of the hatch opening portion 410. The groove portion 456a of the pressing member 456 is attached to the periphery 410a of the hatch opening portion 410. When the channel shaped pressing member 456 is used, the holding jig 406 can be more firmly secured to the hatch opening portion 410 by the groove portion 456a of the pressing member 456 than is possible by the frictional force of the pressing member 452 having the angular column shape.

Moreover, in this embodiment, it is possible to secure a side portion of the plate member 453 to the pin hole 412 shown in FIG. 21 by a leg member (not shown in the figure) so as to commonly use the pin hole 412. In this case, the holding jig 406 can be more firmly secured to the hatch opening portion 410 than done by only the pressing member 452.

2.5 Fifth Embodiment

Figure 28:
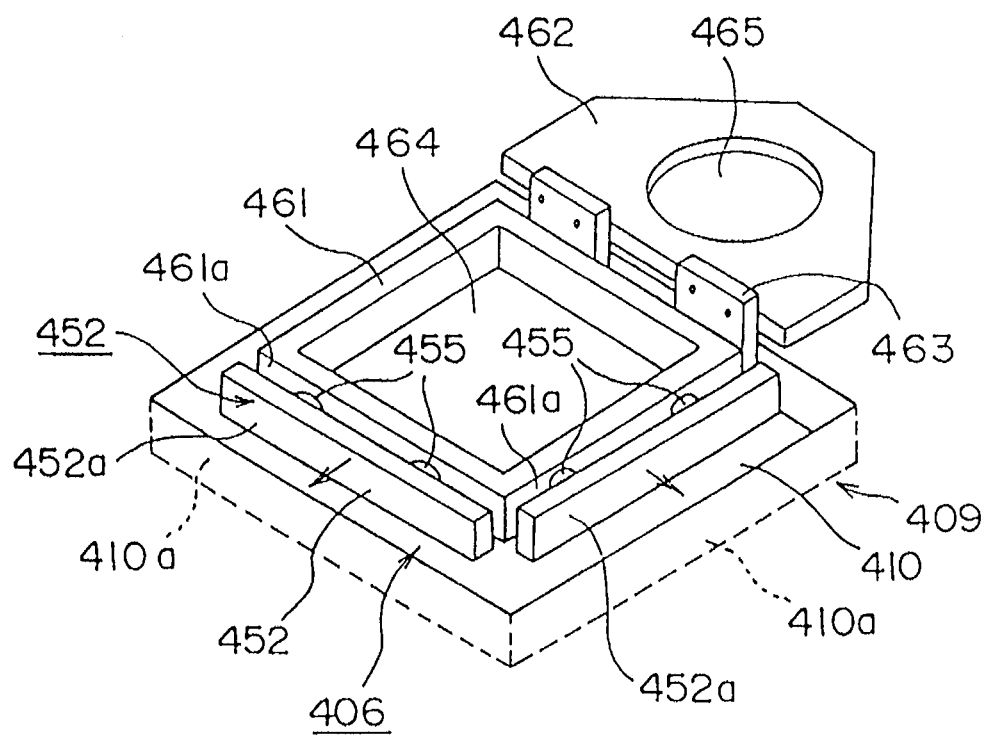
FIG. 28 is a perspective view showing a fifth embodiment of the working apparatus in accordance with the second aspect of the present invention.

With reference to FIG. 28, a fifth embodiment of the working apparatus in accordance with the second aspect of the present invention will be described.

In FIG. 28, the holding jig 406 comprises a frame member 461 having an opening 464; a holding member 462, extended outwardly from the frame member 461, for holding the manipulator 401; and the pressing member 452, disposed at the periphery 461a, for moving toward the periphery 410a of the hatch opening portion 410.

In other words, one end of a connecting member 463 is secured outside the frame member 461. The other end of the connecting member 463 is secured to the holding member 462. The base member 404 of the manipulator 401 is secured to an opening 465 formed at the center of the holding portion 462 and held thereby. The pressing member 452 has the same function as that of the fourth embodiment shown in FIG. 26.

According to the fifth embodiment, since the frame member 461 has the opening 464, the worker can lean out of the cockpit through the opening 464. In addition, if the manipulator 401 malfunctions, the worker can enter and exit through the opening 464. Thus, the worker can easily repair and adjust the manipulator 401.

2.6 Sixth Embodiment

Next, with reference to FIG. 29, a sixth embodiment of the working apparatus in accordance with the second aspect of the present invention will be described.

Figure 29:
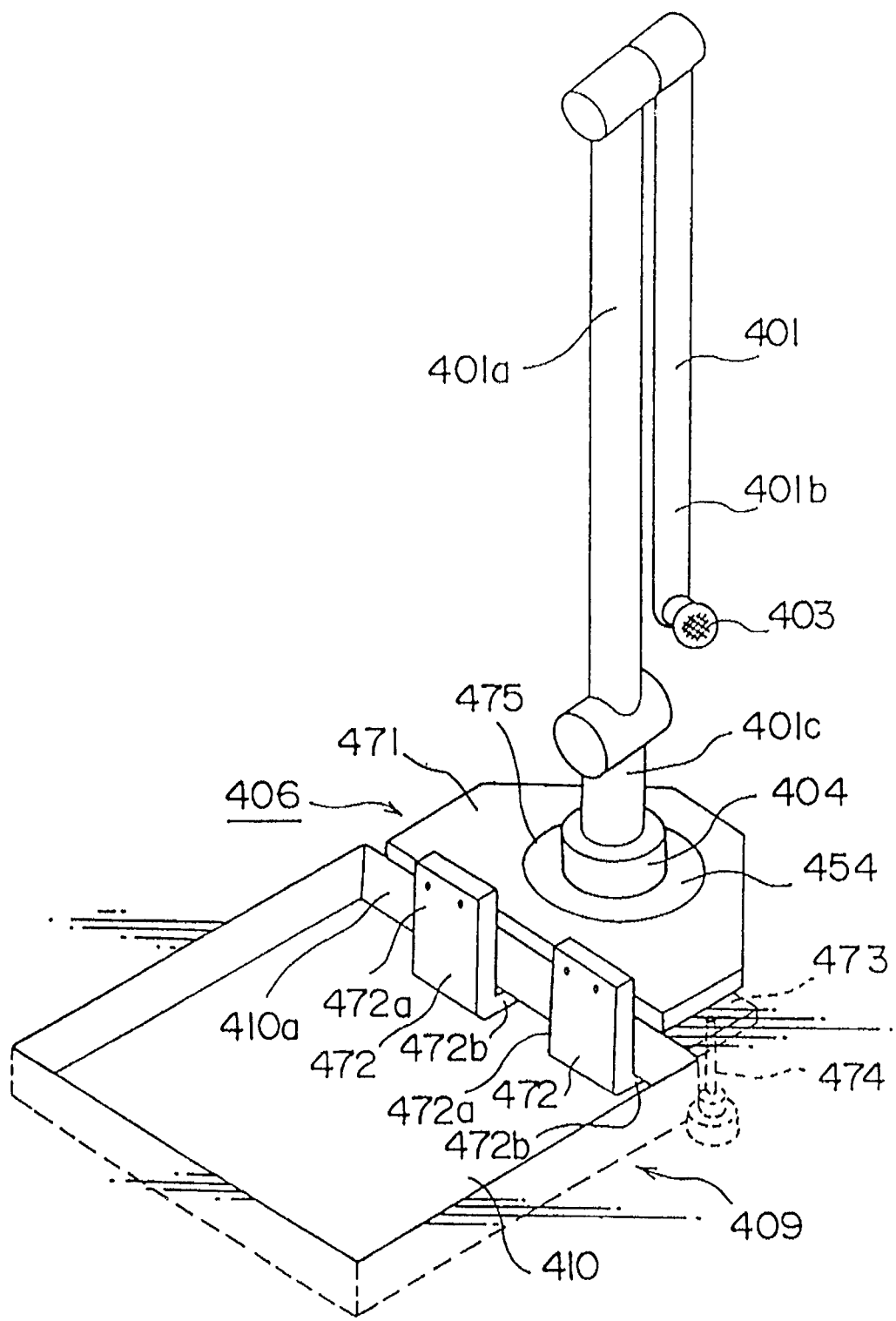
FIG. 29 is a perspective view showing a sixth embodiment of the working apparatus in accordance with the second aspect of the present invention.

In FIG. 29, the holding jig 406 comprises a holding main body 471 for holding the manipulator 401 and two L-shaped members 472 secured to the holding main body 471. The L-shaped member 472 comprises a side portion 472a secured to the holding main body 471; and a bottom portion 472b forming along with the holding member 471 a space 473 into which the periphery 410a of the hatch opening portion 410 is inserted. In addition, a screw 474 for tightening the periphery 410a is secured to the bottom portion 472b of the L-shaped member 472.

The base member 404 of the manipulator 401 is inserted into an opening 475 formed at the center of the holding main body 471 through the auxiliary member 454 and held thereby. By inserting a resilient member such as rubber into the space 473 made between the holding main body 471 and the periphery 410a and clamping the resilient member with the screw 474, it is possible to prevent the working apparatus from damaging the airframe of the aircraft.

In this embodiment, since the holding main body 471 holds the manipulator 401 at an outer position of the hatch opening portion 410, the hatch opening portion 410 can be widely opened. Thus, the worker can enter the cockpit from the hatch opening portion 410 when necessary.

Section 3 working apparatus from which a manipulator can be detached

3.1 First Embodiment

A first embodiment of a working apparatus from which a manipulator can be detached in accordance with a third aspect of the present invention will be described with reference to the accompanying drawings. FIGS. 31 and 32 show a working apparatus 601 which performs the work of cleaning a windshield 803 of an aircraft. As shown in FIGS. 31 and 32, the working apparatus 601 mainly includes a manipulator 610 and a working unit 651 (which will be described later in detail). The manipulator 610 comprises a base 602 secured to an airframe part 800 of the aircraft, a shoulder joint 603 rotatably connected to the base 602, and a first arm 604 whose one end is secured to the shoulder joint 603. The manipulator 610 further comprises an elbow joint 605 rotatably connected to the other end of the first arm 604, a second arm 606 whose one end is secured to the elbow joint 605, and a wrist joint 607 rotatably secured to the other end of the second arm 606. The other end of the wrist joint 607 is secured to the working unit 651.

Figure 33:
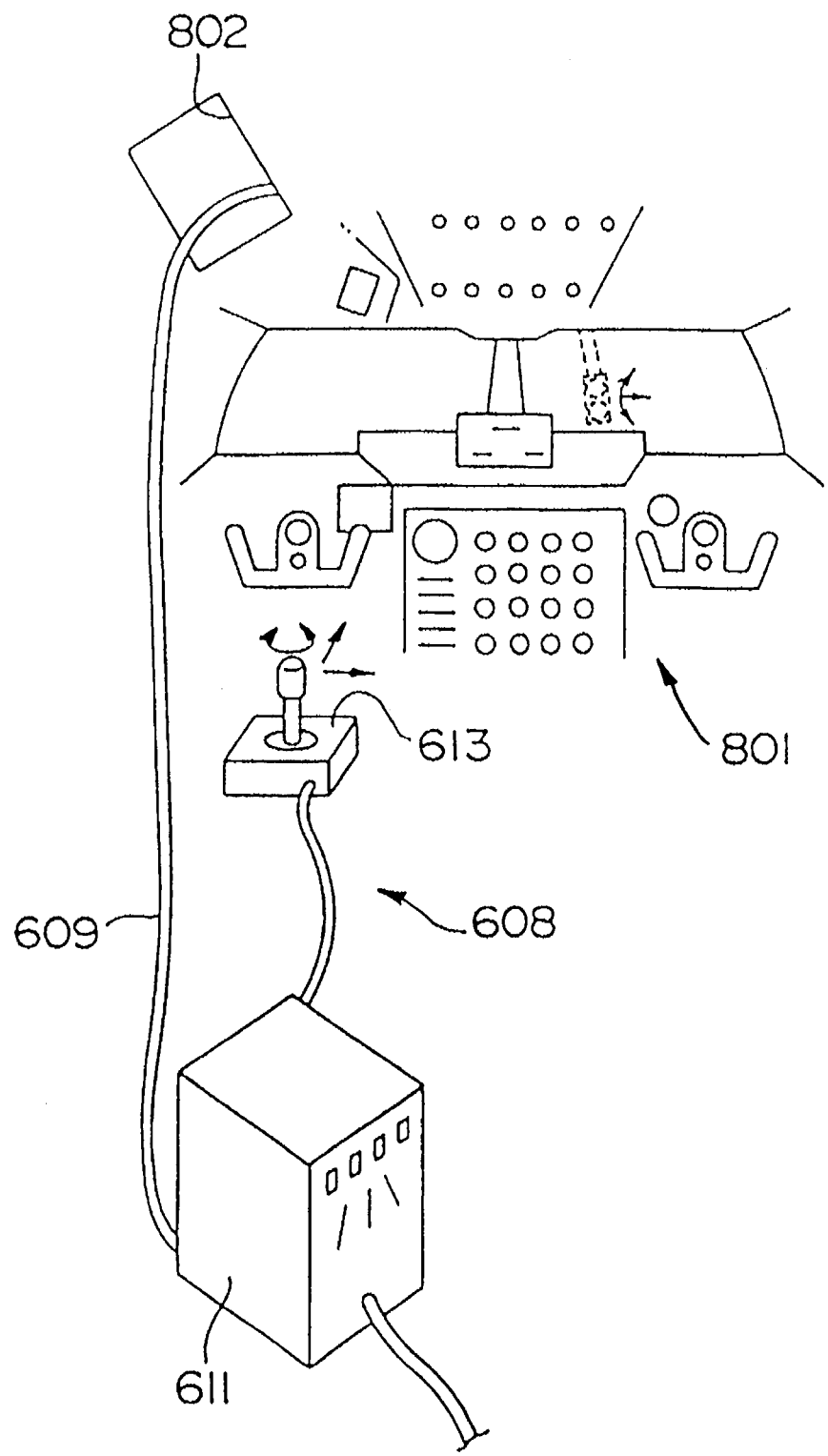
FIG. 33 is a perspective view showing an interior of a cockpit of an aircraft of the first embodiment in accordance with the third aspect of the present invention.

In the airframe 800, there is provided a control device 608 which supplies signals or electricity to the working apparatus 601 for driving and controlling the working apparatus as shown in FIG. 33. The control device 608 is connected to the working apparatus 601 through a detachable cable 609.

In this embodiment, the base 602 is set up in the vicinity of a hatch 802 provided on the ceiling of the cockpit 801 of the airframe 800. The cable 609 connects the control device 608 with the working apparatus 601 disposed outside the airframe 800 through the hatch 802.

Figure 34:
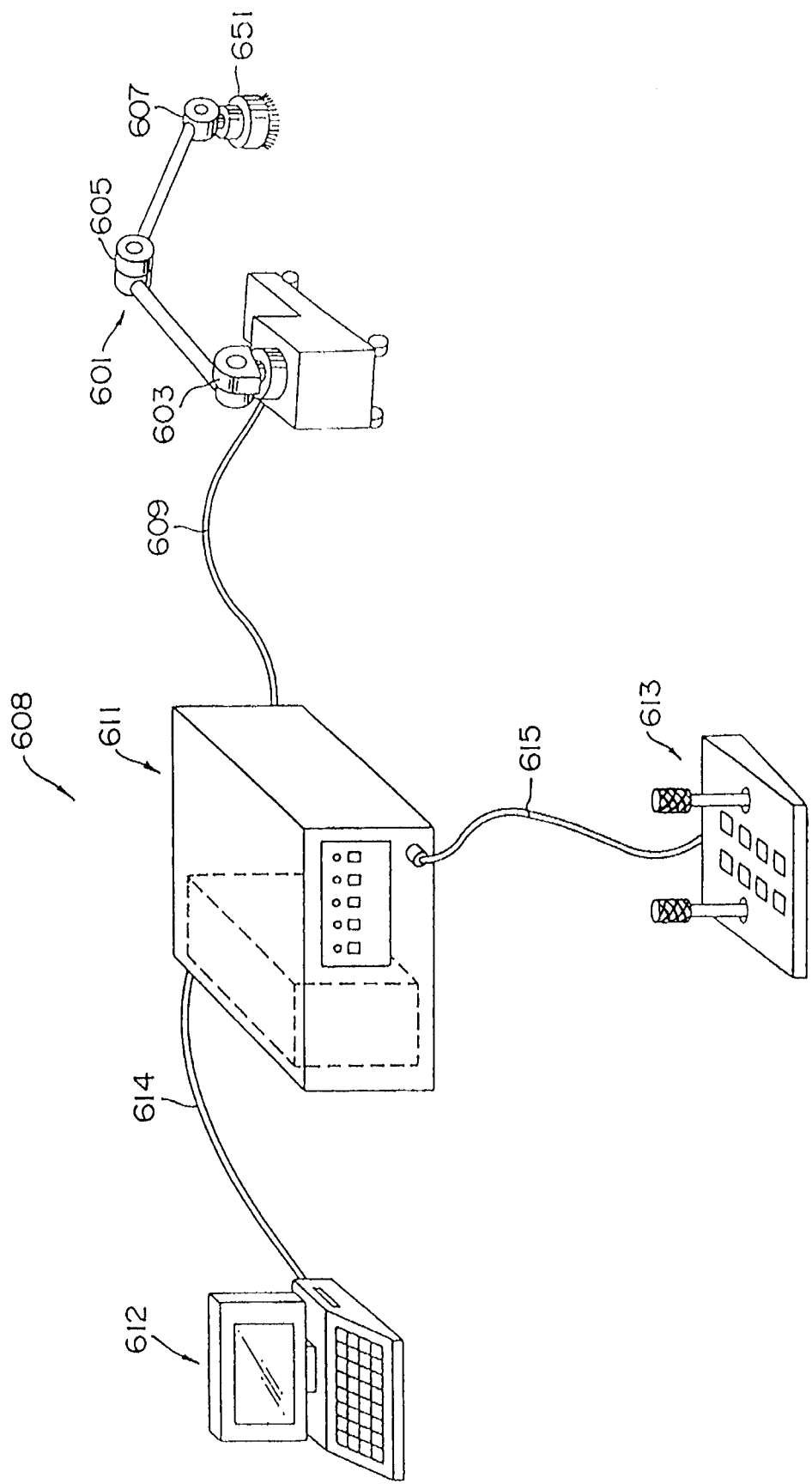
FIG. 34 is a perspective view showing the first embodiment and the organization of peripheral units thereof in accordance with the third aspect of the present invention.

FIG. 34 shows the organization of the working apparatus 601 and the peripheral equipment thereof. The control device 608 comprises a control unit 611 for driving and controlling the joints 603, 605, 607 and the working unit 651, a computing unit 612 for computing control signals and an operating unit 613 for outputting operating signals for operating the manipulator 610.

The computing unit 612 comprises, for example, a personal computer having a keyboard by which an operator (worker) can input control signals. The operating unit 613 comprises, for example, a joystick lever which is operated to drive the manipulator 610, thereby positioning the working unit 651 at a particular position. The control unit 611 is connected to the computing unit 612 and the operating unit 613 through detachable cables 614 and 615, respectively.

Figure 36:
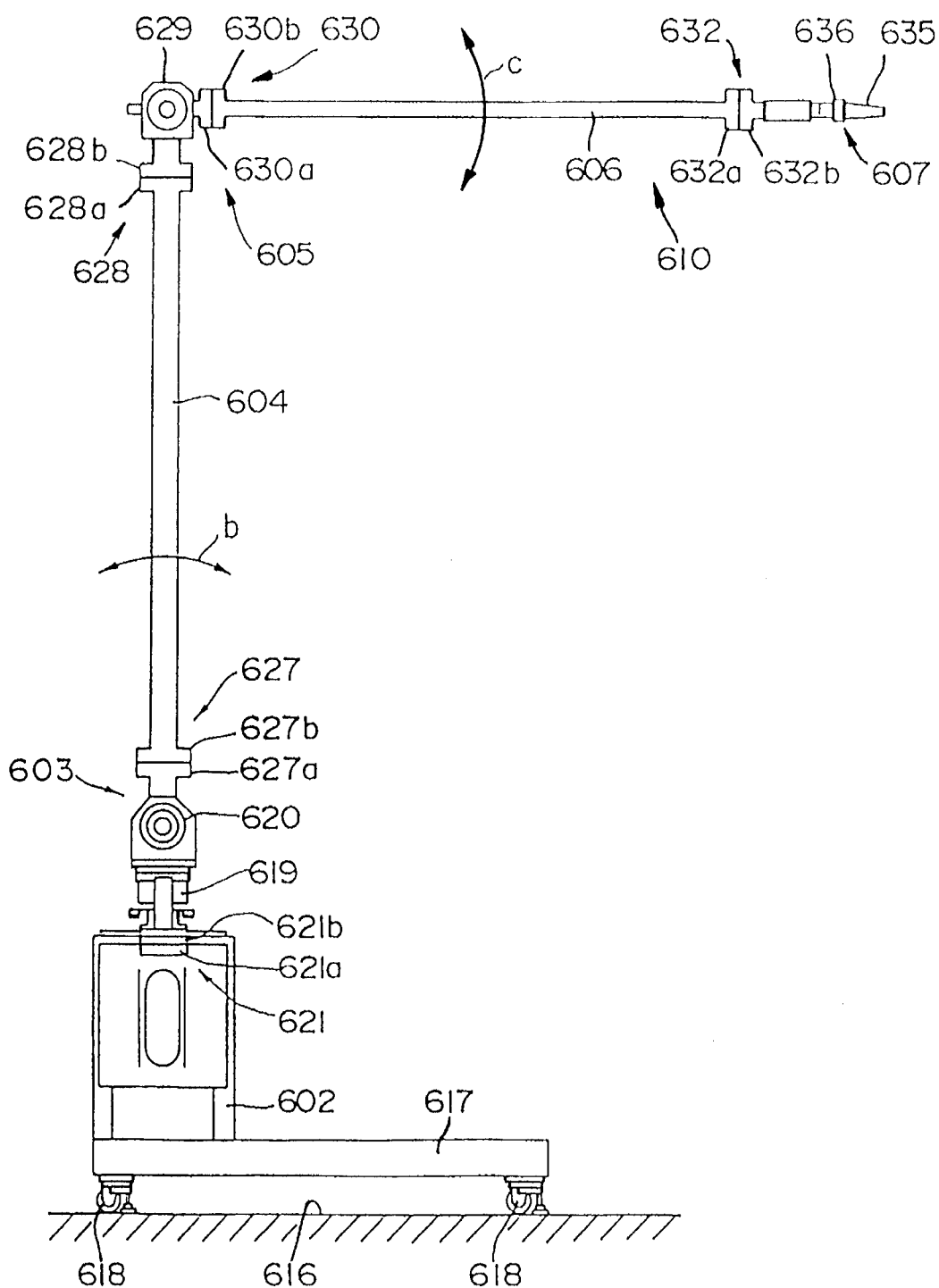
FIG. 36 is a side view showing the first embodiment in accordance with the third aspect of the present invention.
Figure 37:
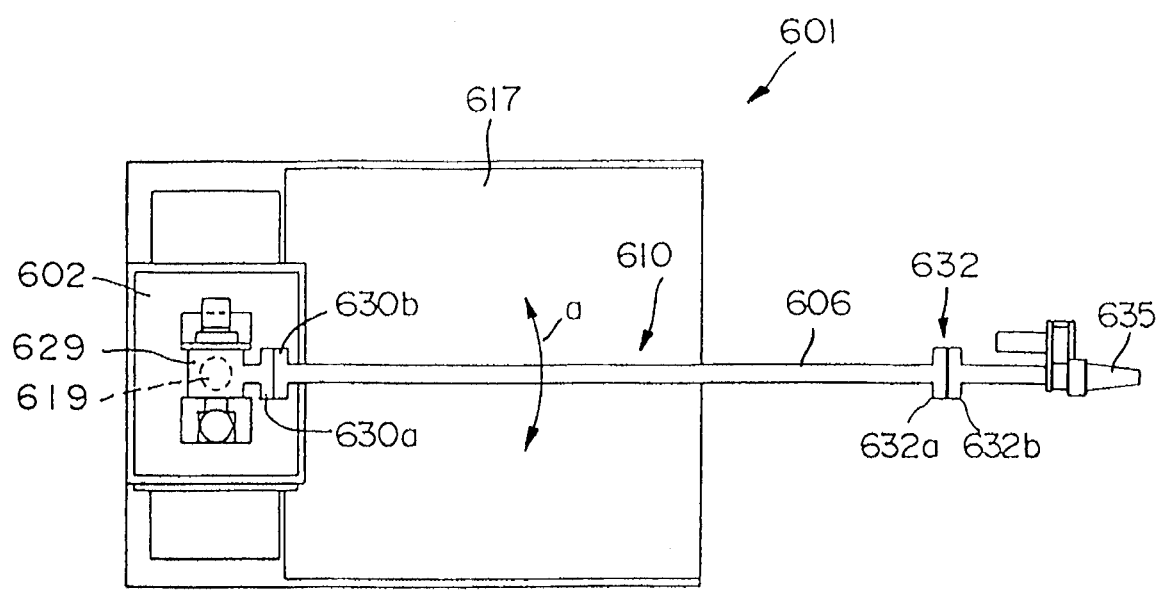
FIG. 37 is a plan view showing the first embodiment in accordance with the third aspect of the present invention.

FIGS. 35 to 37 are a front view, a side view, and a plan view respectively, showing the working apparatus 601. FIGS. 36 and 37 show the working apparatus 601 in which the elbow joint 605 is held at a right angle.

The working apparatus 601 is fixedly secured to a base plate 617 disposed on a floor 616. Ball casters 618 with stoppers are provided at lower four corners of the base plate 617, whereby the base plate 617 is freely moved by the ball casters 618 and fixed at any position by the stoppers thereof. As a result, the working apparatus 601 can be easily moved by the ball casters 618. The base 602 of the working apparatus 601 is detachably connected to the base plate 617.

The shoulder joint 603 is provided with a first joint 619 and a second joint 620. The first joint 619 is rotatable in the direction of the arrow a as shown in FIG. 37, and the second joint 620 is rotatable in the direction of the arrow b as shown in FIG. 36.

Figure 44:
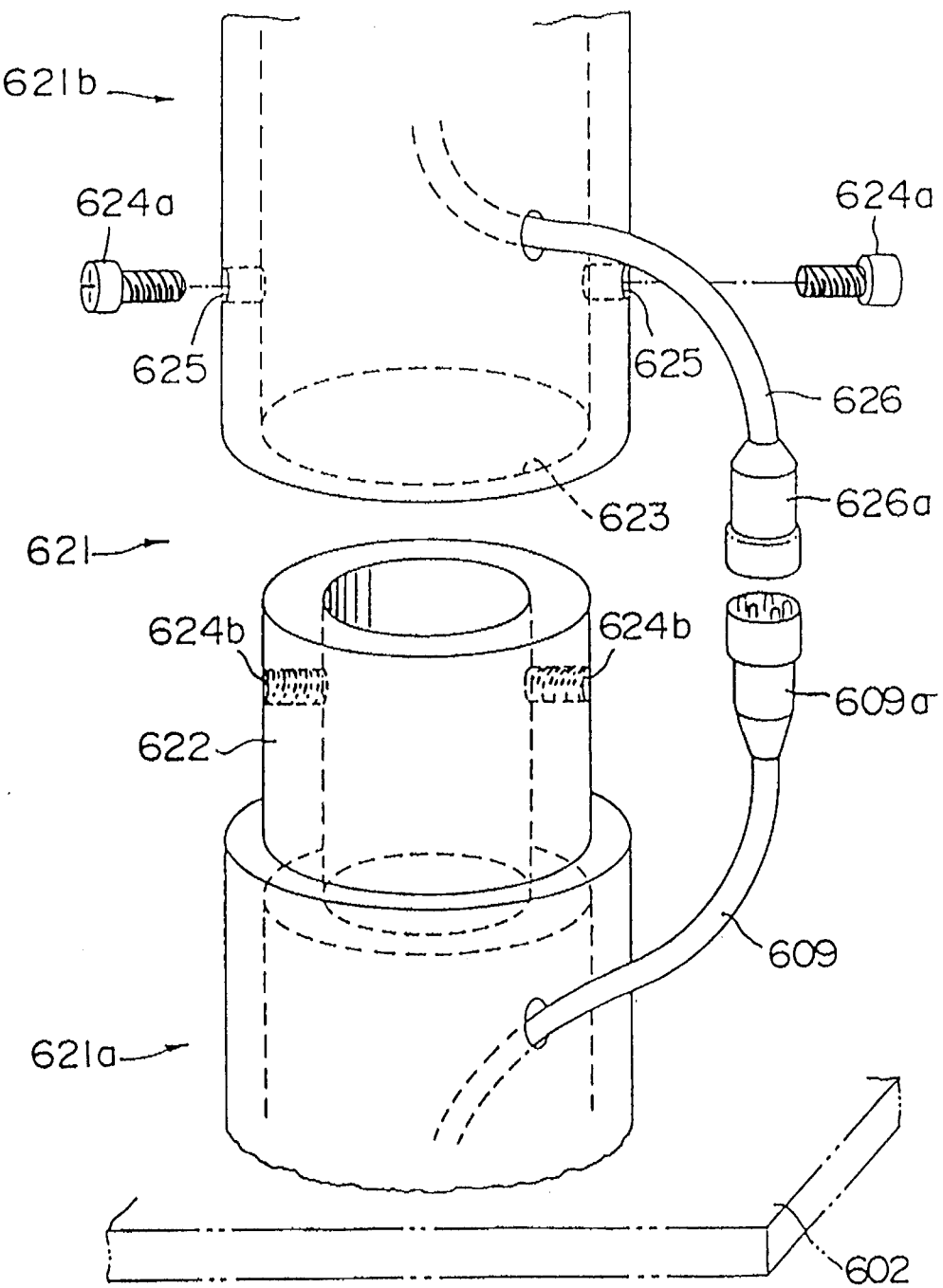
FIG. 44 is a perspective view showing a coupling device of the working apparatus in accordance with the third aspect of the present invention.

A coupling device 621 is provided at a lower portion of the shoulder joint 603. The coupling device 621 comprises a first member 621a secured to the base 602 and a second member 621b secured to the lower portion of the first joint 619 as shown in FIG. 44. The first member 621a has a cylindrical portion 622 with a small diameter which is inserted into a hollow cylindrical portion 623 formed in the second member 621b, whereby the shoulder joint 603 is connected to the base 602.

The cylindrical portion 622 has threads 624b, formed thereon, the second member 621b has through holes 625 as shown in FIG. 44. The first member 621a and the second member 621b are coupled, and then bolts 624a are inserted into the through holes 625 of the second member 621b and are engaged with the threads 624b of the first member 621a, thereby securing the second member 621b to the first member 621a. Thus, the shoulder joint 603 is secured to the base 602.

The first joint 619 and the second joint 620 of the shoulder joint 603 have a driving mechanism therein for rotating the first arm 604. A cable 626 for transmitting signals to the driving mechanism has a receptacle 626a at an end portion thereof. The receptacle 626a is connected to a plug 609a provided at an end of the cable 609 which extends from the control unit 611.

For removing the shoulder joint 603 by uncoupling the first member 621a and the second member 621b, the receptacle 626a and the plug 609a can be disconnected. In other words, the cable 626 and the cable 609 are connected through the receptacle 626a and the plug 609a, and the first arm 604 can be easily detached from the base 602 when detaching the second member 621b from the first member 621a.

A coupling device 627 having the same construction as that of the coupling device 621 is provided between the shoulder joint 603 and the first arm 604 as shown in FIG. 35. The coupling device 627 comprises a first member 627a secured to the second joint 620 and a second member 627b secured to the first arm 604.

A coupling device 628 having the same construction as that of the coupling device 621 is provided at the other end of the first arm 604. The coupling device 628 comprises a first member 628a secured to the first arm 604 and a second member 628b secured to the elbow joint 605, thereby connecting the first arm 604 and the elbow joint 605.

The second arm 606 is connected to an end of the first arm 604 through the elbow joint 605. The elbow joint 605 comprises a third joint 629 which is rotatable in the direction of the arrow c as shown in FIG. 36. A coupling device 630 having the same construction as that of the coupling device 621 is provided on the side of the elbow joint 605 of the second arm 606. The coupling device 630 comprises a first member 630a secured to the third joint 629 and a second member 630b secured to the second arm 606, thereby connecting the third joint 629 and the second arm 606.

Figure 39:
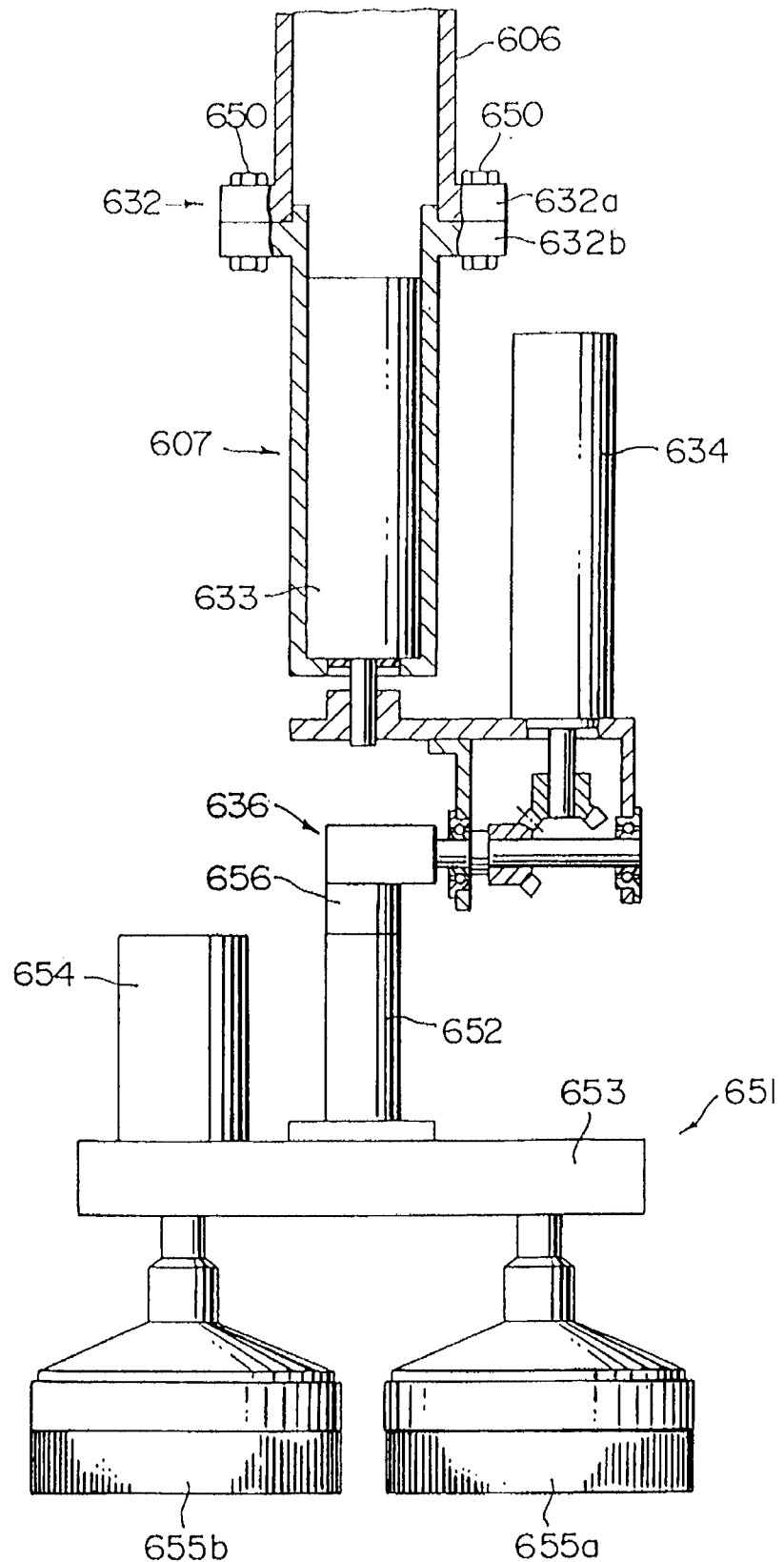
FIG. 39 is a sectional view showing a working unit of the manipulator of the first embodiment in accordance with the third aspect of the present invention.

A coupling device 632 having the same construction as that of the coupling device 621 is provided between the second arm 606 and the wrist joint 607 as shown in FIG. 39. The coupling device 632 comprises a first member 632a secured to the second arm 606 and a second member 632b secured to an end of the wrist joint 607. The wrist joint 607 is secured to the second arm 606 by bolts 650 (FIG. 39).

The wrist joint 607 has a fourth joint 633 and a fifth joint 634. The fourth joint 633 enables the wrist joint 607 to rotate about its central axis. The fifth joint 634 enables the wrist joint 607 to tilt. The wrist joint 607 and the working unit 651 are connected to each other through a coupling device 636.

Figure 40:
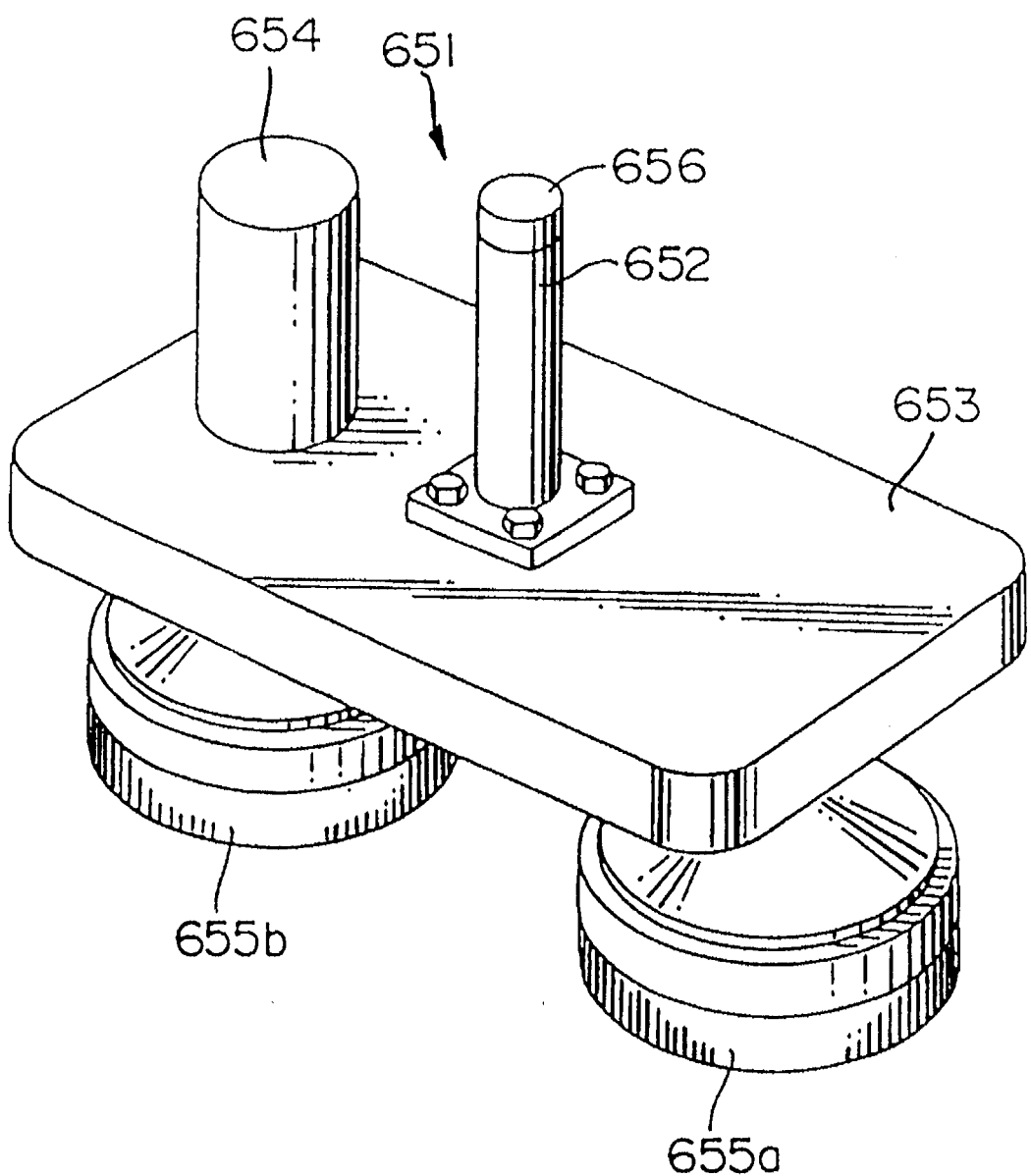
FIG. 40 is a perspective view showing the working unit of the manipulator of the first embodiment in accordance with the third aspect of the present invention.

The working unit 651 is provided with a connecting arm 652 extended in a vertical direction at the center of the working unit 651 as shown in FIGS. 39 and 40. The connecting arm 652 is connected to the wrist joint 607 through the coupling device 636. The connecting arm 652 is secured to a gear box 653 on which a motor 654 is provided.

The rotating force of the motor 654 is transmitted to a pair of rotating brushes 655a and 655b through gears (not shown in the figure) in the gear box 653. The rotating brushes 655a and 655b perform the work of cleaning the windshield.

A sensor 656 for sensing force is disposed between the connecting arm 652 and the coupling device 636 so that the pressing force of the working unit 651 against the airframe 800 can be measured. The sensor 656 is connected to the control device 608 through a cable (not shown in the figure).

Figure 38A:
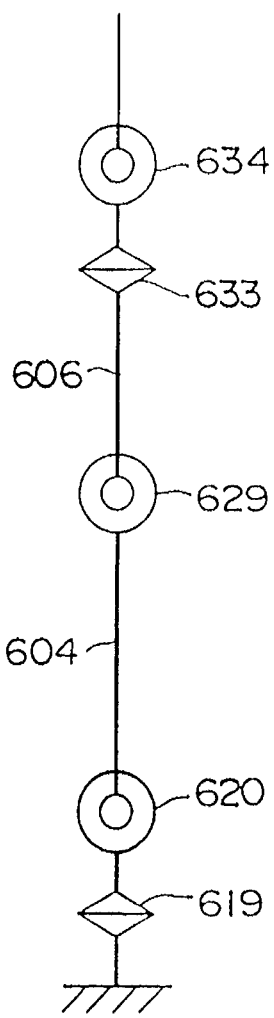
FIGS. 38A and 38B are schematic diagrams showing compositions of degrees of freedom of a manipulator of the first embodiment in accordance with the third aspect of the present invention.

The first joint 619, the second joint 620, and the third joint 629 control the position of the wrist joint 607 of the working apparatus 601. The fourth joint 633 and the fifth joint 634 control the orientation of the working unit 651 of the working apparatus 601. FIG. 38A shows the configuration of the degrees of freedom of the working apparatus 601 with a plurality of joints.

A method of connecting the cables will now be described with reference to FIG. 35.

The cable 609 taken out from the control unit 611 is connected to cables 638, 639, and 640 through a connector 637. The cable 638 transmits driving signals of the first joint 619. The cable 639 transmits driving signals of the second joint 620. The cable 640 is connected to a cable 642 through a connector 641. The cable 642 is disposed inside the first arm 604, a part 642a of the cable 642 being secured to the inside of the first arm 604, a part 642b of the cable 642 being taken out from the inside of the first arm 604 near the coupling device 628. The cable 642 is connected to a cable 644 through a connector 643. A cable 644a transmits driving signals of the third joint 629. Further, the cable 644 is connected to a cable 646 through a connector 645. The cable 648 is routed inside the second arm 606. The cable 646 is taken out from the second arm 606 near the coupling device 632. The cable 646 is connected to cables 648 and 649 through a connector 647. The cable 648 transmits driving signals of the fourth joint 633. The cable 649 transmits driving signals of the fifth joint 634.

Next, the process of cleaning the windshield 803 performed by the working apparatus 601 of the above described construction will be described.

The working apparatus 601 is disassembled into a plurality of units of joints and arms. The working unit 651 and the control device 608 are also separated from the manipulator 610. Thereafter, the disassembled units and devices are transported into the cockpit 801 of the airframe 800. Since the manipulator 610 has been disassembled into the small units, they can be easily carried through the entrance of the cockpit 801.

Then, a guide rail (not shown) is lowered to the floor of the cockpit 801 from the hatch 802 provided in the ceiling of the cockpit 801. Next, the base 602 for securing the working apparatus 601 is assembled at the lowermost portion of the guide rail. Thereafter, the manipulator 610 is successively assembled on the base 602.

This assembling work is carried out by attaching the shoulder joint 603 onto the base 602 and then connecting the shoulder joint 603 and the first arm 604 with the coupling device 621. The first arm 604, the elbow joint 605, and the second arm 606 are connected to each other with the coupling devices 28 and 30 in the same manner.

Thereafter, the connecting arm 652 is connected to the second arm 606 through the wrist joint 607 and the sensor 656. Then, the other end of the connecting arm 652 is connected to the working unit 651. Cables are connected to each joint, each arm, and the control device 608.

The working apparatus 601 assembled in the above manner has a small shape where each joint is folded up.

The working apparatus 601 together with the base 602 is taken out from the airframe through the hatch 802 using the guide rail. The working apparatus 601 is secured to the airframe surface adjacent to the hatch 802 by the use of an edge of the hatch 802.

The worker controls the positions of the rotating brushes 655a and 655b disposed to the end of the working apparatus 601 by operating the operating unit 613 to drive the manipulator 610 while observing the movement of the working apparatus 601 by a position detector (not shown in the figure).

Thus, the working unit 651 is moved towards the windshield 803 while the rotating brushes 655a and 655b are not in contact with the airframe 800, but hang down.

After the working unit 651 is positioned at a specific position over the windshield 803, the rotating brushes 655a are 655b are released from the hanging state to enable the rotating brushes 655a and 655b to contact the windshield 803.

At this time, if pressing force were excessively applied to the airframe 800 by the rotating brushes 655a and 655b, the surface of the airframe 800 would be damaged. Therefore, the pressing force of the rotating brushes 655a and 655b is controlled by a signal from the sensor 656.

The pressing force is controlled by the computing unit 612 which computes transformation of the coordinate system with respect to signals representing the pressing force and instruction signal for joints on real-time basis. The pressing force of the rotating brushes 655a and 655b against the windshield 803 is always kept in an optimum condition by supplying joint driving signals to each joint of the manipulator 610 from the control unit 611.

When the shape of the surface from the hatch 802 to the windshield 203 is known in advance, it is preferable to program the shape in the control unit 611 in advance. In such a way, the working unit 651 is automatically positioned at a predetermined position on the windshield 803.

Thereafter, the rotating brushes 655a and 655b are rotated while the position and the orientation of the working unit 651, and the pressing direction and force of the rotating brushes 655a and 655b are controlled, thereby removing foreign matter from the windshield 803.

According to the working apparatus 601 of this embodiment, since each joint and each arm of the manipulator 610 are detachable, they can be easily carried into the inside of the aircraft. Thereafter, the working apparatus is assembled again inside the aircraft. Then, the base is disposed in the vicinity of the hatch. Thus, the work of cleaning the windshield can be easily performed.

3.2 Second Embodiment (first modification of working unit)

Next, a first modification of the working unit of the working apparatus in accordance with the third aspect of the present invention will be described with reference to FIG. 41. Parts shown in FIG. 41 which are the same as those of the first embodiment shown in FIGS. 39 and 40 are designated by the same reference numerals and description thereof will be omitted.

FIG. 41 is a perspective view showing a working unit 661. The working unit 661 is provided with four wheels 662 as a moving mechanism so that rotating brushes 655a and 655b do not contact the airframe. This structure of the working unit 661 is different from that of the working unit 651 shown in FIGS. 39 and 40.

The two wheels 662 are provided on each side of the working unit 661. That is, the working unit 661 is provided with supporting members 663a and 663b, each of which rotatably supports the two wheels 662 at its two ends. The supporting members 663a and 663b, and cranks 664a and 664b jointly constitute a pair of crank mechanisms 665a and 665b. The crank mechanisms 665a and 665b are driven by a motor 666 secured to the gear box 653, thereby vertically moving the wheels 662 against the gear box 653.

When the working apparatus 601 having the working unit 661 cleans the windshield 803, the process of carrying the working apparatus 601 into the cockpit 801 and assembling the working apparatus 601 is performed in the same manner as the first embodiment shown in FIGS. 39 and 40.

However, in the second embodiment, the wheels 662 are used when the working unit 661 moves as opposed to the first embodiment.

In other words, the worker drives the motor 666 to operate the crank mechanisms 665a and 665b, whereby the wheels 662 are brought into contact with the airframe. At this time, the rotating brushes 655a and 655b are kept out of contact with the airframe.

Thereafter, the worker controls the positions of the rotating brushes 655a and 655b attached to the end of the working apparatus 601 by operating the operating unit 613 to drive the manipulator 610 while observing the movement of the working apparatus 601 by a position detector (not shown in the figure). After the working unit 651 is positioned at a predetermined position over the windshield 803, the motor 666 is driven again to operate the crank mechanisms 665a and 665b, thereby lifting the wheels 662. Then, the rotating brushes 655a and 655b are brought into contact with the windshield 803. The work of cleaning the windshield 803 is performed in this contact state while rotating the rotating brushes 655a and 655b.

After the cleaning work is complete, the working apparatus 601 is accommodated in the airframe in the reverse order of the above procedure. That is, the wheels 662 are first brought into contact with the airframe. Simultaneously, the rotating brushes 655a and 655b are brought out of contact with the airframe. While the working unit 661 is moved towards the hatch 802 along the airframe surface by the wheels 662, the manipulator 610 is folded up gradually. Thereafter, the manipulator 610 is accommodated in the cockpit through the hatch 802. The manipulator 610 is disassembled into each joint and each arm and then they are carried outside from the cockpit.

According to this embodiment in which the working unit is provided with the wheels, the working unit can be moved along the airframe having a complicated curved surface to an objective working surface without damaging the airframe.

Further, in general, when the manipulator can be assembled in any shape, it is difficult to control the manipulator due to its inconstant characteristic frequency. However, in this embodiment, since a part of the working apparatus contacts the airframe via the wheels, the manipulator can be easily controlled without much interference due to vibration. Thus, an adverse effect on components, such as occurrence of play in a mechanical joint portion due to looseness of screws, caused by vibration, can be eliminated, thus prolonging the service life of the overall working apparatus.

It should be appreciated that the working apparatus can be moved on the airframe surface using a moving mechanism such as ball casters in place of the wheels 662. Further, if at least the surface of the moving mechanism is made of an elastic member, not only the vibration of the working apparatus and but also damage to the airframe can be prevented.

3.3 Third Embodiment (second modification of working unit)

Figure 42:
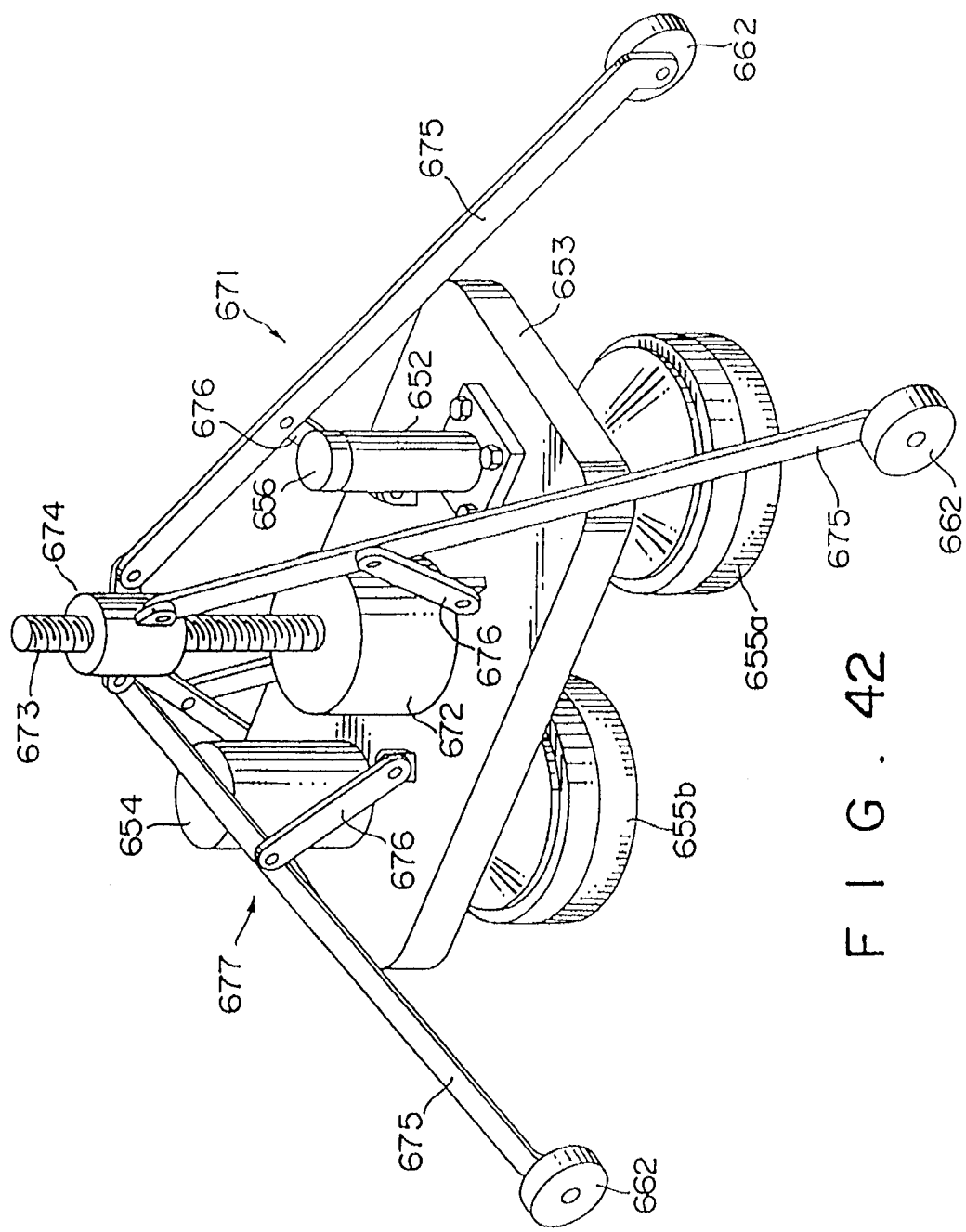
FIG. 42 is a perspective view showing a working unit of a third embodiment of the working apparatus in accordance with the third aspect of the present invention.

FIG. 42 is a perspective view showing a second modification of the working unit in accordance with the third aspect of the present invention.

According to this modification, the working unit 671 is provided with a motor 672 at a central portion thereof. The motor 672 has a rotating shaft 673 which is formed as a screw and engaged with a nut 674.

On the other hand, four supporting members 675 are provided on the working unit 671, one end of each supporting member 675 being rotatably supported by the nut 674. The supporting member 675 has another end by which a wheel 662 is rotatably supported.

Each supporting member 675 and a crank 676 jointly constitute a crank mechanism 677.

With the working unit 671 of the above described construction, when the motor 672 is rotated to move the nut 674 upward, the wheel 662 is brought into contact with the airframe. In contrast, when the motor 672 is rotated in the reverse direction to move the nut 674 downward, the rotating brushes 655a and 655b are brought into contact with the windshield 803.

3.4 Fourth Embodiment (third modification of working unit)

Figure 43:
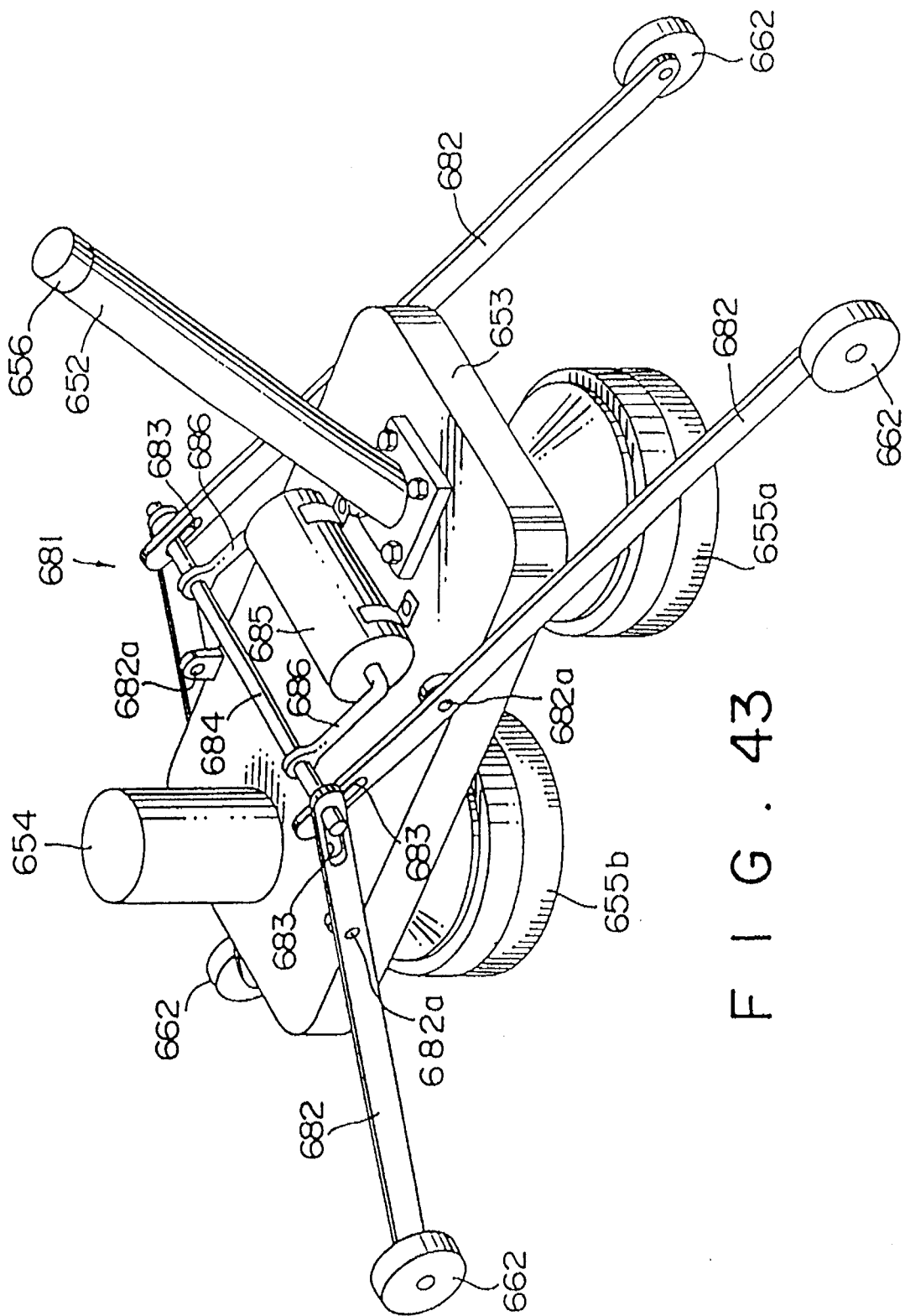
FIG. 43 is a perspective view showing a working unit of a fourth embodiment of the working apparatus in accordance with the third aspect of the present invention.

Next, a third modification of the working unit in accordance with the third aspect of the present invention will be described with reference to FIG. 43.

According to this embodiment, a working unit 681 is provided with four supporting member 682 rotatably supported thereby. One end of each supporting member 682 has a wheel 662 and the other end thereof has an oblong hole 683. The two supporting member 682 are supported by each other at the position of the oblong holes 683, and a common shaft 684 extends through the oblong holes 683. Further, the shaft 684 also extends through arms 686 secured to a rotating shaft of a motor 685. When the motor 685 is driven to rotate the arms 686, the shaft 684 is movable up or down.

In the above mechanism, when the motor 685 is driven to rotate the arms 686, the angle of the supporting member 682 against the working unit 681 is changed. Thus, as in the modification as the second embodiment, the positions of the wheels 662 can be vertically moved relative to the rotating brushes 655a and 655b.

The working units 651, 661, 671, and 681 shown in FIGS. 39 to 43 are employed to perform the work of cleaning the windshield of an aircraft. However, it should be appreciated that the working unit can be replaced with another type of working unit, such as a spray gun, a wiper, or an ultrasonic flaw detecting test device, to perform various other modes of work. By replacing the working unit, it is possible to perform work for aircraft in accordance with various working conditions without replacing or changing the manipulator 610 and other unit configuration.

3.5 Fifth Embodiment

(first modification of coupling device)

Now, a first modification of a coupling device of the working apparatus in accordance with the third aspect of the present invention will be described with reference to FIG. 45.

FIG. 45 is a perspective view showing a coupling device 701. The coupling device 701 connects a first member 702 and a second member 703 which are opposed. One end of the first member 702 has a flange 702a. One end of the second member 703 has a flange 703a.

The flange 702a of the first member 702 has a pair of projections 704a and 704b at the surface opposed to the second member 703. On the other hand, the flange 103a has a pair of through holes 705a and 705b at the place opposed to the first member 702. The through holes 705a and 705b are formed to correspond to and fit the projections 704a and 704b, respectively. The first member 702 and the second member 703 are exactly positioned relative to each other by fitting the projections 704a and 704b into the through holes 705a and 705b, respectively.

In the hollow cylindrical first member 702, a cable 706 is routed. One end of the cable 706 is connected to a plug 706a. In the hollow cylindrical second member 703, a cable 707 is routed. One end of the cable 707 is connected to a receptacle 707a. When the projections 704a and 704b are fitted into the through holes 705a and 705b, respectively, the plug 706a and the receptacle 707a are connected to each other.

Further, the flanges 702a and 703a are provided with a plurality of holes 708 and 709, respectively. Bolts 710a are inserted into the holes 708 and 709, and nuts 110b are threadingly engaged with the bolts 710a, thereby fastening the first member 702 and the second member 703.

In this embodiment, since the cables are routed inside the coupling device, unnecessary tensile load is not applied to the cables in comparison with the case where the cables are exposed outside.

3.6 Sixth Embodiment

(second modification of coupling device)

FIG. 46 shows a second modification of the coupling device of the working apparatus in accordance with the third aspect of the present invention.

The coupling device 711 shown in FIG. 46 comprises a first member 712 and a second member 713. One end of the first member 712 has a flange 712a. One end of the second member 713 has a flange 713a. A plug 714a is provided at a part of the flange 712a. A receptacle 715a is provided at a part of the flange 713a. The plug 714a is connected to a cable 714. The receptacle 715a is connected to a cable 715. The cables 714 and 715 are taken out from the first member 712 and the second member 713 through holes 712b and 713b formed thereon, respectively.

The coupling device 711 has the same effect as that of the modification described in the fifth embodiment.

3.7 Seventh Embodiment

Next, an embodiment for changing the operation range of the working apparatus in accordance with the third aspect of the present invention will be described with reference to FIG. 47.

Figure 47:
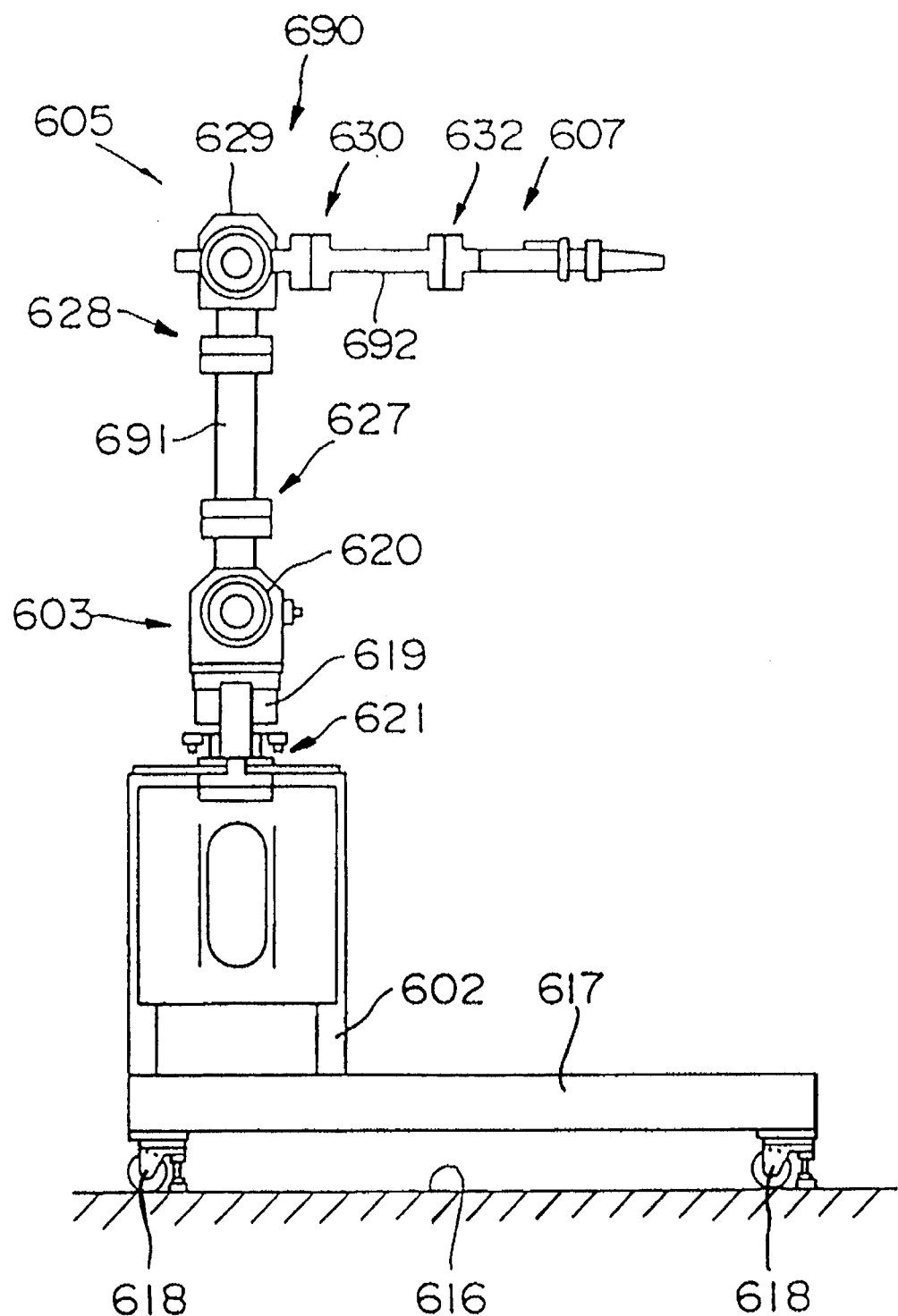
FIG. 47 is a side view showing another condition of a moving range of a seventh embodiment of the working apparatus in accordance with the third aspect of the present invention.
Figure 48:
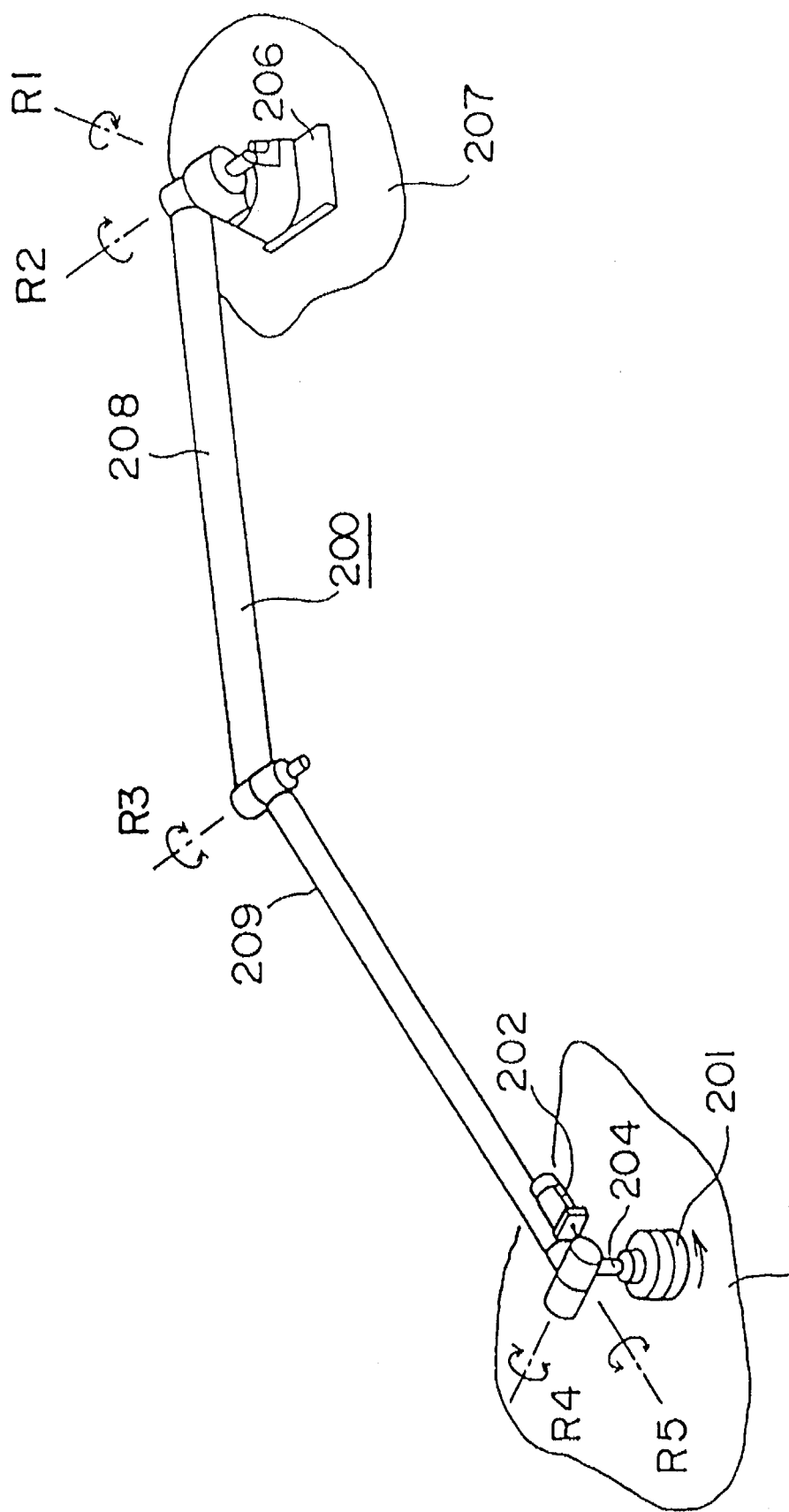
FIG. 48 is a perspective view showing a conventional working apparatus.
Figure 49:
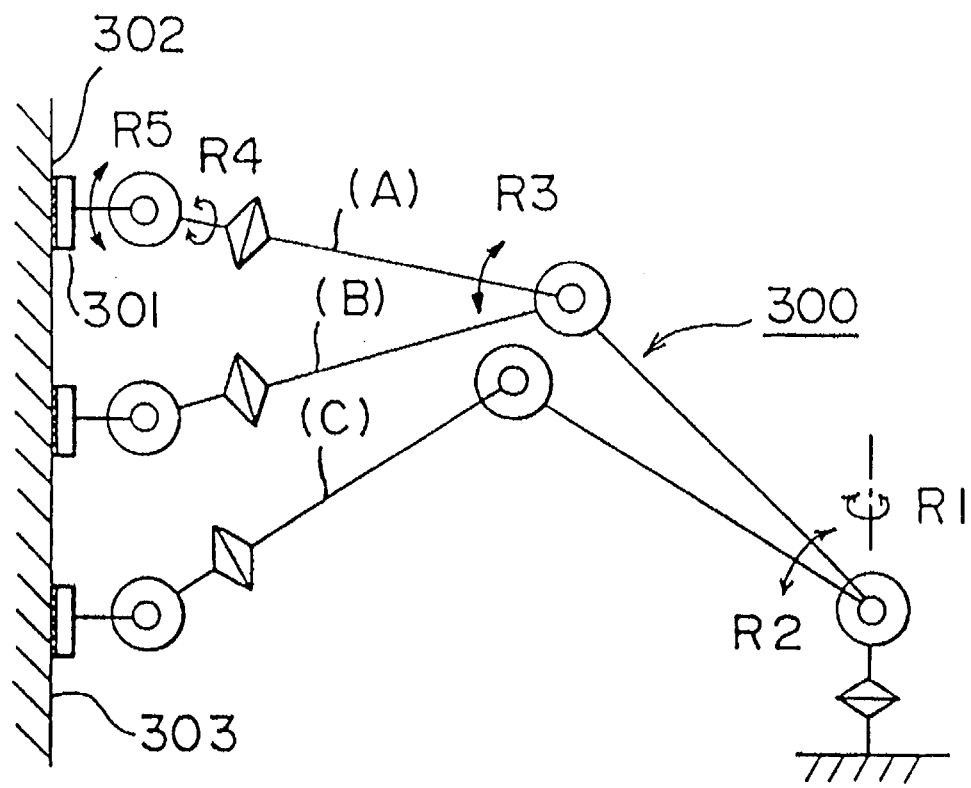
FIG. 49 is a schematic diagram indicating a working condition of the conventional working apparatus.

FIG. 47 shows an example where the operation range of the working apparatus is changed by varying the length of an arm constituting the manipulator.

In a manipulator 690 according to this embodiment shown in FIG. 47, the shoulder joint 603 is secured to the base 602 through the coupling device 621. A first arm 691 having a shorter length than that of the first arm 604 shown in FIGS. 35 to 37 is connected to the shoulder joint 603 through the coupling device 627. The elbow joint 605 is attached to the other end of the first arm 691 through the coupling device 628. Further, a second arm 692 is connected to the elbow joint 605 through the coupling device 630. The second arm 692 has a shorter length than that of the second arm 606 shown in FIGS. 35 to 37. The wrist joint 607 is attached to the other end of the second arm 692 through the coupling device 632.

The first arm 691 has a shorter length than that of the first arm 604, but the first arm 691 uses at both ends thereof the same coupling devices 627 and 628 as those provided at both ends of the first arm 604.

Likewise, the second arm 692 has a shorter length than that of the second arm 606, but the second arm 691 uses at both ends thereof the same coupling devices 630 and 632 as those provided at both ends of the second arm 606.

As is apparent from the above description, in order to change the operation range of the working apparatus 601, some arms constructing the working apparatus are replaced with other arms having a different length and using the same coupling devices at both ends thereof.

In this embodiment, by selecting optimum arms in accordance with a desired service work or the conditions of an aircraft (for example, distance from the opening of the cockpit and the objective working surface), the working apparatus 601 can be constructed in conformity with the desired service work and the conditions of aircraft.

Further, the configuration of the degrees of freedom of the manipulator can be changed by changing the coupling direction of the coupling device of the manipulator or replacing a particular joint with another joint having a different motion (for example, using linear joints instead of a rotating joint). Furthermore, the operational range of the working apparatus can be changed with variation of form or shape of a joint.

Figure 38B:
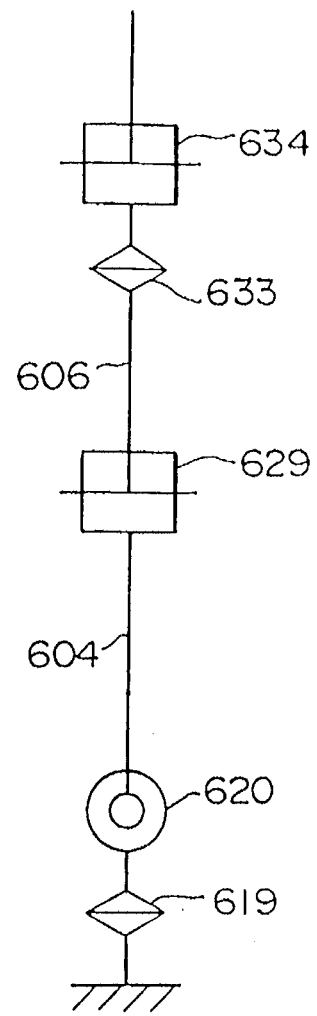

For example, FIG. 38B shows a modification of the configuration of the degrees of freedom of the manipulator 610. In this modification, the first arm 604 and the elbow joint 605 of the working apparatus 601 shown in FIG. 38A are rotated by an angle of 90 degrees at the position of the coupling device 628 and fixed in this state. As a matter of fact, in FIG. 44 the bolt 624a is engaged with a through hole 650 formed perpendicular to the through hole 625.

In the above described embodiments, the working apparatus from which the manipulator can be detached was described. However, it should be appreciated that the construction of a working apparatus from which the manipulator cannot be detached can also be considered.

INDUSTRIAL UTILIZATION

The working apparatus in accordance with the present invention can be used for not only for cleaning windows of aircraft but also for cleaning and painting architectural structures.

We claim:

1. A working robot, comprising:

an articulated manipulator arm having a number of articulations ranging from two to four;

a working unit having a working portion for surface contacting in a freely rotatable manner an objective working surface; and a universal coupling for coupling said manipulator and said working unit, said universal coupling being freely rotatable about two axes, wherein said universal coupling has a pair of potentiometers, each detecting an angle of rotation of said working unit about one of said rotation axes.

2. The working apparatus as set forth in claim 1, wherein said working unit has force detecting means for detecting the force with which said working portion presses against said objective working surface.

3. The working apparatus as set forth in claim 1, wherein said manipulator has force detecting means for detecting the force with which said working portion presses against said objective working surface.

4. The working apparatus as set forth in claim 1, wherein said working apparatus has a plurality of working portions, of which, adjacent working portions are reversely rotated.

5. The working apparatus as set forth in claim 1, further comprising a spring, provided between said working unit and said universal coupling, for positioning said working unit.

6. The working apparatus as set forth in claim 1, wherein said working unit has a counterweight opposed to said working portion.

7. The working apparatus as set forth in claim 1, further comprising a connecting jig, disposed between said manipulator and said universal coupling, for attaching said universal coupling with a desired orientation.

8. The working apparatus as set forth in claim 7, wherein said connecting jig is rotatable about a rotation shaft.

9. A working robot, comprising:

an articulated SCARA robot, which is a selective compliance assembly robot arm, having a number of articulations ranging from two to four;

a working unit having a working portion for surface contacting in a freely rotatable manner an objective working surface;

a base for holding said SCARA robot; and a universal coupling for coupling said SCARA robot and said working unit, said universal coupling being freely rotatable about two axes, wherein said universal coupling has a pair of potentiometers, each detecting an angle of rotation of said working unit about one of said rotation axes.

* * * * *